(12) United States Patent (10) Patent No.: US 8,387,889 B2
Lapstun et al. (45) Date of Patent: *Mar. 5, 2013

(54) OBJECT COMPRISING CODED DATA AND RANDOMLY DISPERSED INK TAGGANT

(75) Inventors: Paul Lapstun, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/196,819

(22) Filed: Aug. 2, 2011

(65) Prior Publication Data

US 2011/0284635 A1 Nov. 24, 2011

Related U.S. Application Data

(63) Continuation of application No. 12/973,368, filed on Dec. 20, 2010, now Pat. No. 8,006,914, which is a continuation of application No. 11/488,163, filed on Jul. 18, 2006, now Pat. No. 7,874,494.

(51) Int. Cl.
*G06K 19/05* (2006.01)

(52) U.S. Cl. ........................................ 235/494; 235/454

(58) Field of Classification Search .................. 235/375, 235/487, 494, 380, 382, 385
See application file for complete search history.

(56) References Cited

U.S. PATENT DOCUMENTS

| | | | |
|---|---|---|---|
| 4,864,618 A | 9/1989 | Wright et al. | |
| 5,051,736 A | 9/1991 | Bennett et al. | |
| 5,396,559 A | 3/1995 | McGrew | |
| 5,442,147 A * | 8/1995 | Burns et al. | 178/18.09 |
| 5,477,012 A * | 12/1995 | Sekendur | 178/18.09 |
| 5,652,412 A | 7/1997 | Lazzouni et al. | |
| 5,661,506 A | 8/1997 | Lazzouni et al. | |
| 5,692,073 A | 11/1997 | Cass | |
| 5,757,918 A | 5/1998 | Hopkins | |
| 5,852,434 A | 12/1998 | Sekendur | |
| 5,937,110 A * | 8/1999 | Petrie et al. | 382/306 |
| 6,076,734 A | 6/2000 | Dougherty et al. | |
| 6,259,790 B1 | 7/2001 | Takagi et al. | |
| 6,330,976 B1 * | 12/2001 | Dymetman et al. | 235/487 |
| 6,444,377 B1 | 9/2002 | Jotcham et al. | |
| 6,964,374 B1 | 11/2005 | Djuknic et al. | |
| 7,201,323 B2 | 4/2007 | Kotovich et al. | |
| 7,392,950 B2 | 7/2008 | Walmsley et al. | |
| 7,874,494 B2 * | 1/2011 | Lapstun et al. | 235/494 |
| 8,006,914 B2 * | 8/2011 | Lapstun et al. | 235/494 |
| 2002/0052794 A1 | 5/2002 | Bhadra | |
| 2002/0194476 A1 | 12/2002 | Lewis et al. | |

(Continued)

FOREIGN PATENT DOCUMENTS

DE 10304805 A1 * 8/2004
GB 2306669 A 5/1997

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

(Continued)

*Primary Examiner* — Daniel St.Cyr

(57) ABSTRACT

An object has first coded data and a random pattern disposed on a surface thereof. The first coded data identifies a plurality of fiducials on the surface and the random pattern defines a fingerprint for the object. The random pattern is defined by a taggant randomly dispersed in ink printed on the surface. A data reader for reading the first coded data and random pattern includes first and second optical sensors.

12 Claims, 42 Drawing Sheets

U.S. PATENT DOCUMENTS

| | | |
|---|---|---|
| 2003/0115162 A1 | 6/2003 | Konick |
| 2003/0195820 A1* | 10/2003 | Silverbrook et al. ........... 705/26 |
| 2004/0053011 A1 | 3/2004 | Behm et al. |
| 2004/0128190 A1 | 7/2004 | Campo et al. |
| 2004/0195341 A1 | 10/2004 | Lapstun et al. |
| 2004/0195342 A1 | 10/2004 | Silverbrook et al. |
| 2004/0229597 A1 | 11/2004 | Patel |
| 2005/0038758 A1 | 2/2005 | Hilbush et al. |
| 2005/0086585 A1 | 4/2005 | Robert et al. |
| 2005/0149442 A1 | 7/2005 | Adams et al. |
| 2005/0162455 A1 | 7/2005 | Silverbrook |
| 2005/0167480 A1 | 8/2005 | Silverbrook et al. |
| 2005/0185198 A1 | 8/2005 | Silverbrook |
| 2005/0247793 A1 | 11/2005 | Silverbrook et al. |
| 2005/0257045 A1 | 11/2005 | Bushman et al. |
| 2005/0289061 A1 | 12/2005 | Kulakowski et al. |
| 2006/0095778 A1 | 5/2006 | He et al. |
| 2006/0124726 A1 | 6/2006 | Kotovich et al. |
| 2006/0238334 A1 | 10/2006 | Mangan et al. |
| 2006/0282330 A1 | 12/2006 | Frank et al. |

FOREIGN PATENT DOCUMENTS

| | | |
|---|---|---|
| JP | 2004-094907 | 3/2004 |
| WO | WO 99/18487 A2 | 4/1999 |
| WO | WO 99/50787 | 10/1999 |

OTHER PUBLICATIONS

TruckingMall, Inc. launches new fleet management systems for container trucking industry (New Services).(ModalTrack)(Brief Article) Transport Technology Today, 41(1) May 2002.

* cited by examiner

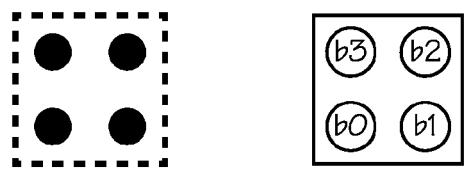
FIG. 7
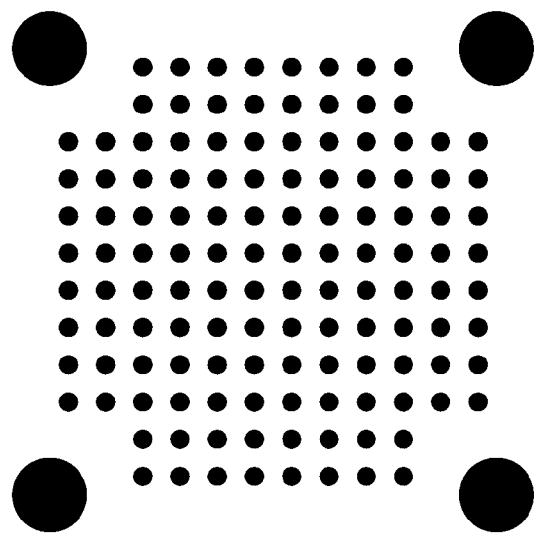
FIG. 8
| 00 | 10 |
|----|----|
| 01 | 11 |
FIG. 9

|   |   |   |
|---|---|---|
| 3 | 2 | 1 |
| 4 | - | 0 |
| 5 | 6 | 7 |

FIG. 13

|   |   |
|---|---|
| 00 | 10 |
| 01 | 11 |

FIG. 14

|   |   |   |   |   |   |
|---|---|---|---|---|---|
| 00 | 10 | 00 | 10 | 00 | 10 |
| 01 | 11 | 01 | 11 | 01 | 11 |
| 00 | 10 | 00 | 10 | 00 | 10 |
| 01 | 11 | 01 | 11 | 01 | 11 |

FIG. 15

OBJECT COMPRISING CODED DATA AND RANDOMLY DISPERSED INK TAGGANT

CROSS REFERENCE TO RELATED APPLICATION

This application is a continuation of U.S. application Ser. No. 12/9732,368 filed Dec. 20, 2010, now issued with U.S. Pat. No. 8,006,914, which is a continuation of U.S. application Ser. No. 11/488,163 filed Jul. 18, 2006, now issued with U.S. Pat. No. 7,874,494, all of which is herein incorporated by reference.

FIELD OF THE INVENTION

The present invention broadly relates to a method and apparatus for the identification and protection of products and security documents using machine readable tags disposed on or in a surface of the product or security document, and user interaction therewith.

CO-PENDING

The following applications have been filed by the Applicant with the present application: U.S. Pat. Nos. 7,806,342 7,856,554 Ser. No. 11/488,165 U.S. Pat. No. 7,899,708
The disclosures of these co-pending applications are incorporated herein by reference.

CROSS-REFERENCES

Various methods, systems and apparatus relating to the present invention are disclosed in the following U.S. patents/patent applications filed by the applicant or assignee of the present invention:

| | | | | | |
|---|---|---|---|---|---|
| 6,405,055 | 6,628,430 | 7,136,186 | 7,286,260 | 7,145,689 | 7,130,075 |
| 7,081,974 | 7,177,055 | 7,209,257 | 7,161,715 | 7,154,632 | 7,158,258 |
| 7,148,993 | 7,075,684 | 7,241,005 | 7,108,437 | 6,915,140 | 6,999,206 |
| 7,136,198 | 7,092,130 | 6,750,901 | 6,476,863 | 6,788,336 | 7,249,108 |
| 6,566,858 | 6,331,946 | 6,246,970 | 6,442,525 | 7,346,586 | 7,685,423 |
| 6,374,354 | 7,246,098 | 6,816,968 | 6,757,832 | 6,334,190 | 6,745,331 |
| 7,249,109 | 7,197,642 | 7,093,139 | 7,509,292 | 7,685,424 | 7,743,262 |
| 7,210,038 | 7,401,223 | 7,702,926 | 7,716,098 | 7,170,652 | 6,967,750 |
| 6,995,876 | 7,099,051 | 7,453,586 | 7,193,734 | 7,773,245 | 7,095,533 |
| 6,914,686 | 7,161,709 | 7,099,033 | 7,364,256 | 7,258,417 | 7,293,853 |
| 7,328,968 | 7,270,395 | 7,461,916 | 7,510,264 | 7,334,864 | 7,255,419 |
| 7,284,819 | 7,229,148 | 7,258,416 | 7,273,263 | 7,270,393 | 6,984,017 |
| 7,347,526 | 7,357,477 | 7,465,015 | 7,364,255 | 7,357,476 | 7,758,148 |
| 7,284,820 | 7,341,328 | 7,246,875 | 7,322,669 | 7,445,311 | 7,452,052 |
| 7,455,383 | 7,448,724 | 7,441,864 | 7,637,588 | 7,648,222 | 7,669,958 |
| 7,607,755 | 7,699,433 | 7,658,463 | 7,506,958 | 7,472,981 | 7,448,722 |
| 7,575,297 | 7,438,381 | 7,441,863 | 7,438,382 | 7,425,051 | 7,399,057 |
| 7,695,097 | 7,686,419 | 7,753,472 | 7,448,720 | 7,448,723 | 7,445,310 |
| 7,399,054 | 7,425,049 | 7,367,648 | 7,370,936 | 7,401,886 | 7,506,952 |
| 7,401,887 | 7,384,119 | 7,401,888 | 7,387,358 | 7,413,281 | 7,530,663 |
| 7,467,846 | 7,669,957 | 7,771,028 | 7,758,174 | 7,695,123 | 7,798,600 |
| 7,604,334 | 7,857,435 | 7,708,375 | 7,695,093 | 7,695,098 | 7,722,156 |
| 7,703,882 | 7,510,261 | 7,722,153 | 7,243,835 | 7,832,626 | 7,703,693 |
| 10/815,638 | 7,251,050 | 7,097,094 | 7,137,549 | 7,156,292 | 10/815,635 |
| 7,357,323 | 7,654,454 | 7,137,566 | 7,131,596 | 7,128,265 | 7,207,485 |
| 7,197,374 | 7,175,089 | 7,819,323 | 7,537,160 | 7,178,719 | 7,506,808 |
| 7,207,483 | 7,296,737 | 7,270,266 | 7,605,940 | 7,128,270 | 7,784,681 |
| 7,677,445 | 7,506,168 | 7,441,712 | 7,663,789 | 7,905,401 | 7,537,157 |
| 7,801,742 | 7,395,963 | 7,457,961 | 7,739,509 | 7,467,300 | 7,467,299 |
| 7,565,542 | 7,457,007 | 7,150,398 | 7,159,777 | 7,450,273 | 7,188,769 |
| 7,097,106 | 7,070,110 | 7,243,849 | 7,469,836 | 6,623,101 | 6,406,129 |
| 6,505,916 | 6,457,809 | 6,550,895 | 6,457,812 | 7,152,962 | 6,428,133 |
| 7,204,941 | 7,282,164 | 7,465,342 | 7,278,727 | 7,417,141 | 7,452,989 |
| 7,367,665 | 7,138,391 | 7,153,956 | 7,423,145 | 7,456,277 | 7,550,585 |
| 7,122,076 | 7,148,345 | 7,470,315 | 7,572,327 | 7,658,792 | 7,709,633 |

-continued

| | | | | | |
|---|---|---|---|---|---|
| 7,416,280 | 7,252,366 | 7,488,051 | 7,360,865 | 7,841,713 | 7,877,111 |
| 7,874,659 | 7,735,993 | 11/124,198 | 7,284,921 | 7,407,257 | 7,470,019 |
| 7,645,022 | 7,392,950 | 7,843,484 | 7,360,880 | 7,517,046 | 7,236,271 |
| 11/124,174 | 7,753,517 | 7,824,031 | 7,465,047 | 7,607,774 | 7,780,288 |
| 11/124,172 | 7,566,182 | 11/124,182 | 7,715,036 | 11/124,181 | 7,697,159 |
| 7,595,904 | 7,726,764 | 7,770,995 | 7,370,932 | 7,404,616 | 11/124,187 |
| 7,740,347 | 7,500,268 | 7,558,962 | 7,447,908 | 7,792,298 | 7,661,813 |
| 7,456,994 | 7,431,449 | 7,466,444 | 11/124,179 | 7,680,512 | 7,878,645 |
| 7,562,973 | 7,530,446 | 7,761,090 | 11/228,500 | 7,668,540 | 7,738,862 |
| 7,805,162 | 7,924,450 | 7,953,386 | 7,738,919 | 11/228,507 | 7,708,203 |
| 7,641,115 | 7,697,714 | 7,654,444 | 7,831,244 | 7,499,765 | 7,894,703 |
| 7,756,526 | 7,844,257 | 7,558,563 | 7,953,387 | 7,856,225 | 7,945,943 |
| 7,747,280 | 7,742,755 | 7,738,674 | 7,864,360 | 7,506,802 | 7,724,399 |
| 11/228,527 | 7,403,797 | 11/228,520 | 7,646,503 | 7,843,595 | 7,672,664 |
| 7,920,896 | 7,783,323 | 7,843,596 | 7,778,666 | 11/228,509 | 7,917,171 |
| 7,558,599 | 7,855,805 | 7,920,854 | 7,880,911 | 7,438,215 | 7,689,249 |
| 7,621,442 | 7,575,172 | 7,357,311 | 7,380,709 | 7,428,986 | 7,403,796 |
| 7,407,092 | 7,848,777 | 7,637,424 | 7,469,829 | 7,774,025 | 7,558,597 |
| 7,558,598 | 6,746,105 | 7,744,195 | 7,645,026 | 7,322,681 | 7,708,387 |
| 7,753,496 | 7,712,884 | 7,510,267 | 7,465,041 | 7,857,428 | 7,465,032 |
| 7,401,890 | 7,401,910 | 7,470,010 | 7,735,971 | 7,431,432 | 7,465,037 |
| 7,445,317 | 7,549,735 | 7,597,425 | 7,661,800 | 7,712,869 | 7,156,508 |
| 7,159,972 | 7,083,271 | 7,165,834 | 7,080,894 | 7,201,469 | 7,090,336 |
| 7,156,489 | 7,413,283 | 7,438,385 | 7,083,257 | 7,258,422 | 7,255,423 |
| 7,219,980 | 7,591,533 | 7,416,274 | 7,367,649 | 7,118,192 | 7,618,121 |
| 7,322,672 | 7,077,505 | 7,198,354 | 7,077,504 | 7,614,724 | 7,198,355 |
| 7,401,894 | 7,322,676 | 7,152,959 | 7,213,906 | 7,178,901 | 7,222,938 |
| 7,108,353 | 7,104,629 | 7,455,392 | 7,370,939 | 7,429,095 | 7,404,621 |
| 7,261,401 | 7,461,919 | 7,438,388 | 7,328,972 | 7,303,930 | 7,401,405 |
| 7,464,466 | 7,464,465 | 7,246,886 | 7,128,400 | 7,108,355 | 6,991,322 |
| 7,287,836 | 7,118,197 | 7,575,298 | 7,364,269 | 7,077,493 | 6,962,402 |
| 7,686,429 | 7,147,308 | 7,524,034 | 7,118,198 | 7,168,790 | 7,172,270 |
| 7,229,155 | 6,830,318 | 7,195,342 | 7,175,261 | 7,465,035 | 7,108,356 |
| 7,118,202 | 7,510,269 | 7,134,744 | 7,510,270 | 7,134,743 | 7,182,439 |
| 7,210,768 | 7,465,036 | 7,134,745 | 7,156,484 | 7,118,201 | 7,111,926 |
| 7,431,433 | 7,018,021 | 7,401,901 | 7,468,139 | 7,128,402 | 7,387,369 |
| 7,484,832 | 7,448,729 | 7,246,876 | 7,431,431 | 7,419,249 | 7,377,623 |
| 7,328,978 | 7,334,876 | 7,147,306 | 7,654,645 | 7,784,915 | 7,466,440 |
| 7,249,901 | 7,477,987 | 7,503,493 | 7,156,289 | 7,178,718 | 7,225,979 |
| 7,540,429 | 7,584,402 | 7,721,948 | 7,079,712 | 6,825,945 | 7,330,974 |
| 6,813,039 | 7,190,474 | 6,987,506 | 6,824,044 | 7,038,797 | 6,980,318 |
| 6,816,274 | 7,102,772 | 7,350,236 | 6,681,045 | 6,678,499 | 6,679,420 |
| 6,963,845 | 6,976,220 | 6,728,000 | 7,110,126 | 7,173,722 | 6,976,035 |
| 6,813,558 | 6,766,942 | 6,965,454 | 6,995,859 | 7,088,459 | 6,720,985 |
| 7,286,113 | 6,922,779 | 6,978,019 | 6,847,883 | 7,131,058 | 7,295,839 |
| 7,406,445 | 7,533,031 | 6,959,298 | 6,973,450 | 7,150,404 | 6,965,882 |
| 7,233,924 | 7,707,082 | 7,593,899 | 7,175,079 | 7,162,259 | 6,718,061 |
| 7,464,880 | 7,012,710 | 6,825,956 | 7,451,115 | 7,222,098 | 7,590,561 |
| 7,263,508 | 7,031,010 | 6,972,864 | 6,862,105 | 7,009,738 | 6,989,911 |
| 6,982,807 | 7,518,756 | 6,829,387 | 6,714,678 | 6,644,545 | 6,609,653 |
| 6,651,879 | 7,293,240 | 7,467,185 | 7,415,668 | 7,044,363 | 7,004,390 |
| 6,867,880 | 7,034,953 | 6,987,581 | 7,216,224 | 7,506,153 | 7,162,269 |
| 7,162,222 | 7,290,210 | 7,293,233 | 7,293,234 | 6,850,931 | 6,865,570 |
| 6,847,961 | 10/685,583 | 7,162,442 | 10/685,584 | 7,159,784 | 7,557,594 |
| 7,404,144 | 6,889,896 | 7,174,056 | 6,996,274 | 7,162,088 | 7,388,985 |
| 7,417,759 | 7,362,463 | 7,259,884 | 7,167,270 | 7,388,685 | 6,986,459 |
| 7,181,448 | 7,590,622 | 7,657,510 | 7,324,989 | 7,231,293 | 7,174,329 |
| 7,369,261 | 7,295,922 | 7,200,591 | 7,693,828 | 7,844,621 | 7,856,447 |
| 7,856,444 | 7,466,436 | 7,347,357 | 11/051,032 | 7,382,482 | 7,602,515 |
| 7,446,893 | 7,389,423 | 7,401,227 | 6,991,153 | 6,991,154 | 7,589,854 |
| 7,551,305 | 7,322,524 | 7,408,670 | 7,466,439 | 7,571,193 | 7,941,338 |
| 7,327,485 | 7,428,070 | 7,225,402 | 7,797,528 | 7,068,382 | 7,007,851 |
| 6,957,921 | 6,457,883 | 7,044,381 | 11/203,205 | 7,094,910 | 7,091,344 |
| 7,122,685 | 7,038,066 | 7,099,019 | 7,062,651 | 6,789,194 | 6,789,191 |
| 7,529,936 | 7,278,018 | 7,360,089 | 7,526,647 | 7,467,416 | 6,644,642 |
| 6,502,614 | 6,622,999 | 6,669,385 | 6,827,116 | 7,011,128 | 7,416,009 |
| 6,549,935 | 6,987,573 | 6,727,996 | 6,591,884 | 6,439,706 | 6,760,119 |
| 7,295,332 | 7,064,851 | 6,826,547 | 6,290,349 | 6,428,155 | 6,785,016 |
| 6,831,682 | 6,741,871 | 6,927,871 | 6,980,306 | 6,965,439 | 6,840,606 |
| 7,036,918 | 6,977,746 | 6,970,264 | 7,068,389 | 7,093,991 | 7,190,491 |
| 7,511,847 | 7,663,780 | 7,177,054 | 7,364,282 | 10/965,733 | 7,728,872 |
| 7,468,809 | 7,180,609 | 7,538,793 | 7,466,438 | 7,292,363 | 7,515,292 |
| 7,414,741 | 7,202,959 | 6,982,798 | 6,870,966 | 6,822,639 | 6,474,888 |
| 6,627,870 | 6,724,374 | 6,788,982 | 7,263,270 | 6,788,293 | 6,946,672 |
| 6,737,591 | 7,091,960 | 7,369,265 | 6,792,165 | 7,105,753 | 6,795,593 |
| 6,980,704 | 6,768,821 | 7,132,612 | 7,041,916 | 6,797,557 | 7,015,901 |
| 7,289,882 | 7,148,644 | 10/778,056 | 7,515,186 | 7,567,279 | 7,096,199 |
| 7,286,887 | 7,400,937 | 7,474,930 | 7,324,859 | 7,218,978 | 7,245,294 |
| 7,277,085 | 7,187,370 | 7,609,410 | 7,660,490 | 10/919,379 | 7,019,319 |
| 7,593,604 | 7,660,489 | 7,043,096 | 7,148,499 | 7,463,250 | 7,590,311 |

-continued

| | | | | | |
|---|---|---|---|---|---|
| 7,936,343 | 11/193,481 | 7,567,241 | 11/193,482 | 11/193,479 | 7,336,267 |
| 7,388,221 | 7,577,317 | 7,055,739 | 7,233,320 | 6,830,196 | 6,832,717 |
| 7,182,247 | 7,120,853 | 7,082,562 | 6,843,420 | 7,793,852 | 6,789,731 |
| 7,057,608 | 6,766,944 | 6,766,945 | 7,289,103 | 7,412,651 | 7,299,969 |
| 7,264,173 | 7,108,192 | 7,549,595 | 7,111,791 | 7,077,333 | 6,983,878 |
| 7,564,605 | 7,134,598 | 7,431,219 | 6,929,186 | 6,994,264 | 7,017,826 |
| 7,014,123 | 7,134,601 | 7,150,396 | 7,469,830 | 7,017,823 | 7,025,276 |
| 7,284,701 | 7,080,780 | 7,376,884 | 7,334,739 | 10/492,169 | 7,469,062 |
| 7,359,551 | 7,444,021 | 7,308,148 | 7,630,962 | 7,630,553 | 7,630,554 |
| 10/510,391 | 7,660,466 | 7,526,128 | 6,957,768 | 7,456,820 | 7,170,499 |
| 7,106,888 | 7,123,239 | 6,982,701 | 6,982,703 | 7,227,527 | 6,786,397 |
| 6,947,027 | 6,975,299 | 7,139,431 | 7,048,178 | 7,118,025 | 6,839,053 |
| 7,015,900 | 7,010,147 | 7,133,557 | 6,914,593 | 7,437,671 | 6,938,826 |
| 7,278,566 | 7,123,245 | 6,992,662 | 7,190,346 | 7,417,629 | 7,468,724 |
| 7,382,354 | 7,715,035 | 7,221,781 | 7,263,225 | 7,287,688 | 7,377,608 |
| 7,399,043 | 7,121,639 | 7,165,824 | 7,152,942 | 7,818,519 | 7,181,572 |
| 7,096,137 | 7,302,592 | 7,278,034 | 7,188,282 | 7,592,829 | 7,770,008 |
| 7,707,621 | 7,523,111 | 7,573,301 | 7,660,998 | 7,783,886 | 7,831,827 |
| 7,171,323 | 7,278,697 | 7,360,131 | 7,369,270 | 6,795,215 | 7,070,098 |
| 7,154,638 | 6,805,419 | 6,859,289 | 6,977,751 | 6,398,332 | 6,394,573 |
| 6,622,923 | 6,747,760 | 6,921,144 | 7,092,112 | 7,192,106 | 7,457,001 |
| 7,173,739 | 6,986,560 | 7,008,033 | 7,551,324 | 7,222,780 | 7,270,391 |
| 7,525,677 | 7,571,906 | 7,195,328 | 7,182,422 | 7,374,266 | 7,427,117 |
| 7,448,707 | 7,281,330 | 7,328,956 | 7,735,944 | 7,188,928 | 7,093,989 |
| 7,377,609 | 7,600,843 | 10/854,498 | 7,390,071 | 7,549,715 | 7,252,353 |
| 7,607,757 | 7,267,417 | 7,517,036 | 7,275,805 | 7,314,261 | 7,281,777 |
| 7,290,852 | 7,484,831 | 7,758,143 | 7,832,842 | 7,549,718 | 7,866,778 |
| 7,631,190 | 7,557,941 | 7,757,086 | 7,266,661 | 7,243,193 | 7,163,345 |
| 7,465,033 | 7,452,055 | 7,470,002 | 7,722,161 | 7,475,963 | 7,448,735 |
| 7,465,042 | 7,448,739 | 7,438,399 | 7,467,853 | 7,461,922 | 7,465,020 |
| 7,722,185 | 7,461,910 | 7,270,494 | 7,632,032 | 7,475,961 | 7,547,088 |
| 7,611,239 | 7,735,955 | 7,758,038 | 7,681,876 | 7,780,161 | 7,703,903 |
| 7,448,734 | 7,425,050 | 7,364,263 | 7,201,468 | 7,360,868 | 7,234,802 |
| 7,303,255 | 7,287,846 | 7,156,511 | 7,258,432 | 7,097,291 | 7,645,025 |
| 7,083,273 | 7,367,647 | 7,374,355 | 7,441,880 | 7,547,092 | 7,513,598 |
| 7,198,352 | 7,364,264 | 7,303,251 | 7,201,470 | 7,121,655 | 7,293,861 |
| 7,232,208 | 7,328,985 | 7,344,232 | 7,083,272 | 7,261,400 | 7,461,914 |
| 7,431,441 | 7,621,620 | 7,669,961 | 7,331,663 | 7,360,861 | 7,328,973 |
| 7,427,121 | 7,407,262 | 7,303,252 | 7,249,822 | 7,537,309 | 7,311,382 |
| 7,360,860 | 7,364,257 | 7,390,075 | 7,350,896 | 7,429,096 | 7,384,135 |
| 7,331,660 | 7,416,287 | 7,488,052 | 7,322,684 | 7,322,685 | 7,311,381 |
| 7,270,405 | 7,303,268 | 7,470,007 | 7,399,072 | 7,393,076 | 7,681,967 |
| 7,588,301 | 7,249,833 | 7,524,016 | 7,490,927 | 7,331,661 | 7,524,043 |
| 7,300,140 | 7,357,492 | 7,357,493 | 7,566,106 | 7,380,902 | 7,284,816 |
| 7,284,845 | 7,255,430 | 7,390,080 | 7,328,984 | 7,350,913 | 7,322,671 |
| 7,380,910 | 7,431,424 | 7,470,006 | 7,585,054 | 7,347,534 | 7,441,865 |
| 7,469,989 | 7,367,650 | 7,469,990 | 7,441,882 | 7,556,364 | 7,357,496 |
| 7,467,863 | 7,431,440 | 7,431,443 | 7,527,353 | 7,524,023 | 7,513,603 |
| 7,467,852 | 7,465,045 | 6,454,482 | 6,808,330 | 6,527,365 | 6,474,773 |
| 6,550,997 | 7,093,923 | 6,957,923 | 7,131,724 | 7,396,177 | 7,168,867 |
| 7,125,098 | 7,413,363 | 7,188,930 | 7,079,292 | | |

The above applications have been identified by their filing docket number, which will be substituted with the corresponding application number, once assigned.

BACKGROUND

Surface Coding Background

The netpage surface coding consists of a dense planar tiling of tags. Each tag encodes its own location in the plane. Each tag also encodes, in conjunction with adjacent tags, an identifier of the region containing the tag. This region ID is unique among all regions. In the netpage system the region typically corresponds to the entire extent of the tagged surface, such as one side of a sheet of paper.

The surface coding is designed so that an acquisition field of view large enough to guarantee acquisition of an entire tag is large enough to guarantee acquisition of the ID of the region containing the tag. Acquisition of the tag itself guarantees acquisition of the tag's two-dimensional position within the region, as well as other tag-specific data. The surface coding therefore allows a sensing device to acquire a region ID and a tag position during a purely local interaction with a coded surface, e.g. during a "click" or tap on a coded surface with a pen.

The use of netpage surface coding is described in more detail in the following copending patent applications, U.S. Ser. No. 10/815,647, entitled "Obtaining Product Assistance" filed on 2 Apr. 2004; and U.S. Ser. No. 10/815,609, entitled "Laser Scanner Device for Printed Product Identification Cod" filed on 2 Apr. 2004.

Cryptography Background

Cryptography is used to protect sensitive information, both in storage and in transit, and to authenticate parties to a transaction. There are two classes of cryptography in widespread use: secret-key cryptography and public-key cryptography.

Secret-key cryptography, also referred to as symmetric cryptography, uses the same key to encrypt and decrypt a message. Two parties wishing to exchange messages must first arrange to securely exchange the secret key.

Public-key cryptography, also referred to as asymmetric cryptography, uses two encryption keys. The two keys are mathematically related in such a way that any message encrypted using one key can only be decrypted using the other key. One of these keys is then published, while the other is kept private. They are referred to as the public and private key respectively. The public key is used to encrypt any message intended for the holder of the private key. Once encrypted using the public key, a message can only be decrypted using the private key. Thus two parties can securely exchange messages without first having to exchange a secret key. To ensure that the private key is secure, it is normal for the holder of the private key to generate the public-private key pair.

Public-key cryptography can be used to create a digital signature. If the holder of the private key creates a known hash of a message and then encrypts the hash using the private key, then anyone can verify that the encrypted hash constitutes the "signature" of the holder of the private key with respect to that particular message, simply by decrypting the encrypted hash using the public key and verifying the hash against the message. If the signature is appended to the message, then the recipient of the message can verify both that the message is genuine and that it has not been altered in transit.

Secret-key can also be used to create a digital signature, but has the disadvantage that signature verification can also be performed by a party privy to the secret key.

To make public-key cryptography work, there has to be a way to distribute public keys which prevents impersonation. This is normally done using certificates and certificate authorities. A certificate authority is a trusted third party which authenticates the association between a public key and a person's or other entity's identity. The certificate authority verifies the identity by examining identity documents etc., and then creates and signs a digital certificate containing the identity details and public key. Anyone who trusts the certificate authority can use the public key in the certificate with a high degree of certainty that it is genuine. They just have to verify that the certificate has indeed been signed by the certificate authority, whose public key is well-known.

To achieve comparable security to secret-key cryptography, public-key cryptography utilises key lengths an order of magnitude larger, i.e. a few thousand bits compared with a few hundred bits. Schneier B. (*Applied Cryptography*, Second Edition, John Wiley & Sons 1996) provides a detailed discussion of cryptographic techniques.

SUMMARY OF THE INVENTION

In a first aspect the present invention provides an object comprising first coded data disposed on or in a surface thereof, said first coded data identifying a plurality of locations on the surface and a layout of at least one interactive element associated with the surface.

In a further aspect the object further comprises graphical information printed on the surface, said graphical information relating to the at least one interactive element.

Optionally the layout is identified by a layout number, and one layout number is associated with a plurality of objects.

In a further aspect there is provided an object which is a consumer product item.

Optionally, the first coded data further identifies a class of product.

Optionally, the class of product is identified by a product class number and/or a manufacturer number.

Optionally, the class of product is identified by a Universal Product Code (UPC).

Optionally, the surface is defined by a label, packaging or the product item itself.

Optionally, the first coded data further identifies a flag for distinguishing the first coded data from other types of coded data.

In a further aspect there is provided an object further comprising a unique identifier for uniquely identifying the object, said unique identifier being distinguishable from the first coded data and independently readable.

Optionally, the unique identifier identifies a serial number.

Optionally, the unique identifier identifies an Electronic Product Code (EPC).

Optionally, the unique identifier comprises second coded data disposed on or in a surface of the object, said second coded data identifying a unique identity for the object.

Optionally, the second coded data further identifies a digital signature for the unique identity.

Optionally, the first coded data identifies a flag for distinguishing the first coded data from the second coded data.

Optionally, the unique identifier comprises a random pattern disposed on or in a surface of the object, said random pattern defining at least one fingerprint for the object.

Optionally, the random pattern is defined by a taggant randomly dispersed in ink printed on the surface.

Optionally, the unique identifier is contained in an RFID tag.

Optionally, the first coded data is defined by a plurality of tags, each tag identifying its own location on the surface and the layout of the at least one interactive element associated with the surface.

Optionally, each tag further identifies a class of product and/or a flag for distinguishing the first coded data from other types of coded data.

In another aspect the present invention provides data reader for interacting with an object, said object comprising first coded data disposed on or in a surface thereof, said first coded data identifying a plurality of locations on the surface and a layout of at least one interactive element associated with the surface, said data reader comprising:
 an optical sensor for sensing at least some of the first coded data;
 a processor for generating layout data using the sensed coded data, said layout data identifying a position of the data reader relative to the surface and a layout of the at least one interactive element; and
 means for communicating the layout data to a computer system.

In another aspect the present invention provides data reader for interacting with an object, said object comprising coded data disposed on or in a surface thereof, said coded data identifying: a plurality of locations on the surface and either (i) a layout of at least one interactive element associated with the surface, or (ii) a unique identity of the object, said data reader comprising:
 an optical sensor for sensing at least some of the coded data;
 a processor configured for:
  determining whether the sensed coded data identifies (i) the layout or (ii) the unique identity;
  generating layout data using the sensed coded data, said layout data identifying a position of the data reader relative to the surface and either (i) the layout of the at least one interactive element or (ii) the unique identity; and
 means for communicating the layout data to a computer system.

Optionally the processor determines whether the sensed coded data identifies (i) the layout or (ii) the unique identity, based on the presence of a flag in the sensed coded data.

In a further aspect there is provided a data reader which is selected from any one of the group comprising: a fixed scanner; a handheld scanner; a mobile phone; a pen; a stylus; and a personal digital assistant.

In another aspect the present invention provides a system for interacting with an object, said system comprising:
 an object comprising first coded data disposed on or in a surface thereof, said first coded data identifying: a plurality of locations on the surface and a layout of at least one interactive element associated with the surface; and
 a data reader comprising:
  an optical sensor for sensing at least some of the first coded data;
  a processor for generating layout data using the sensed coded data, said layout data identifying a position of the data reader relative to the surface and a layout of the at least one interactive element; and
  means for communicating the layout data to a computer system.

In another aspect the present invention provides a system for identifying an interaction with an object, said object comprising first coded data disposed on or in a surface thereof, said first coded data identifying: a plurality of locations on the surface and a layout of at least one interactive element associated with the surface, said system comprising a computer system configured for:
 receiving layout data from a data reader interacting with the surface, said layout data identifying a position of the data reader relative to the surface and a layout of the at least one interactive element;
 identifying in the computer system, using the layout data, an interaction with the object.

Optionally, the computer system is configured for:
 retrieving the layout identified by the first coded data using the layout data; and
 identifying the interaction by interpreting the position of the reader with reference to a zone of the at least one interactive element as specified in the retrieved layout.

In another aspect the present invention provides a method of interacting with an object, said object comprising first coded data disposed on or in a surface thereof, said first coded data identifying: a plurality of locations on the surface and a layout of at least one interactive element associated with the surface, said method comprising the steps of:
- sensing at least some of the first coded data;
- generating layout data using the sensed coded data, said layout data identifying a position of the data reader relative to the surface and a layout of the at least one interactive element; and
- communicating the layout data to a computer system.

In another aspect the present invention provides a method of identifying an interaction with an object, said object comprising first coded data disposed on or in a surface thereof, said first coded data identifying: a plurality of locations on the surface and a layout of at least one interactive element associated with the surface,
said method comprising the steps of:
- receiving, in a computer system, layout data from a data reader interacting with the surface, said layout data identifying a position of the data reader relative to the surface and a layout of the at least one interactive element;
- identifying in the computer system, using the layout data, an interaction with the object.

Optionally, said identifying step comprises:
- retrieving the layout identified by the first coded data using the layout data; and
- identifying the interaction by interpreting the position of the reader with reference to a zone of the at least one interactive element as specified in the retrieved layout.

In a second aspect the present invention provides an object comprising first coded data disposed on or in a surface thereof and an identifier, said first coded data identifying a plurality of locations on the surface and said identifier identifying a unique identity of the object, wherein the first coded data and the identifier are distinguishable from each other and independently readable.

Optionally, the identifier identifies a serial number.

Optionally, the identifier identifies an Electronic Product Code (EPC).

Optionally, the identifier further identifies a digital signature for the unique identity.

Optionally, the identifier comprises second data disposed on or in a surface of the object.

Optionally, the first and second coded data are disposed on the same surface of the object.

Optionally, the second coded data comprises a barcode.

Optionally, the barcode is a linear barcode or a two-dimensional barcode.

Optionally, the first coded data is printed with a first ink and the second coded data is printed with a second ink, wherein the first and second inks may be the same or different from each other.

Optionally, the first ink is substantially invisible to the unaided human eye and the second ink is visible to the unaided human eye.

Optionally, at least a portion of the first coded data is coincident with the second coded data.

Optionally, the first coded data further identifies a flag for distinguishing the first coded data from the second coded data.

Optionally, the first coded data further identifies a layout of at least one interactive element associated with the surface.

Optionally, the layout is identified by a layout number, and one layout number is associated with a plurality of objects Optionally, the object is a consumer product item and the first coded data further identifies a product class.

Optionally, the product class is identified by a product class number and/or a manufacturer number.

Optionally, the product class is identified by a Universal Product Code (UPC).

Optionally, the first coded data further identifies the unique identity of the object.

Optionally, the identifier comprises an RFID tag.

Optionally, the identifier comprises a random pattern disposed on or in a surface of the object, said random pattern defining at least one fingerprint for the object.

Optionally, the random pattern is defined by a taggant randomly dispersed in ink printed on the surface.

In a third aspect the present invention provides an object comprising first coded data disposed on or in a surface thereof and an RFID tag, said first coded data identifying a plurality of locations on the surface and said RFID tag identifying a unique identity of the object.

Optionally, the RFID tag identifies a serial number.

Optionally, the RFID tag identifies an Electronic Product Code (EPC).

Optionally, the RFID tag further identifies a digital signature for the unique identity.

Optionally, the digital signature is a public key signature.

Optionally, the digital signature is a random signature.

Optionally, the digital signature is a secret-key digital signature.

Optionally, the RFID tag is disposed on a same or different surface of the object relative to the coded data.

Optionally, the first coded data further identifies a layout of at least one interactive element associated with the surface.

Optionally, the RFID tag further identifies a layout of at least one interactive element associated with the surface.

Optionally, the layout is identified by a layout number, and one layout number is associated with a plurality of objects Optionally, the object is a consumer product item and the first coded data further identifies a product class.

Optionally, the product class is identified by a product class number and/or a manufacturer number.

Optionally, the product class is identified by a Universal Product Code (UPC).

Optionally, the first coded data further identifies the unique identity of the object.

In a further aspect there is provided a data reader for interacting with an object, said object comprising first coded data disposed on or in a surface thereof and an RFID tag, said first coded data identifying a plurality of locations on the surface and said RFID tag identifying a unique identity of the object, said data reader comprising:
- an optical sensor for sensing at least some of the first coded data;
- an RFID transceiver for sensing the RFID tag;
- a processor for generating indicating data using the sensed coded data and the sensed RFID tag, said indicating data identifying a position of the data reader relative to the surface and a unique identity of the object; and
- means for communicating the indicating data to a computer system.

In another aspect there is provided a data reader which is selected from any one of the group comprising: a fixed scanner; a handheld scanner; a mobile phone; a pen; a stylus; and a personal digital assistant.

In another aspect the present invention provides a system for interacting with an object, said system comprising:
- an object comprising first coded data disposed on or in a surface thereof and an RFID tag, said first coded data identifying a plurality of locations on the surface and said RFID tag identifying a unique identity of the object; and
- a data reader comprising:
  - an optical sensor for sensing at least some of the first coded data;

an RFID transceiver for sensing the RFID tag;
a processor for generating indicating data using the sensed coded data and the sensed RFID tag, said indicating data identifying a position of the data reader relative to the surface and a unique identity of the object; and
means for communicating the indicating data to a computer system.

In a further aspect the present invention provides a method of interacting with an object, said object comprising first coded data disposed on or in a surface thereof and an RFID tag, said first coded data identifying a plurality of locations on the surface and said RFID tag identifying a unique identity of the object, said method comprising the steps of:
sensing at least some of the first coded data;
sensing the RFID tag;
generating indicating data using the sensed coded data and sensed RFID tag, said indicating data identifying a position of the data reader relative to the surface and a unique identity of the object; and
communicating the indicating data to a computer system.

In a fourth aspect the present invention provides an object comprising first coded data and a random pattern disposed on or in a surface thereof, said first coded data identifying a plurality of fiducials on the surface and said random pattern defining at least one fingerprint for the object.

Optionally, the or each fingerprint identifies an object identity.

Optionally, the or each fingerprint identifies a serial number.

Optionally, the or each fingerprint identifies an Electronic Product Code (EPC).

Optionally, the random pattern is defined by a taggant randomly dispersed in ink printed on the surface.

Optionally, the fiducials are all distinct from each other.

Optionally, each fiducial identifies a unique location on the surface.

Optionally, the first coded data further identifies a layout of at least one interactive element associated with the surface.

Optionally, the layout is identified by a layout number, and one layout number is associated with a plurality of objects Optionally, the object is a consumer product item and the first coded data further identifies a product class.

Optionally, the product class is identified by a product class number and/or a manufacturer number.

Optionally, the product class is identified by a Universal Product Code (UPC).

Optionally, the first coded data further identifies a unique identity of the object.

In a further aspect the present invention provides a data reader for interacting with an object, said object comprising first coded data and a random pattern disposed on or in a surface thereof, said first coded data identifying a plurality of fiducials on the surface and said random pattern defining at least one fingerprint for the object, said data reader comprising:
a first optical sensor for sensing at least some of the first coded data;
a second optical sensor for sensing at least some of the random pattern;
a processor configured for generating fingerprint data using the sensed coded data and the sensed random pattern, said fingerprint data identifying at least some of the random pattern and at least one fiducial; and
communication means configured for communicating the fingerprint data to a computer system.

Optionally, the first and second optical sensors are the same optical sensor or different optical sensors.

In another aspect the present invention provides a data reader which is selected from any one of the group comprising: a fixed scanner; a handheld scanner; a mobile phone; a pen; a stylus; and a personal digital assistant.

In another aspect the present invention provides a system for interacting with an object, said system comprising:
an object comprising first coded data and a random pattern disposed on or in a surface thereof, said first coded data identifying a plurality of fiducials on the surface and said random pattern defining at least one fingerprint for the object; and
a data reader comprising:
a first optical sensor for sensing at least some of the first coded data;
a second optical sensor for sensing at least some of the random pattern;
a processor configured for generating fingerprint data using the sensed coded data and the sensed random pattern, said fingerprint data identifying at least some of the random pattern and at least one fiducial; and
communication means configured for communicating the fingerprint data to a computer system.

In another aspect the present invention provides a system for identifying an object, said object comprising first coded data and a random pattern disposed on or in a surface thereof, said first coded data identifying a plurality of fiducials on the surface and said random pattern defining at least one fingerprint for the object, said system comprising a computer system configured for:
receiving fingerprint data from a data reader interacting with the surface, said fingerprint data identifying at least some of the random pattern and at least one fiducial; and
identifying in the computer system, using the fingerprint data, an object identity.

In another aspect the present invention provides a system for authenticating an object, said object comprising first coded data and a random pattern disposed on or in a surface thereof, said first coded data identifying a plurality of fiducials on the surface and said random pattern defining at least one fingerprint for the object, said system comprising a computer system configured for:
receiving fingerprint data from a data reader interacting with the surface, said fingerprint data identifying at least some of the random pattern and at least one fiducial;
identifying, using the fingerprint data, an object identity; and
authenticating the object using the object identity.

Optionally, the computer system is configured for:
identifying a reference fingerprint using the fingerprint data; and
retrieving an object identity corresponding to the reference fingerprint identified.

Optionally, the reference fingerprint comprises a plurality of random marks positioned relative to at least one fiducial.

Optionally, the first coded data further identifies a product class, and the computer system is configured for:
receiving indicating data from the data reader, said indicating data identifying the product class;
identifying, using the fingerprint data and the indicating data, the object identity.

In another aspect the present invention provides a method of recording at least one reference fingerprint for an object, said object having a unique object identity and comprising first coded data and a random pattern disposed on or in a surface thereof, said first coded data identifying a plurality of fiducials on the surface, said method comprising the steps of:

sensing and recording the first coded data and the random pattern;

determining at least one reference fingerprint for the object, the or each reference fingerprint comprising at least a portion of the recorded random pattern and at least one fiducial corresponding to said portion;

associating the object identity with the or each reference fingerprint.

In another aspect the present invention provides a method of interacting with an object, said object comprising first coded data and a random pattern disposed on or in a surface thereof, said first coded data identifying a plurality of fiducials on the surface and said random pattern defining at least one fingerprint for the object, said method comprising the steps of:

sensing at least some of the first coded data;

sensing at least some of the random pattern;

generating fingerprint data using the sensed coded data and the sensed random pattern, said fingerprint data identifying at least some of the random pattern and at least one fiducial; and communicating the fingerprint data to a computer system.

In another aspect the present invention provides a method of identifying an object, said object comprising first coded data and a random pattern disposed on or in a surface thereof, said first coded data identifying a plurality of fiducials on the surface and said random pattern defining at least one fingerprint for the object, said method comprising the steps of:

receiving, in a computer system, fingerprint data from a data reader interacting with the surface, said fingerprint data identifying at least some of the random pattern and at least one fiducial; and identifying in the computer system, using the fingerprint data, an object identity.

In another aspect the present invention provides a method of authenticating an object, said object comprising first coded data and a random pattern disposed on or in a surface thereof, said first coded data identifying a plurality of fiducials on the surface and said random pattern defining at least one fingerprint for the object, said method comprising the steps of:

receiving, in a computer system, fingerprint data from a data reader interacting with the surface, said fingerprint data identifying at least some of the random pattern and at least one fiducial;

identifying in the computer system, using the fingerprint data, an object identity; and authenticating the object using the object identity.

In a fifth aspect the present invention provides a method of authenticating an object comprising an identifier, said method comprising the steps of:

reading the identifier using a data reader to generate identity data;

sending an authentication request from the data reader to a computer system, said request comprising the identity data;

receiving, in the data reader, an authentication message from the computer system, said authentication message comprising an indication of authenticity, a description of an object associated with the identity data and a digital signature of the authentication message;

verifying the digital signature; and conveying the description of the object to a user if the signature is valid.

Optionally, the identifier comprises or is contained in any one of: coded data disposed in or on a surface of the object; an RFID tag; a linear barcode; a 2D barcode.

Optionally, the identifier comprises one of a plurality of tags disposed on or in a surface of the object, each tag containing coded data identifying the object identity.

Optionally, each tag identifies its own location on the surface.

Optionally, the digital signature is a public-key signature.

Optionally, the public-key signature was generated using a private key associated with the manufacturer of the object.

Optionally, the signature is verified using a public key associated with the private key.

Optionally, the data reader obtains the public key from a certificate.

Optionally, the certificate is associated with the manufacturer or a certificate authority.

Optionally, the authentication message identifies the manufacturer.

Optionally, the data reader verifies the certificate.

Optionally, the certificate includes a description of the manufacturer.

Optionally, the data reader conveys the description of the manufacturer to the user.

Optionally, the description of the object comprises at least one of:

an identity of the object;

a name or description of a manufacturer of the object;

a manufacturing date/time of the object;

a selling date/time of the object;

a sold status of the object;

a purchased status of the object; and a pedigree of the object.

Optionally, the description of the object is conveyed to the user visually on a display or audibly.

Optionally, the authentication request comprises a nonce generated by the data reader.

Optionally, the authentication message comprises the nonce.

In another aspect the present invention provides a method of authenticating an object comprising an identifier, said method comprising the steps of:

receiving, in a computer system, an authentication request from a data reader, said request comprising identity data generated by reading the identifier;

sending, to the data reader, an authentication message from the computer system, said authentication message comprising an indication of authenticity, a description of an object associated with the identity data and a digital signature of the authentication message, thereby allowing the data reader to verify the digital signature and convey the description of the object to a user if the signature is valid.

In another aspect the present invention provides a data reader for authenticating an object comprising an identifier, said data reader being configured for:

reading the identifier to generate identity data;

sending an authentication request from the data reader to a computer system, said request comprising the identity data;

receiving an authentication message from the computer system, said authentication message comprising an indication of authenticity, a description of an object associated with the identity data and a digital signature of the authentication message;

verifying the digital signature; and
conveying the description of the object to a user if the signature is valid.

In another aspect the present invention provides a data reader which is a mobile phone.

In another aspect the present application provides a system for authenticating an object, said system comprising an object comprising an identifier and a data reader configured for:
reading the identifier to generate identity data;
sending an authentication request from the data reader to a computer system, said request comprising the identity data;
receiving an authentication message from the computer system, said authentication message comprising an indication of authenticity, a description of an object associated with the identity data and a digital signature of the authentication message;
verifying the digital signature; and
conveying the description of the object to a user if the signature is valid.

In another aspect the present application provides a system for authenticating an object comprising an identifier, said system comprising a computer system configured for:
receiving an authentication request from a data reader, said request comprising identity data generated by reading the identifier;
sending, to the data reader, an authentication message, said authentication message comprising an indication of authenticity, a description of an object associated with the identity data and a digital signature of the authentication message,
thereby allowing the data reader to verify the digital signature and convey the description of the object to a user if the signature is valid.

In a sixth aspect the present invention provides an object comprising:
a first identifier identifying a unique object identity;
a second identifier identifying a first digital signature for the identity; and
a mask for masking at least one of the first identifier and the second identifier, wherein the at least one masked identifier is readable only when said mask has been removed.

Optionally, only the first identifier is masked.
Optionally, only the second identifier is masked.
Optionally, both the first and second identifiers are masked.
Optionally, removal of said mask provides a visual indication of tampering to a user.
Optionally, the mask is a scratch-off layer.
Optionally, the object is packaged, the mask being provided by packaging for the object.
Optionally, the at least one masked identifier comprises coded data disposed on or in a surface of the object.
Optionally, the coded data is contained in a linear barcode, a 2D barcode or a plurality of printed tags.
Optionally, the mask is opaque.
Optionally, the coded data is disposed on an inside surface of packaging for the object.
Optionally, the at least one masked identifier comprises an RFID tag.
Optionally, the mask is radiopaque.
Optionally, the first digital signature is selected from any one of: a public-key digital signature; a secret-key digital signature; and a random number.

In a further aspect the object further comprises a third identifier for use in supply chain events.
Optionally, said third identifier identifies a second digital signature for the identity.

Optionally, the first and second digital signatures are different.
Optionally, said third identifier further identifies the unique identity of the object.
Optionally, the first identifier identifies an Electronic Product Code (EPC).

In a further aspect the present invention provides a method of registering a scan event for an object with a computer system, said object comprising a first identifier identifying a unique object identity, a second identifier identifying a first digital signature for the identity and a mask for masking at least one of the first identifier and the second identifier, said method comprising the steps of:
removing the mask;
reading the first and second identifiers;
generating registration data identifying the object identity and the first digital signature; and
sending the registration data to the computer system.

Optionally, the scan event is used to register the object as purchased.
Optionally, the registration data further identifies a purchaser identity.
Optionally, purchaser identity data is contained in a data reader used to read the identifier.

In a further aspect the present invention provides a method of authenticating an object comprising an identifier and a mask for the identifier, said method comprising the steps of:
removing the mask;
reading the identifier using a data reader to generate identity data;
sending an authentication request from the data reader to a computer system, said request comprising the identity data;
receiving, in the data reader, an authentication message from the computer system, said authentication message comprising an indication of authenticity; and
conveying the indicated authenticity to a user.

Optionally, the authentication message comprises a description of an object associated with the identity data and a digital signature, said method comprising the further steps of:
verifying the digital signature; and
conveying the description of the object to a user if the signature is valid.

In a seventh aspect the present invention provides a method of transacting objects, each object comprising an identifier identifying an object identity,
said method comprising, in a computer system, the steps of:
receiving transaction data from a data reader, said transaction data identifying the object identity;
identifying a transaction history for the object identity;
determining whether the object identity has been transacted in a previous transaction; and either:
(i) allowing the transaction and updating the transaction history in the event that the object identity has not been previously transacted, or
(ii) sending transaction history data to the data reader in the event that the object identity has been previously transacted.

Optionally, the transaction history data identifies at least one previous transaction of the object identity.
Optionally, the transaction history data enables a user to conclude that the object is second-hand or the identifier is a duplicate.
Optionally, the transaction history data identifies when the previous transaction was made.

Optionally, the transaction history data identifies where the previous transaction was made.

Optionally, the transaction history data identifies a data reader used for recording the previous transaction.

Optionally, the transaction history data identifies a user to whom ownership of the object identity is recorded.

Optionally, recordal of ownership is allowable only once in the transaction history for each object identity.

Optionally, recordal of ownership is allowable only after an initial purchasing transaction in the transaction history.

Optionally, the object comprises an interactive element specifically for recording ownership.

Optionally, the interactive element is masked by a tamper-proof mechanism.

Optionally, the transaction data identifies a user identity, said user identity being contained in the data reader.

Optionally, the transaction history records ownership of the object identity with the user identity, in the event that the object identity has not been previously transacted Optionally, the identifier comprises or is contained in any one of: coded data disposed in or on a surface of the object; an RFID tag; a linear barcode; a 2D barcode.

Optionally, the identifier comprises one of a plurality of tags disposed on or in a surface of the object, each tag containing coded data identifying the object identity.

Optionally, each tag identifies its own location on the surface.

Optionally, the identifier identifies a serial number and/or an Electronic Product Code (EPC).

Optionally, the identifier further identifies a digital signature for the object identity, and the transaction data identifies the digital signature.

In a further aspect there is provided a system for transacting objects, each object comprising an identifier identifying an object identity, said system comprising a computer system configured for:
  receiving transaction data from a data reader, said transaction data identifying the object identity;
  identifying a transaction history for the object identity;
  determining whether the object identity has been transacted in a previous transaction; and either:
  (i) allowing the transaction and updating the transaction history in the event that the object identity has not been previously transacted, or
  (ii) sending transaction history data to the data reader in the event that the object identity has been previously transacted.

BRIEF DESCRIPTION OF THE DRAWINGS

An example of the present invention will now be described with reference to the accompanying drawings, in which:

FIG. 7. is an example of symbol bit ordering in the unit cells of FIG. 5;

FIG. 8. is an example of the tag structure of FIG. 4 with every bit set;

FIG. 9. is an example of tag types within a tag group for the tag structure of FIG. 4;

FIG. 13. is an example of a tag and its eight immediate neighbours, each labelled with its corresponding bit index in the active area map;

FIG. 14. is an alternative example of tag types within a tag group for the tag structure of FIG. 4;

FIG. 15. is an example of continuous tiling of the tag groups of FIG. 14;

DETAILED DESCRIPTION OF SPECIFIC EMBODIMENTS

The netpage surface coding consists of a dense planar tiling of tags. Each tag encodes its own location in the plane. Each tag also encodes, in conjunction with adjacent tags, an identifier of the region containing the tag. In the netpage system, the region typically corresponds to the entire extent of the tagged surface, such as one side of a sheet of paper.

Hyperlabel is the adaptation of the netpage tags for use in unique item identification for a wide variety of applications, including security document protection, object tracking, pharmaceutical security, supermarket automation, interactive product labels, web-browsing from printed surfaces, paper based email, and many others.

Using Memjet™ digital printing technology (which is the subject of a number of pending U.S. patent applications including U.S. Ser. No. 10/407,212), Hyperlabel tags are printed over substantially an entire surface, such as a security document, bank note, or pharmaceutical packaging, using infrared (IR) ink. By printing the tags in infrared-absorptive ink on any substrate which is infra-red-reflective, the near-infrared wavelengths, and hence the tags are invisible to the human eye but are easily sensed by a solid-state image sensor with an appropriate filter. This allows machine readable information to be encoded over a large portion of the note or other surface, with no visible effect on the original note text or graphics thereon. A scanning laser or image sensor can read the tags on any part of the surface to performs associated actions, such as validating each individual note or item.

Figure 1:
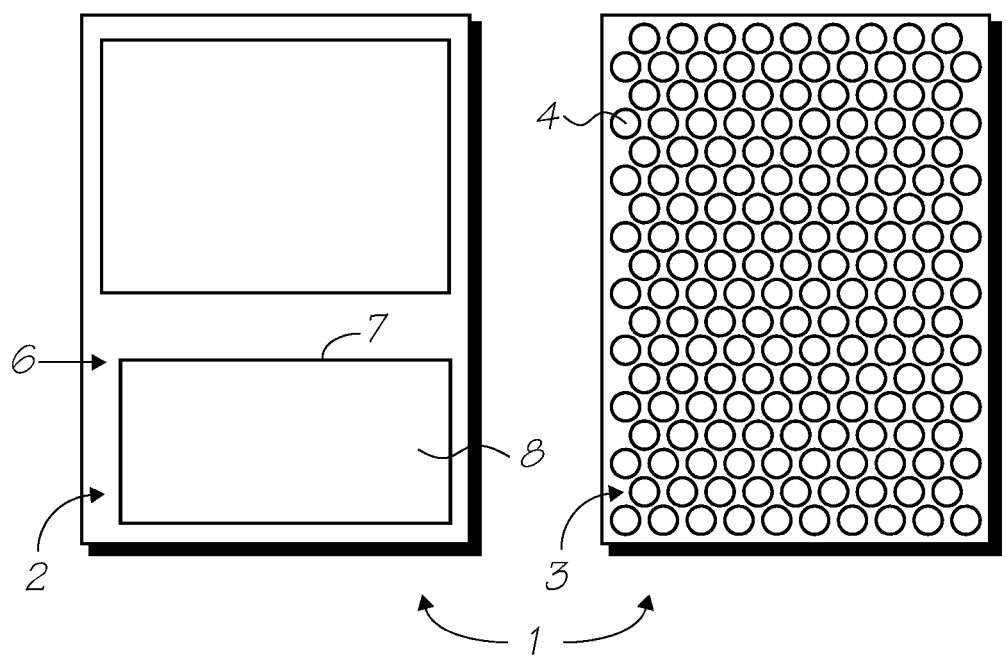
FIG. 1 is an example of a document including Hyperlabel encoding.

An example of such a Hyperlabel encoded document, is shown in FIG. 1. In this example, the Hyperlabel document consists of graphic data 2 printed using visible ink, and coded data 3 formed from Hyperlabel tags 4. The document includes an interactive element 6 defined by a zone 7 which corresponds to the spatial extent of a corresponding graphic 8. In use, the tags encode tag data including an ID. By sensing at least one tag, and determining and interpreting the encoded ID using an appropriate system, this allows the associated actions to be performed.

In one example, a tag map is used to define a layout of the tags on the Hyperlabel document based on the ID encoded within the tag data. The ID can also be used to reference a document description which describes the individual elements of the Hyperlabel document, and in particular describes the type and spatial extent (zone) of interactive elements, such as a button or text field. Thus, in this example, the element 6 has a zone 7 which corresponds to the spatial extent of a corresponding graphic 8. This allows a computer system to interpret interactions with the Hyperlabel document.

In position indicating techniques, the ID encoded within the tag data of each tag allows the exact position of the tag on the Hyperlabel document to be determined from the tag map. The position can then be used to determine whether the sensed tag is positioned in a zone of an interactive element from the document description.

In object indicating techniques, the ID encoded within the tag data allows the presence of the tag in a region of the document to be determined from the tag map (the relative position of the tag within the region may also be indicated). In this case, the document description can be used to determine whether the region corresponds to the zone of an interactive element.

Figure 2:
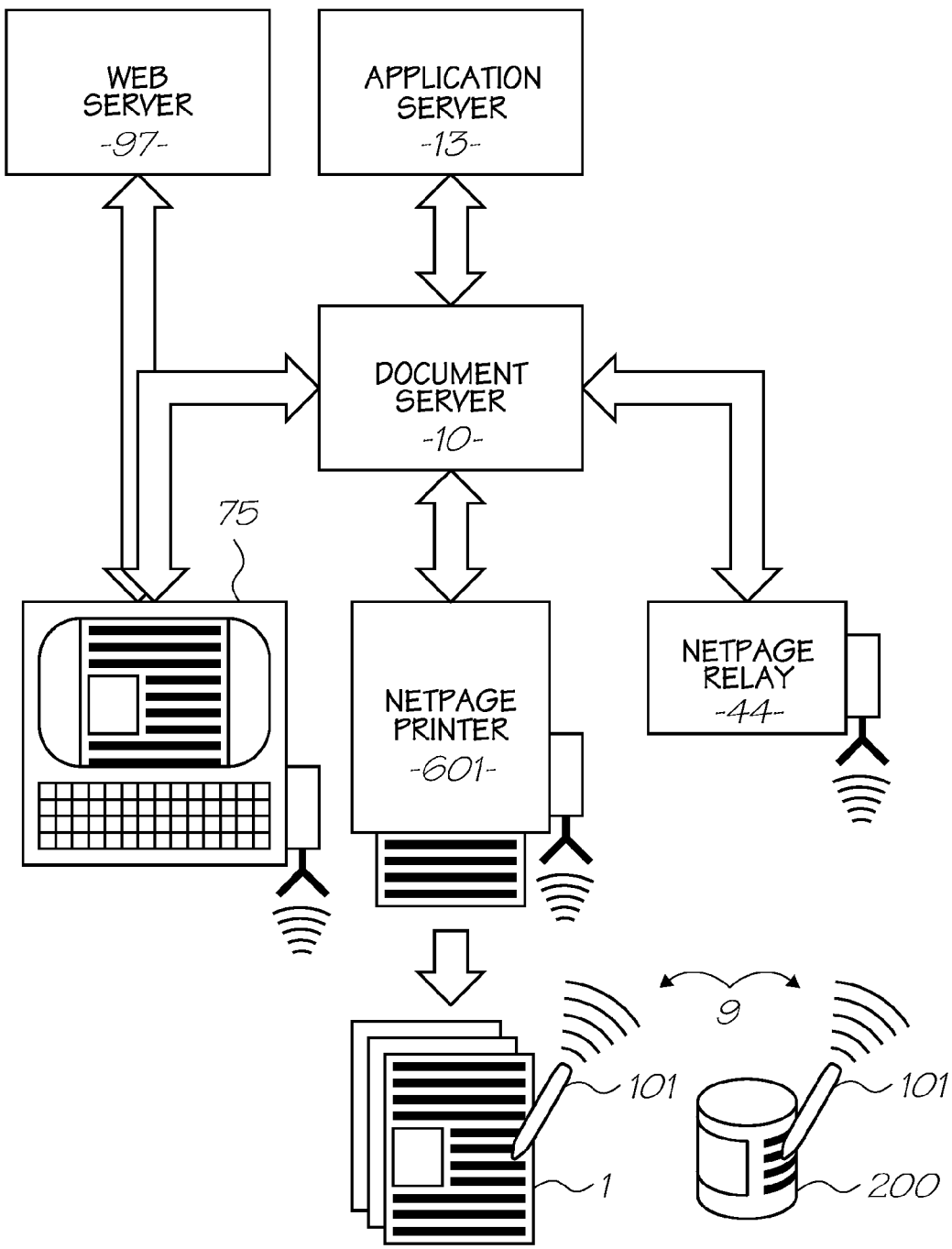
FIG. 2 is an example of a system for interacting with the Hyperlabel document of FIG. 1.
Figure 3:
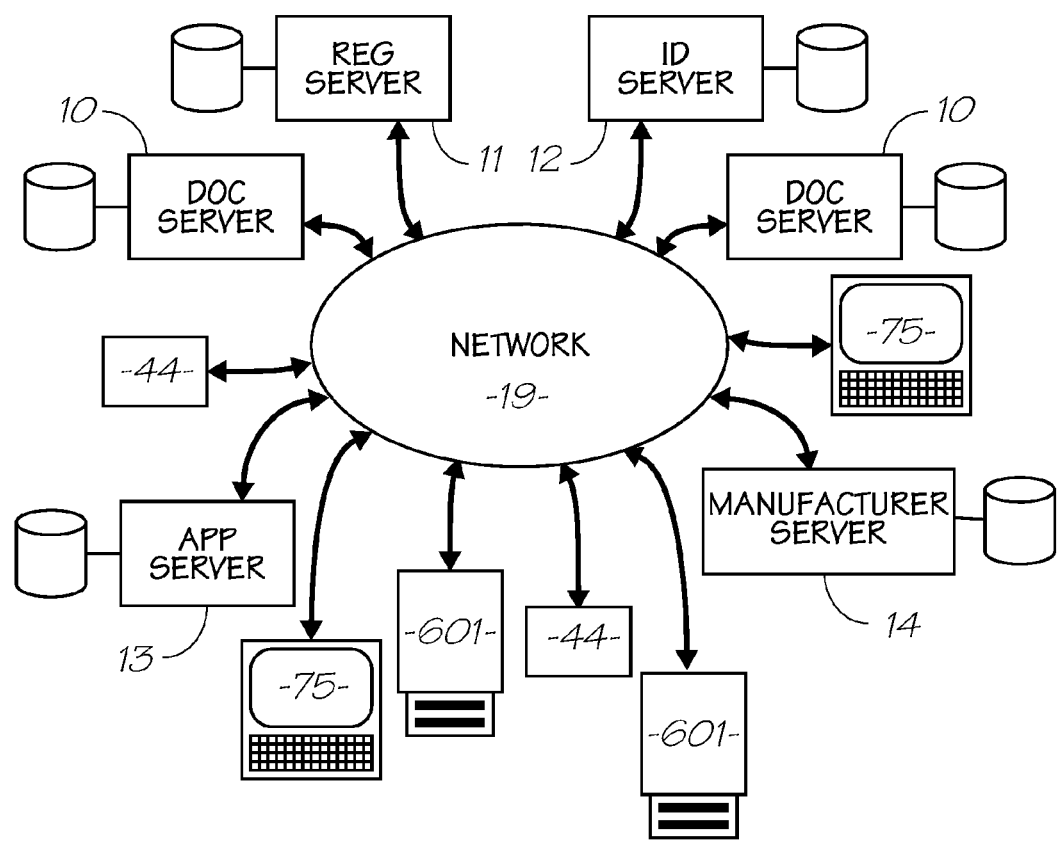
FIG. 3 is a further example of system for interacting with the Hyperlabel document of FIG. 1.

An example of this process will now be described with reference to FIGS. 2 and 3 which show how a sensing device in the form of a Netpage pen or Hyperlabel reader 101, which interacts with the coded data on a printed Hyperlabel document 1, such as a security document, label, product packaging or the like. An product item 200 carrying a Hyperlabel tags is also shown in FIG. 2.

The Hyperlabel reader 101 senses a tag using an area image sensor and detects tag data. The Hyperlabel reader 101 uses the sensed data tag to generate interaction data which is transmitted via a short-range radio link 9 to a relay 44, which may form part of a computer 75 or a printer 601. The relay sends the interaction data, via a network 19, to a document server 10, which uses the ID to access the document description, and interpret the interaction. In appropriate circumstances, the document server sends a corresponding message to an application server 13, which can then perform a corresponding action.

In an alternative embodiment, the PC, Web terminal, netpage printer or relay device may communicate directly with local or remote application software, including a local or remote Web server. Relatedly, output is not limited to being printed by the netpage printer. It can also be displayed on the PC or Web terminal, and further interaction can be screen-based rather than paper-based, or a mixture of the two.

Typically Netpage pen users register with a registration server 11, which associates the user with an identifier stored in the respective Netpage pen. By providing the sensing device identifier as part of the interaction data, this allows users to be identified, allowing transactions or the like to be performed.

Hyperlabel documents are generated by having an ID server generate an ID which is transferred to the document server 10. The document server 10 determines a document description and then records an association between the document description and the ID, to allow subsequent retrieval of the document description using the ID.

The ID is then used to generate the tag data, as will be described in more detail below, before the document is printed by the Hyperlabel printer 601, using the page description and the tag map.

Each tag is represented by a pattern which contains two kinds of elements. The first kind of element is a target. Targets allow a tag to be located in an image of a coded surface, and allow the perspective distortion of the tag to be inferred. The second kind of element is a macrodot. Each macrodot encodes the value of a bit by its presence or absence.

The pattern is represented on the coded surface in such a way as to allow it to be acquired by an optical imaging system, and in particular by an optical system with a narrowband response in the near-infrared. The pattern is typically printed onto the surface using a narrowband near-infrared ink.

In the Hyperlabel system the region typically corresponds to the surface of an entire product item, or to a security document, and the region ID corresponds to the unique item ID. For clarity in the following discussion we refer to items and item IDs (or simply IDs), with the understanding that the item ID corresponds to the region ID.

The surface coding is designed so that an acquisition field of view large enough to guarantee acquisition of an entire tag is large enough to guarantee acquisition of the ID of the region containing the tag. Acquisition of the tag itself guarantees acquisition of the tag's two-dimensional position within the region, as well as other tag-specific data. The surface coding therefore allows a sensing device to acquire a region ID and a tag position during a purely local interaction with a coded surface, e.g. during a "click" or tap on a coded surface with a pen.

A wide range of different tag structures can be used, and some examples will now be described.

First Example Tag Structure

Figure 4:
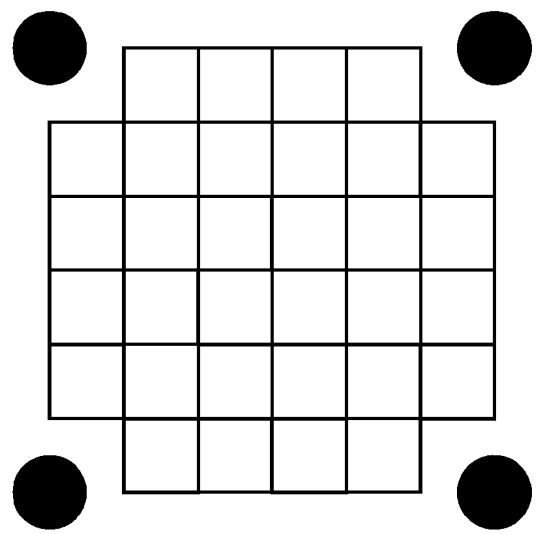
FIG. 4. is a first example of a tag structure.

FIG. 4 shows the structure of a complete tag. Each of the four black circles is a target. The tag, and the overall pattern, has four-fold rotational symmetry at the physical level.

Each square region represents a symbol, and each symbol represents four bits of information.

Figure 5:
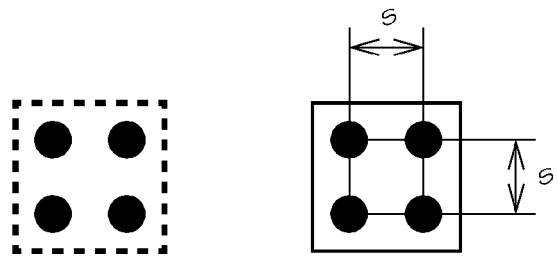
FIG. 5. is an example of a symbol unit cell for the tag structure of FIG. 4.

FIG. 5 shows the structure of a symbol. It contains four macrodots, each of which represents the value of one bit by its presence (one) or absence (zero).

The macrodot spacing is specified by the parameter s throughout this document. It has a nominal value of 143 µm, based on 9 dots printed at a pitch of 1600 dots per inch. However, it is allowed to vary by ±10% according to the capabilities of the device used to produce the pattern.

Figure 6:
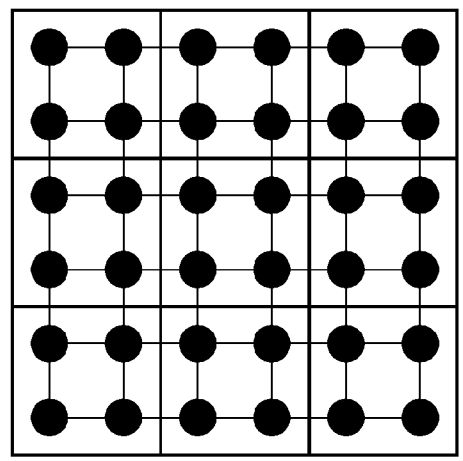
FIG. 6. is an example of an array of the symbol unit cells of FIG. 5.

FIG. 6 shows an array of nine adjacent symbols. The macrodot spacing is uniform both within and between symbols.

FIG. 7 shows the ordering of the bits within a symbol. Bit zero is the least significant within a symbol; bit three is the most significant. Note that this ordering is relative to the orientation of the symbol. The orientation of a particular symbol within the tag is indicated by the orientation of the label of the symbol in the tag diagrams. In general, the orientation of all symbols within a particular segment of the tag have the same orientation, consistent with the bottom of the symbol being closest to the centre of the tag.

Only the macrodots are part of the representation of a symbol in the pattern. The square outline of a symbol is used in this document to more clearly elucidate the structure of a tag. FIG. 8, by way of illustration, shows the actual pattern of a tag with every bit set. Note that, in practice, every bit of a tag can never be set.

A macrodot is nominally circular with a nominal diameter of (5/9)s. However, it is allowed to vary in size by ±10% according to the capabilities of the device used to produce the pattern.

A target is nominally circular with a nominal diameter of (17/9)s. However, it is allowed to vary in size by ±10% according to the capabilities of the device used to produce the pattern.

The tag pattern is allowed to vary in scale by up to ±10% according to the capabilities of the device used to produce the pattern. Any deviation from the nominal scale is recorded in the tag data to allow accurate generation of position samples.

Each symbol shown in the tag structure in FIG. 4 has a unique label. Each label consists of an alphabetic prefix and a numeric suffix.

Tag Group

Tags are arranged into tag groups. Each tag group contains four tags arranged in a square. Each tag therefore has one of four possible tag types according to its location within the tag group square. The tag types are labelled 00, 10, 01 and 11, as shown in FIG. 9.

Figures 10, 11, 12:
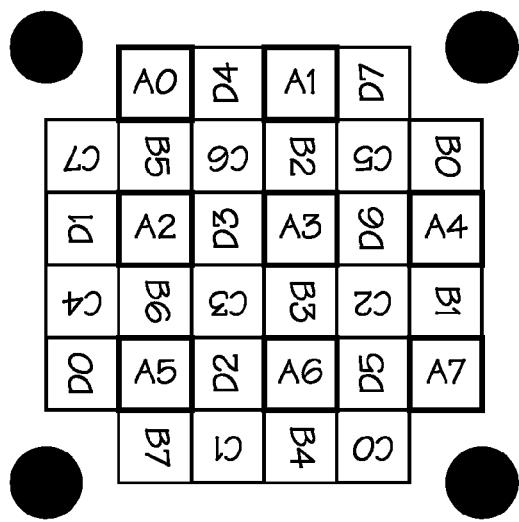
FIG. 10. is an example of continuous tiling of the tag groups of FIG. 9.
FIG. 11 is an example of interleaved codewords for the tag structure of FIG. 4.
FIG. 12 is an example of a code word for the tag structure of FIG. 4.

FIG. 10 shows how tag groups are repeated in a continuous tiling of tags. The tiling guarantees the any set of four adjacent tags contains one tag of each type.

Codewords

The tag contains four complete codewords. Each codeword is of a punctured $2^4$-ary (8,5) Reed-Solomon code.

Two of the codewords are unique to the tag. These are referred to as local and are labelled A and B. The tag therefore encodes up to 40 bits of information unique to the tag.

The remaining two codewords are unique to a tag type, but common to all tags of the same type within a contiguous tiling of tags. These are referred to as global and are labelled C and D, subscripted by tag type. A tag group therefore encodes up to 160 bits of information common to all tag groups within a contiguous tiling of tags.

The layout of the four codewords is shown in FIG. 11.

Reed-Solomon Encoding

Codewords are encoded using a punctured $2^4$-ary (8,5) Reed-Solomon code.

A $2^4$-ary (8,5) Reed-Solomon code encodes 20 data bits (i.e. five 4-bit symbols) and 12 redundancy bits (i.e. three 4-bit symbols) in each codeword. Its error-detecting capacity is three symbols. Its error-correcting capacity is one symbol.

As shown in FIG. 12, codeword coordinates are indexed in coefficient order, and the data bit ordering follows the codeword bit ordering.

A punctured $2^4$-ary (8,5) Reed-Solomon code is a $2^4$-ary (15,5) Reed-Solomon code with seven redundancy coordinates removed. The removed coordinates are the most significant redundancy coordinates.

The code has the following primitive polynominal:

$$p(x)=x^4+x+1$$

The code has the following generator polynominal:

$$g(x)=(x+\alpha)(x+\alpha^2)\ldots(x+\alpha^{10})$$

For a detailed description of Reed-Solomon codes, refer to Wicker, S. B. and V. K. Bhargava, eds., *Reed-Solomon Codes and Their Applications*, IEEE Press, 1994.

Tag Coordinate Space

The tag coordinate space has two orthogonal axes labelled x and y respectively. When the positive x axis points to the right then the positive y axis points down.

The surface coding does not specify the location of the tag coordinate space origin on a particular tagged surface, nor the orientation of the tag coordinate space with respect to the surface. This information is application-specific. For example, if the tagged surface is a sheet of paper, then the application which prints the tags onto the paper may record the actual offset and orientation, and these can be used to normalise any digital ink subsequently captured in conjunction with the surface.

The position encoded in a tag is defined in units of tags. By convention, the position is taken to be the position of the centre of the target closest to the origin.

Tag Information Content

Table 1 defines the information fields embedded in the surface coding. Table 2 defines how these fields map to codewords.

TABLE 1

Field definitions

| Field | width | description |
|---|---|---|
| per codeword | | |
| codeword type | 2 | The type of the codeword, i.e. one of A (b'00'), B (b'01'), C (b'10') and D (b'11'). |
| per tag | | |
| tag type | 2 | The type of the tag, i.e. one of 00 (b'00'), 01 (b'01'), 10 (b'10') and 11 (b'11') - corresponds to the bottom two bits of the x and y coordinates of the tag. |
| x coordinate | 13 | The unsigned x coordinate of the tag allows a maximum coordinate value of approximately 14 m. |
| y coordinate | 13 | The unsigned y coordinate of the tag$^b$. |
| active area flag | 1 | A flag indicating whether the tag is a member of an active area. b'1' indicates membership. |
| active area map flag | 1 | A flag indicating whether an active area map is present. b'1' indicates the presence of a map (see next field). If the map is absent then the value of each map entry is derived from the active area flag (see previous field). |
| active area map | 8 | A map[1] of which of the tag's immediate eight neighbours are members of an active area. b'1' indicates membership (FIG. 13 indicates the bit ordering of the map) |
| data fragment | 8 | A fragment of an embedded data stream. Only present if the active area map is absent. |
| per tag group | | |
| encoding format | 8 | The format of the encoding. 0: the present encoding Other values are TBA. |
| Region flags | 8 | Flags controlling the interpretation and routing of region-related information. 0: region ID is an EPC 1: region is linked 2: region is interactive 3: region is signed 4: region includes data 5: region relates to mobile application Other bits are reserved and must be zero. |

TABLE 1-continued

Field definitions

| Field | width | description |
|---|---|---|
| tag size adjustment | 16 | The difference between the actual tag size and the nominal tag size (1.7145 mm (based on 1600dpi, 9 dots per macrodot, and 12 macrodots per tag)), in 10 nm units, in sign-magnitude format. |
| Region ID | 96 | The ID of the region containing the tags. |
| CRC | 16 | A CRC of tag group data (CCITT CRC-16 (ITU, Interface between Data Terminal Equipment (DTE) and Data Circuit-terminating Equipment (DCE) for terminals operating in the packet mode and connected to public data networks by dedicated circuit, ITU-T X.25 (10/96)) |
| Total | 320 | |

The active area map indicates whether the corresponding tags are members of an active area. An active area is an area within which any captured input should be immediately forwarded to the corresponding Hyperlabel server for interpretation. It also allows the Hyperlabel sensing device to signal to the user that the input will have an immediate effect.

TABLE 2

Mapping of fields to codewords

| codeword | codeword bits | field | Width | field bits |
|---|---|---|---|---|
| A | 1:0 | codeword type (b'00') | 2 | all |
| | 10:2 | x coordinate | 9 | 12:4 |
| | 19:11 | Y coordinate | 9 | 12:4 |
| B | 1:0 | codeword type (b'01') | 2 | all |
| | 2 | tag type | 1 | 0 |
| | 5:2 | x coordinate | 4 | 3:0 |
| | 6 | tag type | 1 | 1 |
| | 9:6 | y coordinate | 4 | 3:0 |
| | 10 | active area flag | 1 | all |
| | 11 | active area map flag | 1 | all |
| | 19:12 | active area map | 8 | all |
| | 19:12 | data fragment | 8 | all |
| $C_{00}$ | 1:0 | codeword type (b'10') | 2 | all |
| | 9:2 | encoding format | 8 | all |
| | 17:10 | region flags | 8 | all |
| | 19:18 | tag size adjustment | 2 | 1:0 |
| $C_{01}$ | 1:0 | codeword type (b'10') | 2 | all |
| | 15:2 | tag size adjustment | 14 | 15:2 |
| | 19:16 | region ID | 4 | 3:0 |
| $C_{10}$ | 1:0 | codeword type (b'10') | 2 | all |
| | 19:2 | region ID | 18 | 21:4 |
| $C_{11}$ | 1:0 | codeword type (b'10') | 2 | all |
| | 19:2 | region ID | 18 | 39:22 |
| $D_{00}$ | 1:0 | codeword type (b'11') | 2 | all |
| | 19:2 | region ID | 18 | 57:40 |
| $D_{01}$ | 1:0 | codeword type (b'11') | 2 | all |
| | 19:2 | region ID | 18 | 75:58 |
| $D_{10}$ | 1:0 | codeword type (b'11') | 2 | all |
| | 19:2 | region ID | 18 | 93:76 |
| $D_{11}$ | 1:0 | codeword type (b'11') | 2 | all |
| | 3:2 | region ID | 2 | 95:94 |
| | 19:4 | CRC | 16 | all |

Note that the tag type can be moved into a global codeword to maximise local codeword utilization. This in turn can allow larger coordinates and/or 16-bit data fragments (potentially configurably in conjunction with coordinate precision). However, this reduces the independence of position decoding from region ID decoding and has not been included in the specification at this time.

Embedded Data

If the "region includes data" flag in the region flags is set then the surface coding contains embedded data. The data is encoded in multiple contiguous tags' data fragments, and is replicated in the surface coding as many times as it will fit.

The embedded data is encoded in such a way that a random and partial scan of the surface coding containing the embedded data can be sufficient to retrieve the entire data. The scanning system reassembles the data from retrieved fragments, and reports to the user when sufficient fragments have been retrieved without error.

As shown in Table 3, a 200-bit data block encodes 160 bits of data. The block data is encoded in the data fragments of A contiguous group of 25 tags arranged in a 5×5 square. A tag belongs to a block whose integer coordinate is the tag's coordinate divided by 5. Within each block the data is arranged into tags with increasing x coordinate within increasing y coordinate.

A data fragment may be missing from a block where an active area map is present. However, the missing data fragment is likely to be recoverable from another copy of the block.

Data of arbitrary size is encoded into a superblock consisting of a contiguous set of blocks arranged in a rectangle. The size of the superblock is encoded in each block. A block belongs to a superblock whose integer coordinate is the block's coordinate divided by the superblock size. Within each superblock the data is arranged into blocks with increasing x coordinate within increasing y coordinate.

The superblock is replicated in the surface coding as many times as it will fit, including partially along the edges of the surface coding.

The data encoded in the superblock may include more precise type information, more precise size information, and more extensive error detection and/or correction data.

TABLE 3

Embedded data block

| field | width | description |
| --- | --- | --- |
| data type | 8 | The type of the data in the superblock. Values include: 0: type is controlled by region flags 1: MIME Other values are TBA. |
| superblock width | 8 | The width of the superblock, in blocks. |
| superblock height | 8 | The height of the superblock, in blocks. |
| data | 160 | The block data. |
| CRC | 16 | A CRC of the block data. |
| total | 200 | |

Alternative First Example Tag Structure

Tag Group

Tags are arranged into tag groups. Each tag group contains four tags arranged in a square. Each tag therefore has one of four possible tag types according to its location within the tag group square. The tag types are labelled 00, 10, 01 and 11, as shown in FIG. 14.

Each tag in the tag group is rotated as shown in the figure, i.e. tag type 00 is rotated 0 degrees, tag type 10 is rotated 90 degrees, tag type 11 is rotated 180 degrees, and tag type 01 is rotated 270 degrees.

FIG. 15 shows how tag groups are repeated in a continuous tiling of tags. The tiling guarantees the any set of four adjacent tags contains one tag of each type.

Orientation-Indicating Cyclic Position Code

The tag contains a $2^4$-ary (4, 1) cyclic position codeword which can be decoded at any of the four possible orientations of the tag to determine the actual orientation of the tag. Symbols which are part of the cyclic position codeword have a prefix of "R" and are numbered 0 to 3 in order of increasing significance.

The cyclic position codeword is (0, 7, 9, $E_{16}$) Note that it only uses four distinct symbol values, even though a four-bit symbol has sixteen possible values. During decoding, any unused symbol value should, if detected, be treated as an erasure. To maximise the probability of low-weight bit error patterns causing erasures rather than symbol errors, the symbol values are chosen to be as evenly spaced on the hypercube as possible.

The minimum distance of the cyclic position code is 4, hence its error-correcting capacity is one symbol in the presence of up to one erasure, and no symbols in the presence of two or more erasures.

Figure 16:
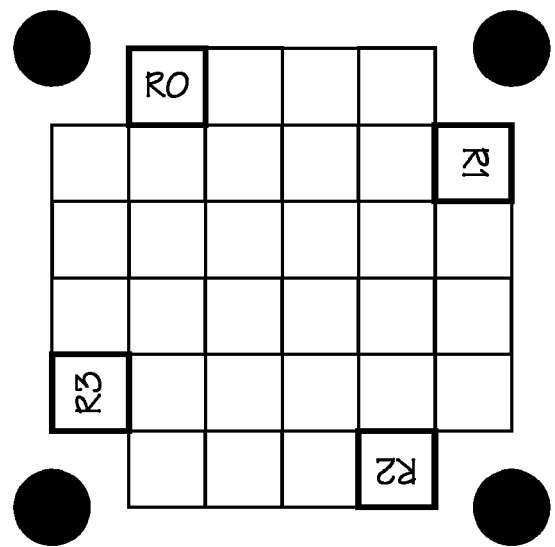
FIG. 16. is an example of the orientation-indicating cyclic position codeword R for the tag group of FIG. 14.

The layout of the orientation-indicating cyclic position codeword is shown in FIG. 16.

Local Codeword

The tag locally contains one complete codeword which is used to encode information unique to the tag. The codeword is of a punctured $2^4$-ary (13, 7) Reed-Solomon code. The tag therefore encodes up to 28 bits of information unique to the tag.

Figure 17:
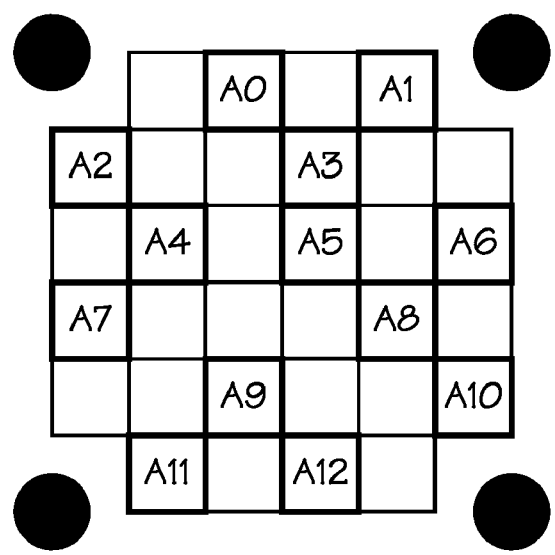
FIG. 17. is an example of a local codeword A for the tag group of FIG. 14.

The layout of the local codeword is shown in FIG. 17.

Distributed Codewords

The tag also contains fragments of four codewords which are distributed across the four adjacent tags in a tag group and which are used to encode information common to a set of contiguous tags. Each codeword is of a $2^4$-ary (15,11) Reed-Solomon code. Any four adjacent tags therefore together encode up to 176 bits of information common to a set of contiguous tags.

Figure 18:
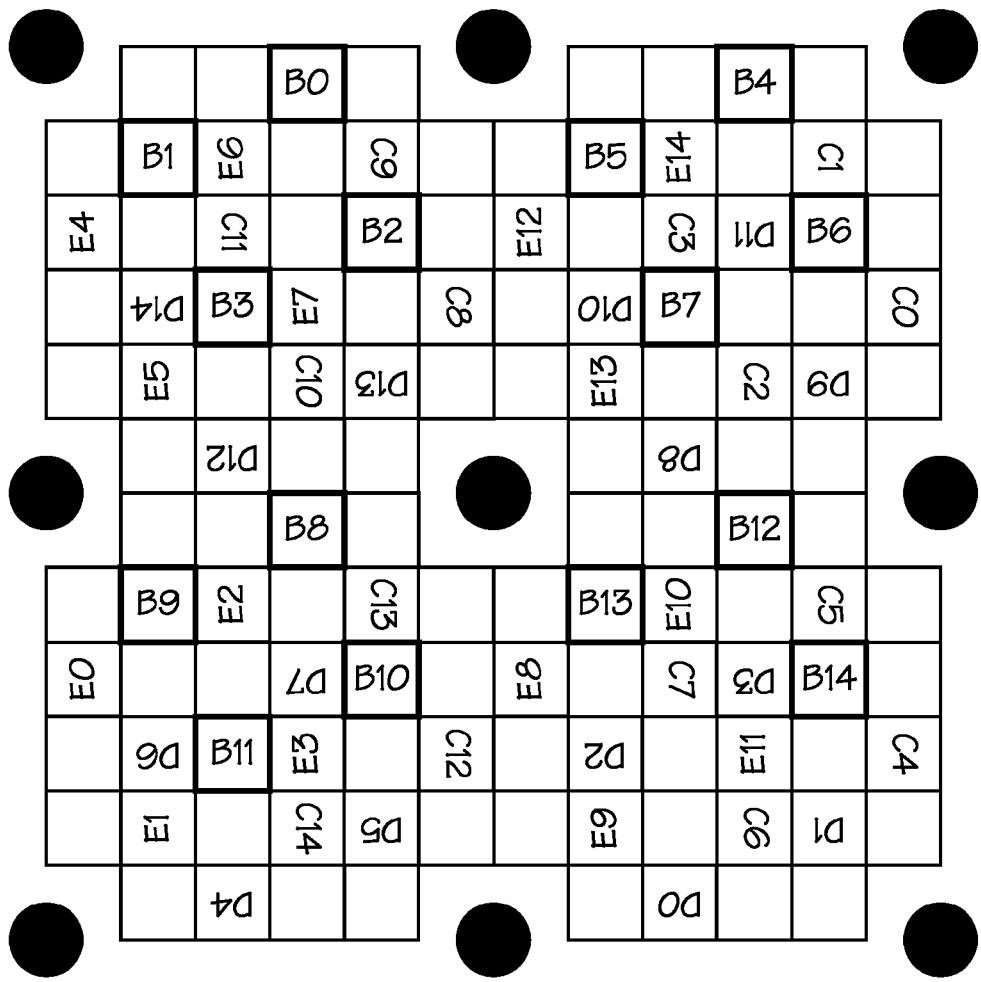
FIG. 18. is an example of distributed codewords B, C, D and E, for the tag group of FIG. 14.

The layout of the four complete codewords, distributed across the four adjacent tags in a tag group, is shown in FIG. 18. The order of the four tags in the tag group in FIG. 18 is the order of the four tags in FIG. 14.

Figures 19, 20:
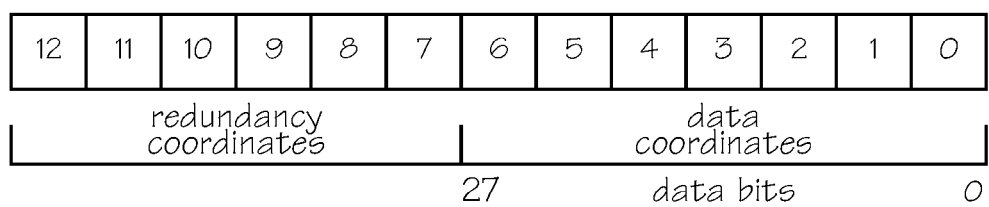
FIG. 19. is an example of a layout of complete tag group.
FIG. 20. is an example of a code word for the tag group of FIG. 14.

FIG. 19 shows the layout of a complete tag group.

Reed-Solomon Encoding—Local Codeword

The local codeword is encoded using a punctured $2^4$-ary (13, 7) Reed-Solomon code. The code encodes 28 data bits (i.e. seven symbols) and 24 redundancy bits (i.e. six symbols) in each codeword. Its error-detecting capacity is six symbols. Its error-correcting capacity is three symbols.

As shown in FIG. 20, codeword coordinates are indexed in coefficient order, and the data bit ordering follows the codeword bit ordering.

The code is a $2^4$-ary (15, 7) Reed-Solomon code with two redundancy coordinates removed. The removed coordinates are the most significant redundancy coordinates.

The code has the following primitive polynominal:

$$p(x)=x^4+x+1 \tag{EQ 1}$$

The Code has the Following Generator Polynominal:

$$g(x)=(x+\alpha)(x+\alpha^2)\ldots(x+\alpha^8) \tag{EQ 2}$$

Reed-Solomon Encoding—Distributed Codewords

The distributed codewords are encoded using a $2^4$-ary (15, 11) Reed-Solomon code. The code encodes 44 data bits (i.e. eleven symbols) and 16 redundancy bits (i.e. four symbols) in each codeword. Its error-detecting capacity is four symbols. Its error-correcting capacity is two symbols.

Codeword coordinates are indexed in coefficient order, and the data bit ordering follows the codeword bit ordering.

The code has the same primitive polynominal as the local codeword code.

The code has the following generator polynominal:

$$g(x)=(x+\alpha)(x+\alpha^2)\ldots(x+\alpha^4) \tag{EQ 3}$$

Tag Coordinate Space

The tag coordinate space has two orthogonal axes labelled x and y respectively. When the positive x axis points to the right then the positive y axis points down.

The surface coding does not specify the location of the tag coordinate space origin on a particular tagged surface, nor the orientation of the tag coordinate space with respect to the surface. This information is application-specific. For example, if the tagged surface is a sheet of paper, then the application which prints the tags onto the paper may record the actual offset and orientation, and these can be used to normalise any digital ink subsequently captured in conjunction with the surface.

The position encoded in a tag is defined in units of tags. By convention, the position is taken to be the position of the centre of the target closest to the origin.

Tag Information Content

Field Definitions

Table 4 defines the information fields embedded in the surface coding. Table 5 defines how these fields map to codewords.

TABLE 4

Field definitions

| field | width (bits) | description |
|---|---|---|
| per tag | | |
| x coordinate | 9 or 13 | The unsigned x coordinate of the tag allows maximum coordinate values of approximately 0.9 m and 14 m respectively. |
| y coordinate | 9 or 13 | The unsigned y coordinate of the tag allows maximum coordinate values of approximately 0.9 m and 14 m respectively |
| active area flag | 1 | A flag indicating whether the area (the diameter of the area, centered on the tag, is nominally 5 times the diagonal size of the tag) immediately surrounding the tag intersects an active area. b'1' indicates intersection. |
| data fragment flag | 1 | A flag indicating whether a data fragment is present (see next field). b'1' indicates the presence of a data fragment. If the data fragment is present then the width of the x and y coordinate fields is 9. If it is absent then the width is 13. |
| data fragment | 0 or 8 | A fragment of an embedded data stream. |
| per tag group (i.e. per region) | | |
| encoding format | 8 | The format of the encoding. 0: the present encoding Other values are reserved. |
| region flags | 8 | Flags controlling the interpretation of region data. 0: region ID is an EPC |

TABLE 4-continued

Field definitions

| field | width (bits) | description |
|---|---|---|
| | | 1: region has signature 2: region has embedded data 3: embedded data is signature Other bits are reserved and must be zero. |
| tag size ID | 8 | The ID of the tag size. 0: the present tag size the nominal tag size is 1.7145 mm, based on 1600dpi, 9 dots per macrodot, and 12 macrodots per tag Other values are reserved. |
| region ID | 96 | The ID of the region containing the tags. |
| signature | 36 | The signature of the region. |
| high-order coordinate width (w) | 4 | The width of the high-order part of the x and y coordinates of the tag. |
| high-order x coordinate | 0 to 15 | High-order part of the x coordinate of the tag expands the maximum coordinate values to approximately 2.4 km and 38 km respectively |
| high-order y coordinate | 0 to 15 | High-order part of the y coordinate of the tag expands the maximum coordinate values to approximately 2.4 km and 38 km respectively. |
| CRC | 16 | A CRC of tag group data. |

An active area is an area within which any captured input should be immediately forwarded to the corresponding Hyperlabel server for interpretation. This also allows the Hyperlabel server to signal to the user that the input has had an immediate effect. Since the server has access to precise region definitions, any active area indication in the surface coding can be imprecise so long as it is inclusive.

The width of the high-order coordinate fields, if non-zero, reduces the width of the signature field by a corresponding number of bits. Full coordinates are computed by prepending each high-order coordinate field to its corresponding coordinate field.

TABLE 5

Mapping of fields to codewords

| codeword | codeword bits | field | width | field bits |
|---|---|---|---|---|
| A | 12:0 | x coordinate | 13 | all |
| | 12:9 | data fragment | 4 | 3:0 |
| | 25:13 | y coordinate | 13 | all |
| | 25:22 | data fragment | 4 | 7:4 |
| | 26 | active area flag | 1 | all |
| | 27 | data fragment flag | 1 | all |
| B | 7:0 | encoding format | 8 | all |
| | 15:8 | region flags | 8 | all |
| | 23:16 | tag size ID | 8 | all |
| | 39:24 | CRC | 16 | all |
| | 43:40 | high-order coordinate width (w) | 4 | 3:0 |
| C | 35:0 | signature | 36 | all |
| | (35-w):(36-2w) | high-order x coordinate | w | all |
| | 35:(36-w) | high-order y coordinate | w | all |
| | 43:36 | region ID | 8 | 7:0 |
| D | 43:0 | region ID | 44 | 51:8 |
| E | 43:0 | region ID | 44 | 95:52 |

Embedded Data

If the "region has embedded data" flag in the region flags is set then the surface coding contains embedded data. The data is encoded in multiple contiguous tags' data fragments, and is replicated in the surface coding as many times as it will fit.

The embedded data is encoded in such a way that a random and partial scan of the surface coding containing the embedded data can be sufficient to retrieve the entire data. The scanning system reassembles the data from retrieved fragments, and reports to the user when sufficient fragments have been retrieved without error.

As shown in Table 6, a 200-bit data block encodes 160 bits of data. The block data is encoded in the data fragments of a contiguous group of 25 tags arranged in a 5×5 square. A tag belongs to a block whose integer coordinate is the tag's coordinate divided by 5. Within each block the data is arranged into tags with increasing x coordinate within increasing y coordinate.

A data fragment may be missing from a block where an active area map is present. However, the missing data fragment is likely to be recoverable from another copy of the block.

Data of arbitrary size is encoded into a superblock consisting of a contiguous set of blocks arranged in a rectangle. The size of the superblock is encoded in each block. A block belongs to a superblock whose integer coordinate is the block's coordinate divided by the superblock size. Within each superblock the data is arranged into blocks with increasing x coordinate within increasing y coordinate.

The superblock is replicated in the surface coding as many times as it will fit, including partially along the edges of the surface coding.

The data encoded in the superblock may include more precise type information, more precise size information, and more extensive error detection and/or correction data.

TABLE 6

| field | width | description |
| --- | --- | --- |
| | Embedded data block | |
| data type | 8 | The type of the data in the superblock. Values include: 0: type is controlled by region flags 1: MIME Other values are TBA. |
| superblock width | 8 | The width of the superblock, in blocks. |
| superblock height | 8 | The height of the superblock, in blocks. |
| data | 160 | The block data. |
| CRC | 16 | A CRC of the block data. |
| total | 200 | |

It will be appreciated that any form of embedded data may be used, including for example, text, image, audio, video data, such as product information, application data, contact data, business card data, and directory data.

Region Signatures

If the "region has signature" flag in the region flags is set then the signature field contains a signature with a maximum width of 36 bits. The signature is typically a random number associated with the region ID in a secure database. The signature is ideally generated using a truly random process, such as a quantum process, or by distilling randomness from random events.

In an online environment the signature can be validated, in conjunction with the region ID, by querying a server with access to the secure database.

If the "region has embedded data" and "embedded data is signature" flags in the region flags are set then the surface coding contains a 160-bit cryptographic signature of the region ID. The signature is encoded in a one-block superblock.

In an online environment any number of signature fragments can be used, in conjunction with the region ID and optionally the random signature, to validate the signature by querying a server with knowledge of the full signature or the corresponding private key.

In an offline (or online) environment the entire signature can be recovered by reading multiple tags, and can then be validated using the corresponding public signature key.

Signature verification is discussed in more detail below.

Second Example Tag Structure

Figure 21:
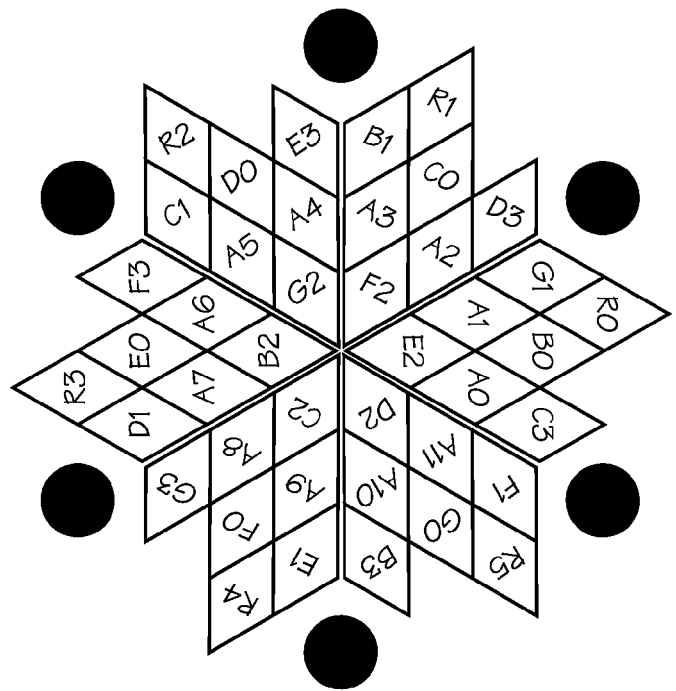
FIG. 21. is a second example of a tag structure.

FIG. 21 shows the structure of a complete tag. Each of the six black circles is a target. The tag, and the overall pattern, has six-fold rotational symmetry at the physical level.

Each diamond-shaped region represents a symbol, and each symbol represents four bits of information.

Figure 22:
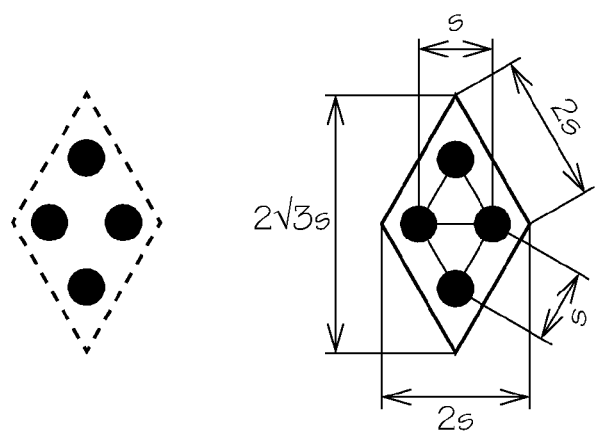
FIG. 22. is an example of a symbol unit cell for the tag structure of FIG. 21.

FIG. 22 shows the structure of a symbol. It contains four macrodots, each of which represents the value of one bit by its presence (one) or absence (zero).

The macrodot spacing is specified by the parameter s throughout this document. It has a nominal value of 143 μm, based on 9 dots printed at a pitch of 1600 dots per inch. However, it is allowed to vary by ±10% according to the capabilities of the device used to produce the pattern.

Figure 23:
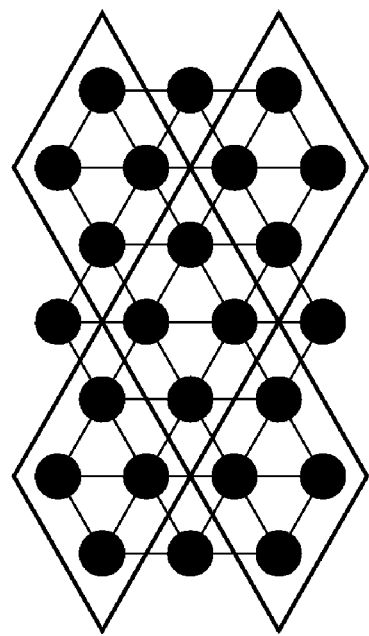
FIG. 23. is an example of an array of the symbol unit cells of FIG. 22.

FIG. 23 shows an array of five adjacent symbols. The macrodot spacing is uniform both within and between symbols.

Figure 24:
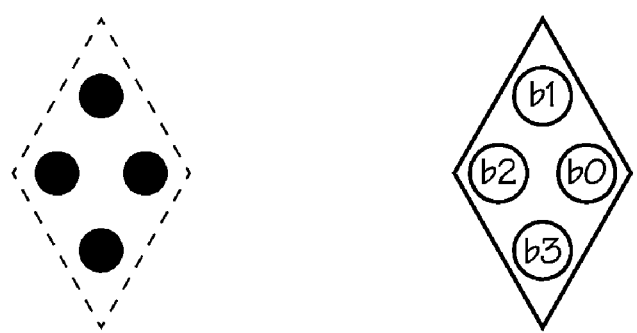
FIG. 24. is an example of symbol bit ordering in the unit cells of FIG. 22.

FIG. 24 shows the ordering of the bits within a symbol. Bit zero is the least significant within a symbol; bit three is the most significant. Note that this ordering is relative to the orientation of the symbol. The orientation of a particular symbol within the tag is indicated by the orientation of the label of the symbol in the tag diagrams. In general, the orientation of all symbols within a particular segment of the tag have the same orientation, consistent with the bottom of the symbol being closest to the centre of the tag.

Figure 25:
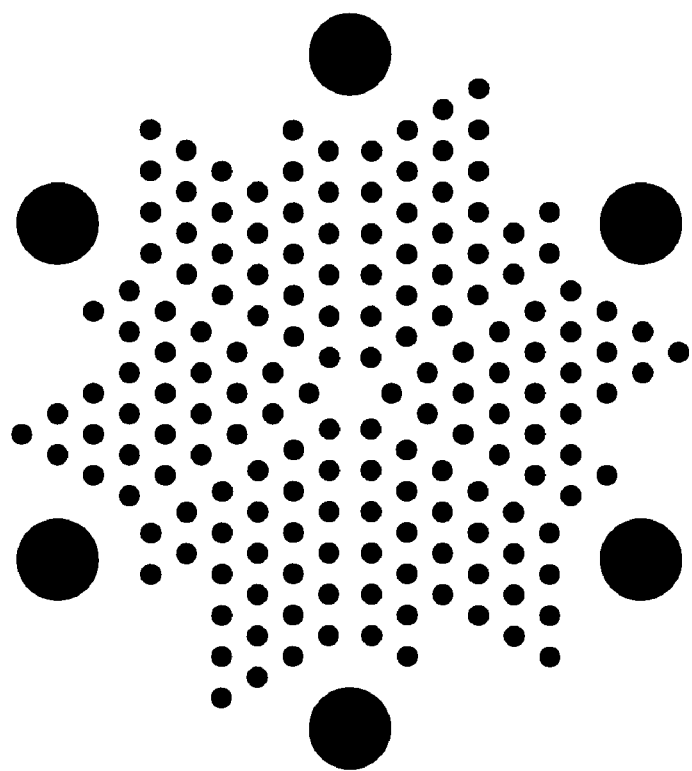
FIG. 25. is an example of the tag structure of FIG. 21 with every bit set.

Only the macrodots are part of the representation of a symbol in the pattern. The diamond-shaped outline of a symbol is used in this document to more clearly elucidate the structure of a tag. FIG. 25, by way of illustration, shows the actual pattern of a tag with every bit set. Note that, in practice, every bit of a tag can never be set.

A macrodot is nominally circular with a nominal diameter of (5/9)s. However, it is allowed to vary in size by ±10% according to the capabilities of the device used to produce the pattern.

A target is nominally circular with a nominal diameter of (17/9)s. However, it is allowed to vary in size by ±10% according to the capabilities of the device used to produce the pattern.

The tag pattern is allowed to vary in scale by up to ±10% according to the capabilities of the device used to produce the pattern. Any deviation from the nominal scale is recorded in the tag data to allow accurate generation of position samples.

Each symbol shown in the tag structure in FIG. 21 has a unique label. Each label consists an alphabetic prefix and a numeric suffix.

Tag Group

Figure 26:
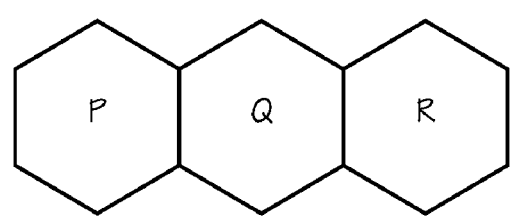
FIG. 26. is an example of tag types within a tag group for the tag structure of FIG. 21.

Tags are arranged into tag groups. Each tag group contains three tags arranged in a line. Each tag therefore has one of three possible tag types according to its location within the tag group. The tag types are labelled P, Q and R, as shown in FIG. 26.

Figure 27:
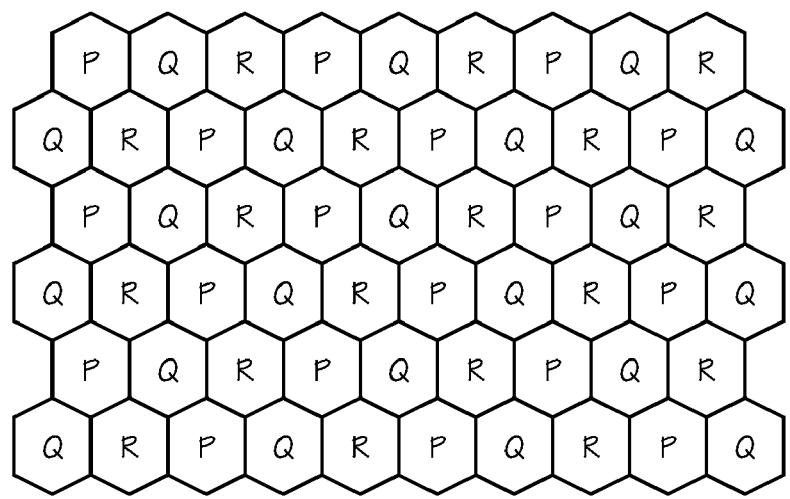
FIG. 27. is an example of continuous tiling of the tag groups of FIG. 26.

FIG. 27 shows how tag groups are repeated in a continuous tiling of tags. The tiling guarantees the any set of three adjacent tags contains one tag of each type.

Orientation-Indicating Cyclic Position Code

The tag contains a $2^3$-ary (6,1) cyclic position codeword (this work is currently the subject of two pending U.S. patent applications, entitled "Cyclic position codes" and "Orientation indicating cyclic position codes" with application Ser. Nos. 10/120,441 and 10/409,864, respectively) which can be decoded at any of the six possible orientations of the tag to determine the actual orientation of the tag. Symbols which are part of the cyclic position codeword have a prefix of "R" and are numbered 0 to 5 in order of increasing significance.

Figure 28:
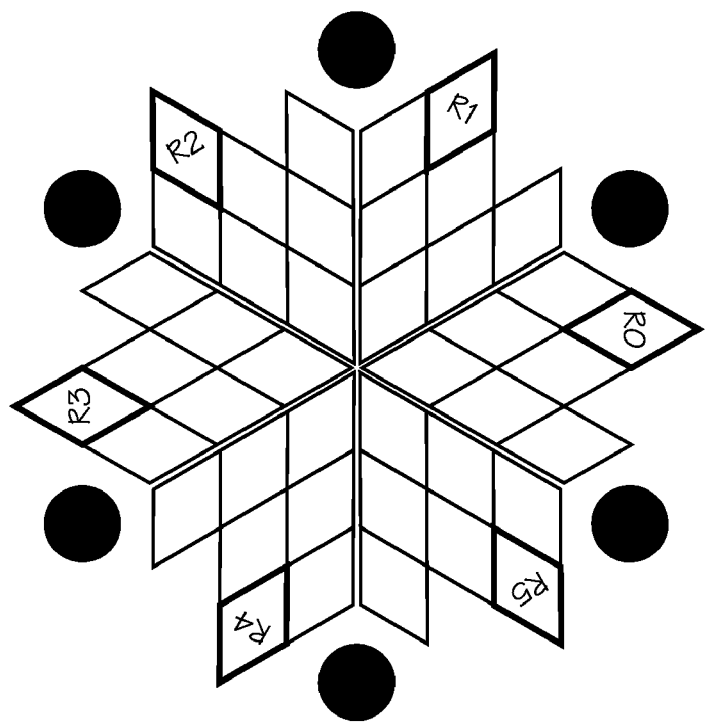
FIG. 28 is an example of an orientation indicating cyclic position codeword for the tag structure of FIG. 21.

The layout of the orientation-indicating cyclic position codeword is shown in FIG. 28.

The cyclic position codeword is $(0, 5, 6, 9, A_{16}, F_{16})$. Note that it only uses six distinct symbol values, even though a four-bit symbol has sixteen possible values. During decoding, any unused symbol value should, if detected, be treated as an erasure. To maximise the probability of low-weight bit error patterns causing erasures rather than symbol errors, the symbol values are chosen to be evenly-spaced on the hypercube.

The minimum distance of the cyclic position code is 6, hence its error-correcting capacity is two symbols in the presence of up to one erasure, one symbol in the presence of two or three erasures, and no symbols in the presence of four or more erasures.

Local Codeword

The tag locally contains one complete codeword, labelled A, which is used to encode information unique to the tag. The codeword is of a punctured $2^4$-ary (12,7) Reed-Solomon code. The tag therefore encodes up to 28 bits of information unique to the tag.

Figure 29:
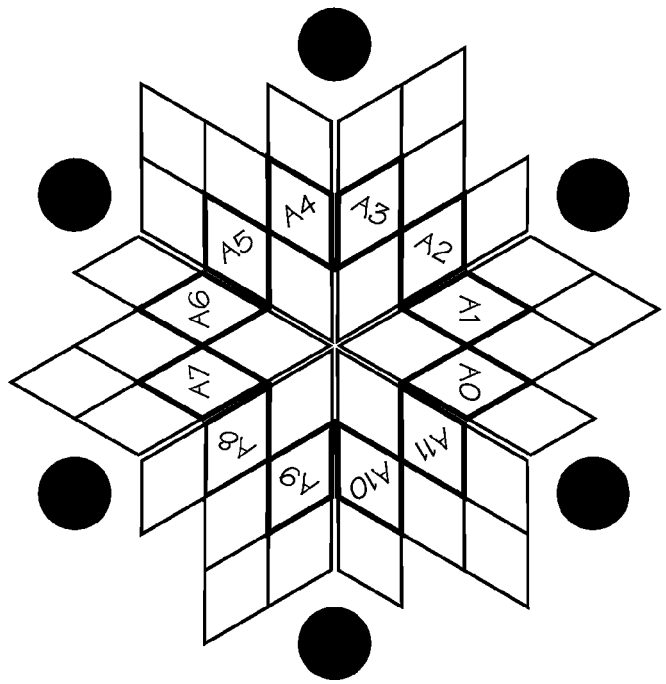
FIG. 29 is an example of a codeword for the tag structure of FIG. 21.

The layout of the local codeword is shown in FIG. 29.

Distributed Codewords

The tag also contains fragments of six codewords, labelled B through G, which are distributed across three adjacent tags and which are used to encode information common to a set of contiguous tags. Each codeword is of a punctured $2^4$-ary (12,7) Reed-Solomon code. Any three adjacent tags therefore together encode up to 168 bits of information common to a set of contiguous tags.

Figure 30:
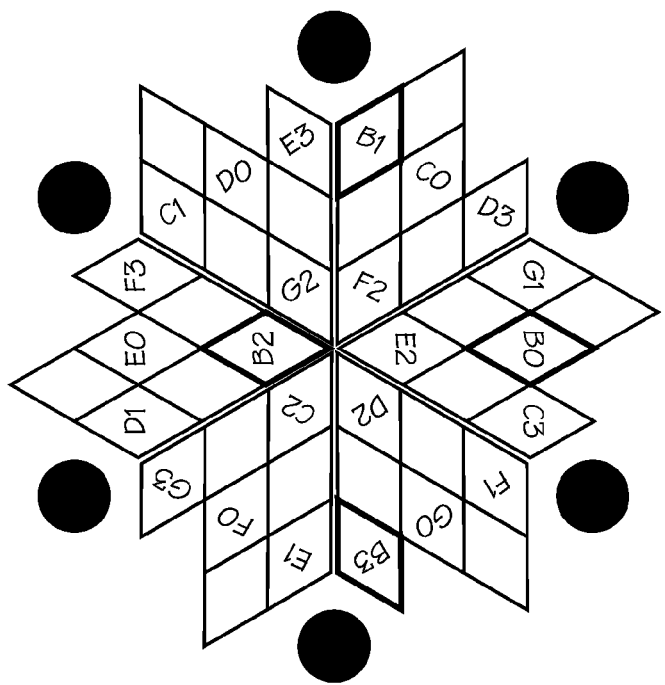
FIG. 30 is an example of fragments of distributed codewords for the tag structure of FIG. 21.

The layout of the first four fragments of the six codewords B through G in tag type P is shown in FIG. 30. The layout in the other tag types follows the layout in tag type P, with symbols 4 through 7 in tag type Q, and fragments 8 through 11 in tag type Q.

Figure 31:
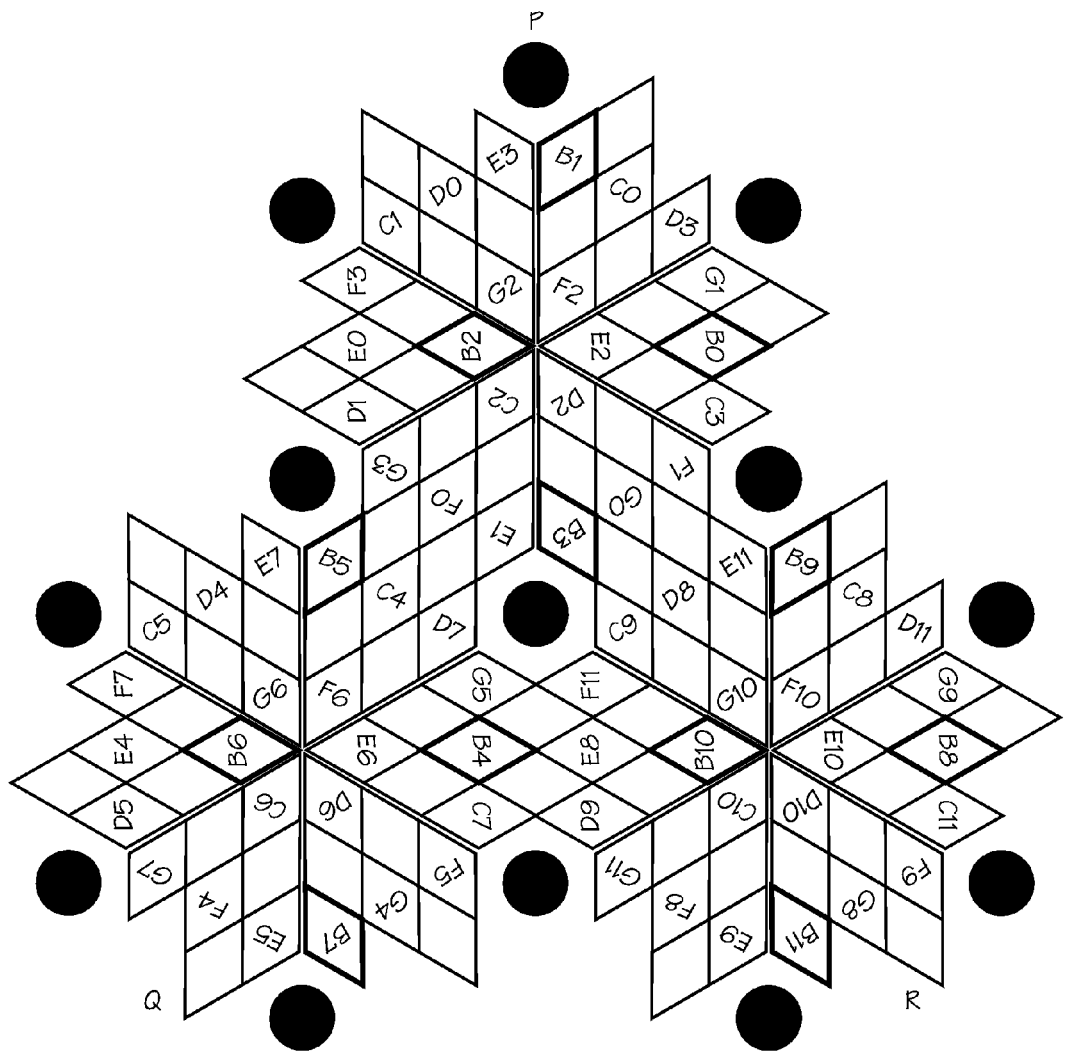
FIG. 31. is an example of continuous tiling of the tag groups of FIG. 21.

The layout of the six complete codewords B through G, distributed across the three tag types P, Q and R, is shown in FIG. 31.

As shown earlier in FIG. 27, the tiling guarantees the any set of three adjacent tags contains one tag of each type, and therefore contains a complete set of distributed codewords. The tag type, used to determine the registration of the distributed codewords with respect to a particular set of adjacent tags, is inferred from the x-y coordinate encoded in the local codeword of each tag.

Tag Segment Geometry

Figure 32:
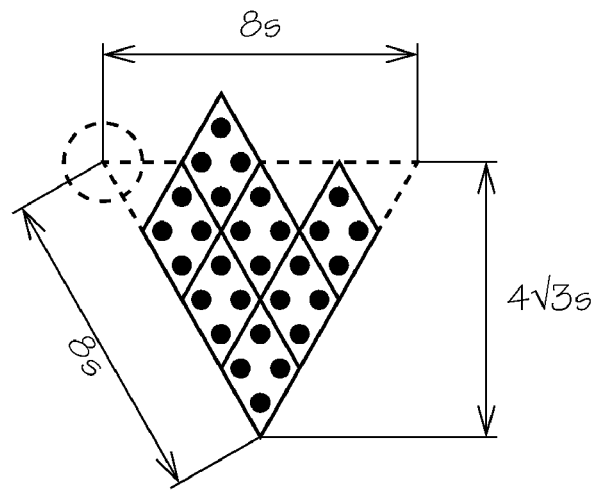
FIG. 32. is an example of a tag segment of the tag groups of FIG. 21.

FIG. 32 shows the geometry of a tag segment.

Figure 33:
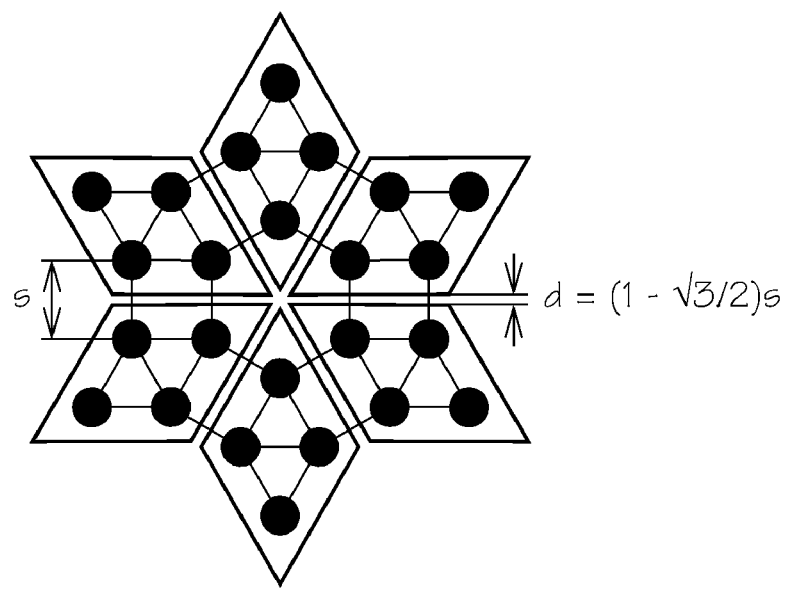
FIG. 33. is an example of inter-segment spacing for the tag groups of FIG. 21.

FIG. 33 shows the spacing d between tag segments, required to maintain consistent spacing between macrodots, where d is given by:

$$d=(1-\sqrt{3}/2)s$$

Figure 34:
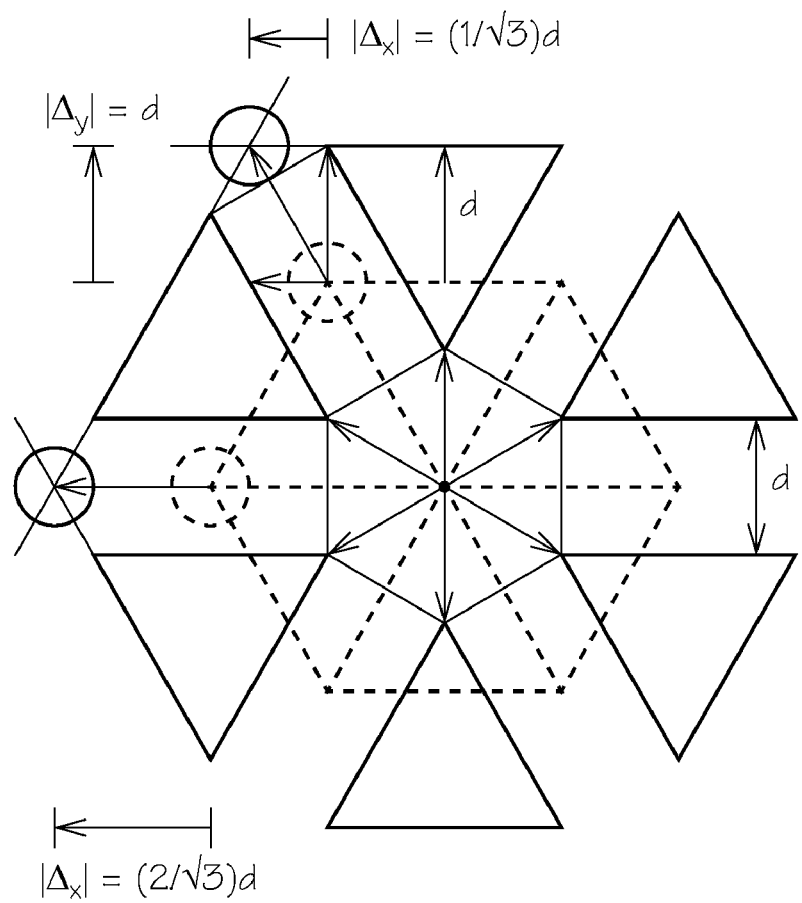
FIG. 34. is an example of the effect of inter-segment spacing on target position for the tag groups of FIG. 21.

FIG. 34 shows the effect of the inter-segment spacing d on target position. Compared with their nominal positions in relation to closely-packed segments (i.e. with d=0), diagonal targets must be displaced by $$(\Delta_x,\Delta_y)=(\pm 1/\sqrt{3},\pm 1)d,$$

and horizontal targets must be displaced by $$(\Delta_x,\Delta_y)=(\pm 2/\sqrt{3},0)d$$

Reed-Solomon Encoding

Codewords are encoded using a punctured $2^4$-ary (12,7) Reed-Solomon code.

A $2^4$-ary (12,7) Reed-Solomon code encodes 28 data bits (i.e. seven 4-bit symbols) and 20 redundancy bits (i.e. five 4-bit symbols) in each codeword. Its error-detecting capacity is five symbols. Its error-correcting capacity is two symbols.

Figure 35:
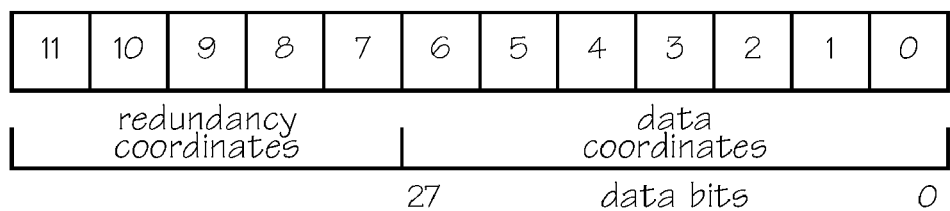
FIG. 35. is an example of a code word for the tag group of FIG. 21.

As shown in FIG. 35, codeword coordinates are indexed in coefficient order, and the data bit ordering follows the codeword bit ordering.

A punctured $2^4$-ary (12,7) Reed-Solomon code is a $2^4$-ary (15,7) Reed-Solomon code with three redundancy coordinates removed. The removed coordinates are the most significant redundancy coordinates.

The code has the following primitive polynominal:

$$p(x)=x^4+x+1$$

The code has the following generator polynominal:

$$g(x)=(x+\alpha)(x+\alpha^2)\ldots(x+\alpha^8)$$

For a detailed description of Reed-Solomon codes, refer to Wicker, S. B. and V. K. Bhargava, eds., *Reed-Solomon Codes and Their Applications*, IEEE Press, 1994.

Tag Coordinate Space

The tag coordinate space has two orthogonal axes labelled x and y respectively. When the positive x axis points to the right then the positive y axis points down.

The surface coding does not specify the location of the tag coordinate space origin on a particular tagged surface, nor the orientation of the tag coordinate space with respect to the surface. This information is application-specific. For example, if the tagged surface is a sheet of paper, then the application which prints the tags onto the paper may record the actual offset and orientation, and these can be used to normalise any digital ink subsequently captured in conjunction with the surface.

Figure 36:
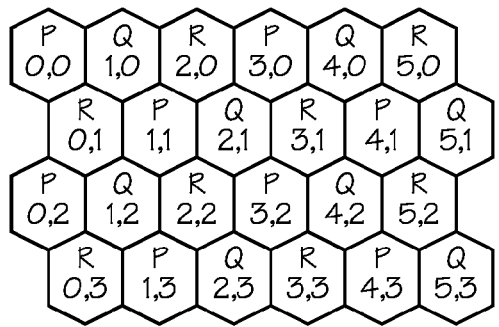
FIG. 36. is an example of tag coordinates for the tag group of FIG. 21.

The position encoded in a tag is defined in units of tags. Tag coordinates are arranged as shown in in FIG. 36, where the tag with coordinate (0,0) is a P type tag. By convention, the position of a tag with an even y coordinate is defined to be the position of the center of the tag. The position of a tag with an odd y coordinate is therefore defined to be the position of the midpoint between the center of the tag and the center of its neighboring tag on the left.

Horizontal and vertical tag units, based on center-to-center tag tag spacings, are given by:

$$u_x = 4(2\sqrt{3}\,s) + 2d \cong 14.1s$$

$$u_y = 6(2s) + 2\left(d\frac{\sqrt{3}}{2}\right) \cong 12.2s$$

where d is the inter-segment spacing given by $$d=(1-\sqrt{3}/2)s$$

If the three tag types P, Q and R are assigned values 0, 1 and 2 respectively, then the type $t$ of a tag is inferred from its (x,y) coordinate as follows. If y is even, then:

$$t=x\,\text{modulo}\,3$$

if y is odd, then:

$$t=(x-1)\,\text{modulo}\,3$$

Tag Information Content

Table 7 defines the information fields embedded in the surface coding. Table 8 defines how these fields map to codewords.

TABLE 7

Field Definitions

Figure 37:
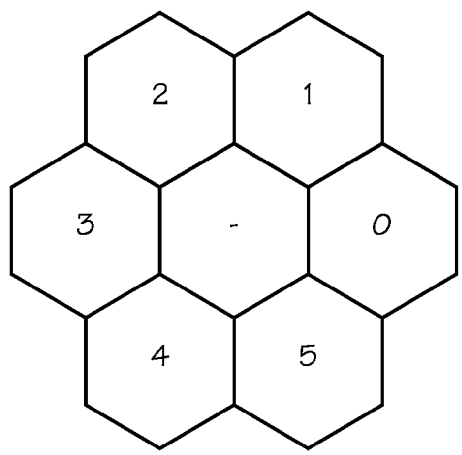
FIG. 37. is an example of tag and six immediate neighbour tags each labelled with its corresponding bit index in the active area map.

| field | width | description |
|---|---|---|
| *per tag* | | |
| X coordinate | 10 | The unsigned x coordinate of the tag allows a maximum x coordinate value of approximately 2.1 m (based on EQ 4). |
| Y coordinate | 10 | The unsigned y coordinate of the tag allows a maximum y coordinate value of approximately 1.8 m (based on EQ 5. |
| active area flag | 1 | A flag indicating whether the tag is a member of an active area. b'1' indicates membership. |
| active area map flag | 1 | A flag indicating whether an active area map is present. b'1' indicates the presence of a map (see next field). If the map is absent then the value of each map entry is derived from the active area flag (see previous field). |
| active area map | 6 | A map of which of the tag's immediate six neighbours are members of an active area. b'1' indicates membership - FIG. 37 indicates the bit ordering of the map |
| data fragment | 6 | A fragment of an embedded data stream. Only present if the active area map is absent. |
| *per tag group* | | |
| encoding format | 12 | The format of the encoding. 0: the present encoding Other values are TBA. |
| macrodot spacing adjustment | 16 | The difference between the actual macrodot spacing and the nominal macrodot spacing, in nm units, in sign-magnitude format - the nominal macrodot spacing is 142875 nm (based on 1600dpi and 9 dots per macrodot) |
| region flags | 12 | Flags controlling the interpretation and routing of region-related information. 0: region ID is an EPC 1: region is linked 2: region is interactive 3: region is signed 4: region includes data 5: region relates to mobile application Other bits are reserved and must be zero. |
| region ID | 112 | The ID of the region containing the tags. |
| CRC | 16 | A CRC (CCITT CRC-16) of tag group data. |

The active area map indicates whether the corresponding tags are members of an active area. An active area is an area within which any captured input should be immediately forwarded to the corresponding Hyperlabel server for interpretation. It also allows the Hyperlabel sensing device to signal to the user that the input will have an immediate effect.

TABLE 8

Mapping of fields to codewords

| codeword | codeword bits | field width | field bits | field |
|---|---|---|---|---|
| A | 9:0 | 10 | all | x coordinate |
| | 19:10 | 10 | all | y coordinate |
| | 20 | 1 | all | active area flag |
| | 21 | 1 | all | active area map flag |
| | 27:22 | 6 | all | active area map |
| | 27:22 | 6 | all | data fragment |
| B | 11:0 | 12 | all | Encoding format |
| | 27:12 | 16 | all | Macrodot spacing adjustment |
| C | 11:0 | 12 | all | region flags |
| | 27:12 | 16 | 27:12 | region ID |
| D | 27:0 | 28 | 55:28 | |
| E | 27:0 | 28 | 83:56 | |
| F | 27:0 | 28 | 111:84 | |
| G | 11:0 | 12 | 11:0 | |
| | 27:12 | 16 | all | CRC |

Embedded Data

If the "region includes data" flag in the region flags is set then the surface coding contains embedded data. The data is encoded in multiple contiguous tags' data fragments, and is replicated in the surface coding as many times as it will fit.

The embedded data is encoded in such a way that a random and partial scan of the surface coding containing the embedded data can be sufficient to retrieve the entire data. The scanning system reassembles the data from retrieved fragments, and reports to the user when sufficient fragments have been retrieved without error.

As shown in Table 9, a 216-bit data block encodes 160 bits of data.

TABLE 9

Embedded data block

| field | width | Description |
|---|---|---|
| data type | 16 | The type of the data in the superblock. Values include: 0: type is controlled by region flags 1: MIME Other values are TBA. |
| superblock width | 12 | The width of the superblock, in blocks. |
| superblock height | 12 | The height of the superblock, in blocks. |
| data | 160 | The block data. |
| CRC | 16 | A CRC of the block data. |
| total | 216 | |

Figure 38:
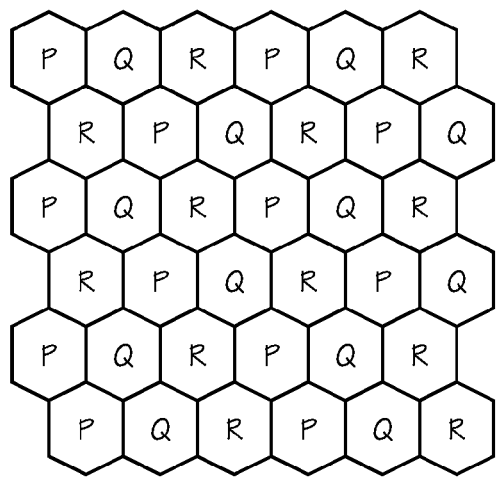
FIG. 38. is an example of a contiguous set of tags making up a data block.

The block data is encoded in the data fragments of a contiguous group of 36 tags arranged in a 6×6 square as shown in FIG. 38. A tag belongs to a block whose integer x and y coordinates are the tag's x and y coordinates divided by 6. Within each block the data is arranged into tags with increasing x coordinate within increasing y coordinate.

A data fragment may be missing from a block where an active area map is present. However, the missing data fragment is likely to be recoverable from another copy of the block.

Data of arbitrary size is encoded into a superblock consisting of a contiguous set of blocks arranged in a rectangle. The size of the superblock is encoded in each block. A block belongs to a superblock whose integer coordinate is the block's coordinate divided by the superblock size.

Within each superblock the data is arranged into blocks with increasing x coordinate within increasing y coordinate.

The superblock is replicated in the surface coding as many times as it will fit, including partially along the edges of the surface coding.

The data encoded in the superblock may include more precise type information, more precise size information, and more extensive error detection and/or correction data.

General Considerations
Cryptographic Signature of Region ID
If the "region is signed" flag in the region flags is set then the surface coding contains a 160-bit cryptographic signature of the region ID. The signature is encoded in a one-block superblock.

In an online environment any signature fragment can be used, in conjunction with the region ID, to validate the signature. In an offline environment the entire signature can be recovered by reading multiple tags, and can then be validated using the corresponding public signature key.

MIME Data
If the embedded data type is "MIME" then the superblock contains Multipurpose Internet Mail Extensions (MIME) data according to RFC 2045 (Freed, N., and N. Borenstein, "Multipurpose Internet Mail Extensions (MIME)—Part One: Format of Internet Message Bodies", RFC 2045, November 1996), RFC 2046 (Freed, N., and N. Borenstein, "Multipurpose Internet Mail Extensions (MIME)—Part Two: Media Types", RFC 2046, November 1996) and related RFCs. The MIME data consists of a header followed by a body. The header is encoded as a variable-length text string preceded by an 8-bit string length. The body is encoded as a variable-length type-specific octet stream preceded by a 16-bit size in big-endian format.

The basic top-level media types described in RFC 2046 include text, image, audio, video and application.

RFC 2425 (Howes, T., M. Smith and F. Dawson, "A MIME Content-Type for Directory Information", RFC 2045, September 1998) and RFC 2426 (Dawson, F., and T. Howes, "vCard MIME Directory Profile", RFC 2046, September 1998) describe a text subtype for directory information suitable, for example, for encoding contact information which might appear on a business card.

Encoding and Printing Considerations
The Print Engine Controller (PEC) (which is the subject of a number of pending U.S. patent applications, including: Ser. Nos. 09/575,108; 10/727,162; 09/575,110; 09/607,985; U.S. Pat. Nos. 6,398,332; 6,394,573; 6,622,923) supports the encoding of two fixed (per-page) $2^4$-ary (15,7) Reed-Solomon codewords and four variable (per-tag) $2^4$-ary (15,7) Reed-Solomon codewords, although other numbers of codewords can be used for different schemes.

Furthermore, PEC supports the rendering of tags via a rectangular unit cell whose layout is constant (per page) but whose variable codeword data may vary from one unit cell to the next. PEC does not allow unit cells to overlap in the direction of page movement.

A unit cell compatible with PEC contains a single tag group consisting of four tags. The tag group contains a single A codeword unique to the tag group but replicated four times within the tag group, and four unique B codewords. These can be encoded using five of PEC's six supported variable codewords. The tag group also contains eight fixed C and D codewords. One of these can be encoded using the remaining one of PEC's variable codewords, two more can be encoded using PEC's two fixed codewords, and the remaining five can be encoded and pre-rendered into the Tag Format Structure (TFS) supplied to PEC.

PEC imposes a limit of 32 unique bit addresses per TFS row. The contents of the unit cell respect this limit. PEC also imposes a limit of 384 on the width of the TFS. The contents of the unit cell respect this limit.

Note that for a reasonable page size, the number of variable coordinate bits in the A codeword is modest, making encoding via a lookup table tractable. Encoding of the B codeword via a lookup table may also be possible. Note that since a Reed-Solomon code is systematic, only the redundancy data needs to appear in the lookup table.

Imaging and Decoding Considerations
The minimum imaging field of view required to guarantee acquisition of an entire tag has a diameter of 39.6 s, i.e.

$$(2\times(12+2))\sqrt{2}s$$

allowing for arbitrary alignment between the surface coding and the field of view. Given a macrodot spacing of 143 μm, this gives a required field of view of 5.7 mm.

Table 10 gives pitch ranges achievable for the present surface coding for different sampling rates, assuming an image sensor size of 128 pixels.

TABLE 10

Pitch ranges achievable for present surface coding for different sampling rates, computed using Optimize Hyperlabel Optics; dot pitch = 1600 dpi, macrodotpitch = 9 dots, viewing distance = 30 mm, nib-to-FOV separation = 1 mm, image sensor size = 128 pixels

| sampling rate | pitch range |
|---|---|
| 2 | −40 to +49 |
| 2.5 | −27 to +36 |
| 3 | −10 to +18 |

For the surface coding of the first example, the corresponding decoding sequence is as follows:
  locate targets of complete tag
  infer perspective transform from targets
  sample and decode any one of tag's four codewords
  determine codeword type and hence tag orientation
  sample and decode required local (A and B) codewords
  codeword redundancy is only 12 bits, so only detect errors
  on decode error flag bad position sample
  determine tag x-y location, with reference to tag orientation
  infer 3D tag transform from oriented targets
  determine nib x-y location from tag x-y location and 3D transform
  determine active area status of nib location with reference to active area map
  generate local feedback based on nib active area status
  determine tag type from A codeword
  sample and decode required global (C and D) codewords (modulo window alignment, with reference to tag type)
  although codeword redundancy is only 12 bits, correct errors; subsequent CRC verification will detect erroneous error correction
  verify tag group data CRC
  on decode error flag bad region ID sample
  determine encoding type, and reject unknown encoding
  determine region flags
  determine region ID
  encode region ID, nib x-y location, nib active area status in digital ink
  route digital ink based on region flags Note that region ID decoding need not occur at the same rate as position decoding.

Note that decoding of a codeword can be avoided if the codeword is found to be identical to an already-known good codeword.

For the surface coding of the alternative first example, the corresponding decoding sequence is as follows:
  locate targets of complete tag
  infer perspective transform from targets
  sample cyclic position code
  decode cyclic position code determine orientation from cyclic position code
sample and decode local Reed-Solomon codeword
determine tag x-y location
infer 3D tag transform from oriented targets
determine nib x-y location from tag x-y location and 3D transform
determine active area status of nib location with reference to active area map
generate local feedback based on nib active area status
determine tag type
sample distributed Reed-Solomon codewords (modulo window alignment, with reference to tag type)
decode distributed Reed-Solomon codewords
verify tag group data CRC
on decode error flag bad region ID sample
determine encoding type, and reject unknown encoding
determine region flags
determine region ID
encode region ID, nib x-y location, nib active area status in digital ink
route digital ink based on region flags Region ID decoding need not occur at the same rate as position decoding and decoding of a codeword can be avoided if the codeword is found to be identical to an already-known good codeword.

If the high-order coordinate width is non-zero, then special care must be taken on boundaries between tags where the low-order x or y coordinate wraps, otherwise codeword errors may be introduced. If wrapping is detected from the low-order x or y coordinate (i.e. it contains all zero bits or all one bits), then the corresponding high-order coordinate can be adjusted before codeword decoding. In the absence of genuine symbol errors in the high-order coordinate, this will prevent the inadvertent introduction of codeword errors.

Expanded Tag

The tag can be expanded to increase its data capacity by adding additional bands of symbols about its circumference. This appendix describes an expanded tag with one additional band of symbols. While the tag described in the main part of the document has a raw capacity of 36 symbols, the expanded tag has a raw capacity of 60 symbols.

The capacity of the expanded tag is precisely sufficient to allow the inclusion of a complete 160-bit digital signature in each tag group. This allows complete digital signature verification on a "single-click" interaction with the surface coding.

Tag Structure

Figure 39:
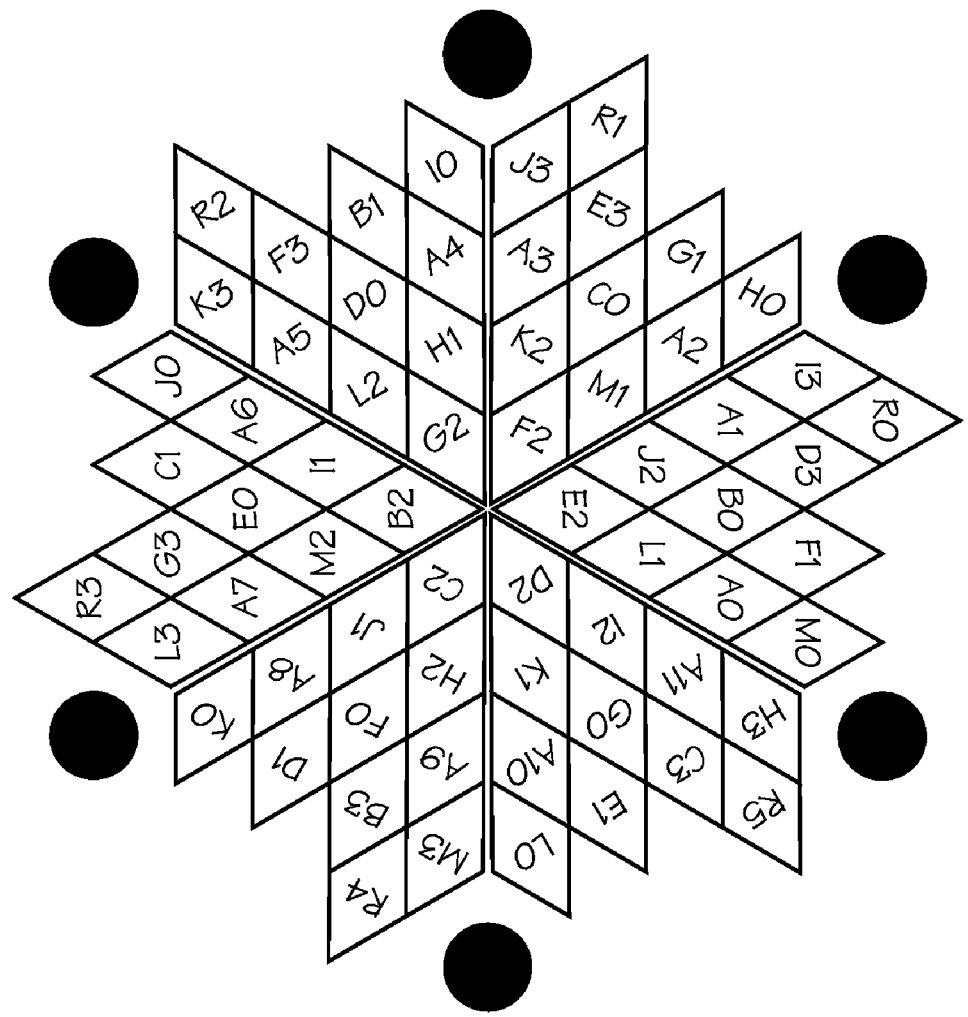
FIG. 39. is an example of an expanded tag structure.

FIG. 39 shows the structure of a complete (P type) expanded tag. Apart from the additional band of symbols and the related change in the positions of the targets, it has a similar physical structure to the tag described earlier.

In the expanded tag the macrodot spacing s has a nominal value of 111 μm, based on 7 dots printed at a pitch of 1600 dots per inch.

A macrodot is nominally circular with a nominal diameter of (3/7)s.

A target is nominally circular with a nominal diameter of (10/7)s.

The expanded tag, like the tag described earlier, also participates in a tag group, and each expanded tag has one of the three possible tag types P, Q and R.

The expanded tag, like the tag described earlier, contains an orientation-indicating cyclic position code.

Local Codeword

The expanded tag locally contains one complete codeword which is used to encode information unique to the tag. The codeword is of a punctured $2^4$-ary (12,7) Reed-Solomon code. The tag therefore encodes up to 28 bits of information unique to the tag.

Figure 40:
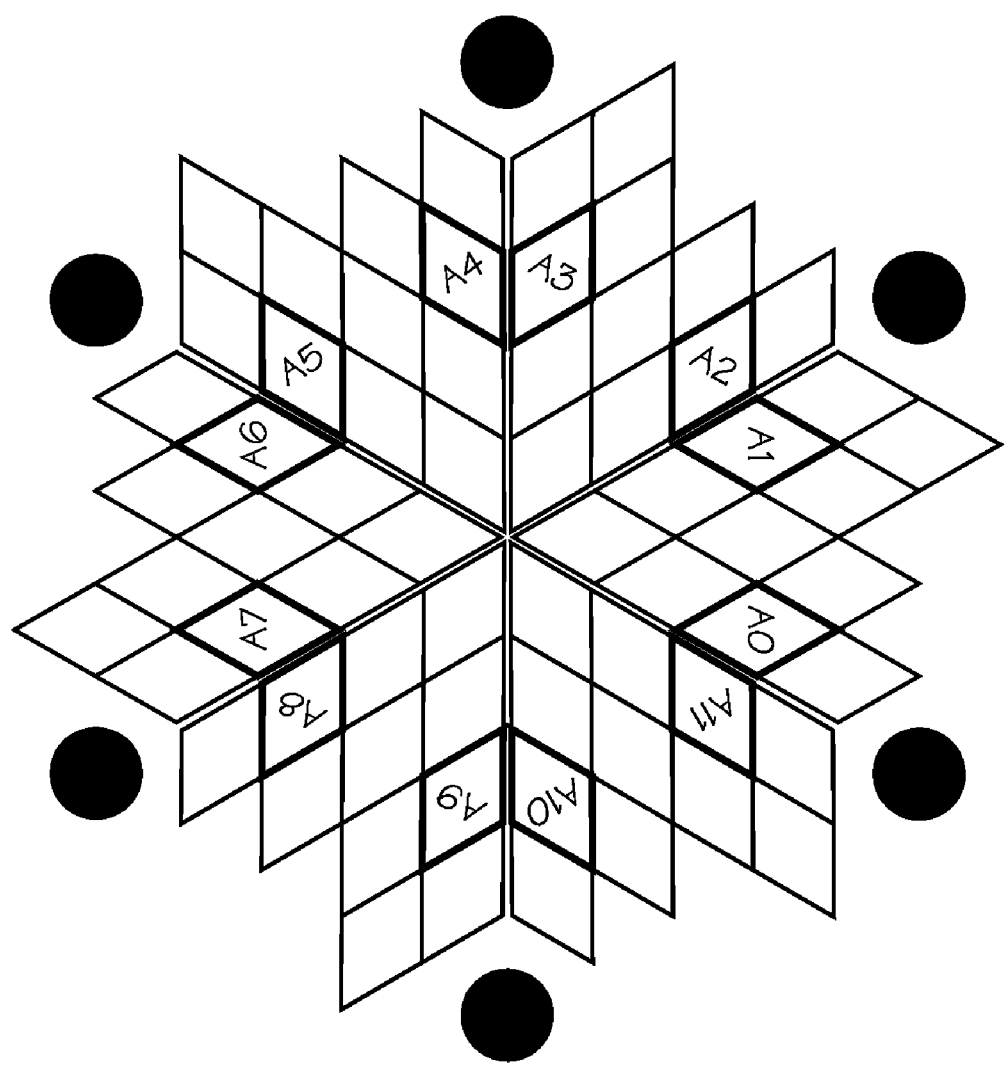
FIG. 40 is an example of a codeword for the tag structure of FIG. 39.

The layout of the local codeword is shown in FIG. 40.

Distributed Codewords

The expanded tag contains fragments of twelve codewords, labelled B through M, which are distributed across three adjacent tags and which are used to encode information common to a set of contiguous tags. Each codeword is of a punctured $2^4$-ary (12,7) Reed-Solomon code. Any three adjacent tags therefore together encode up to 336 bits of information common to a set of contiguous tags.

Figure 41:
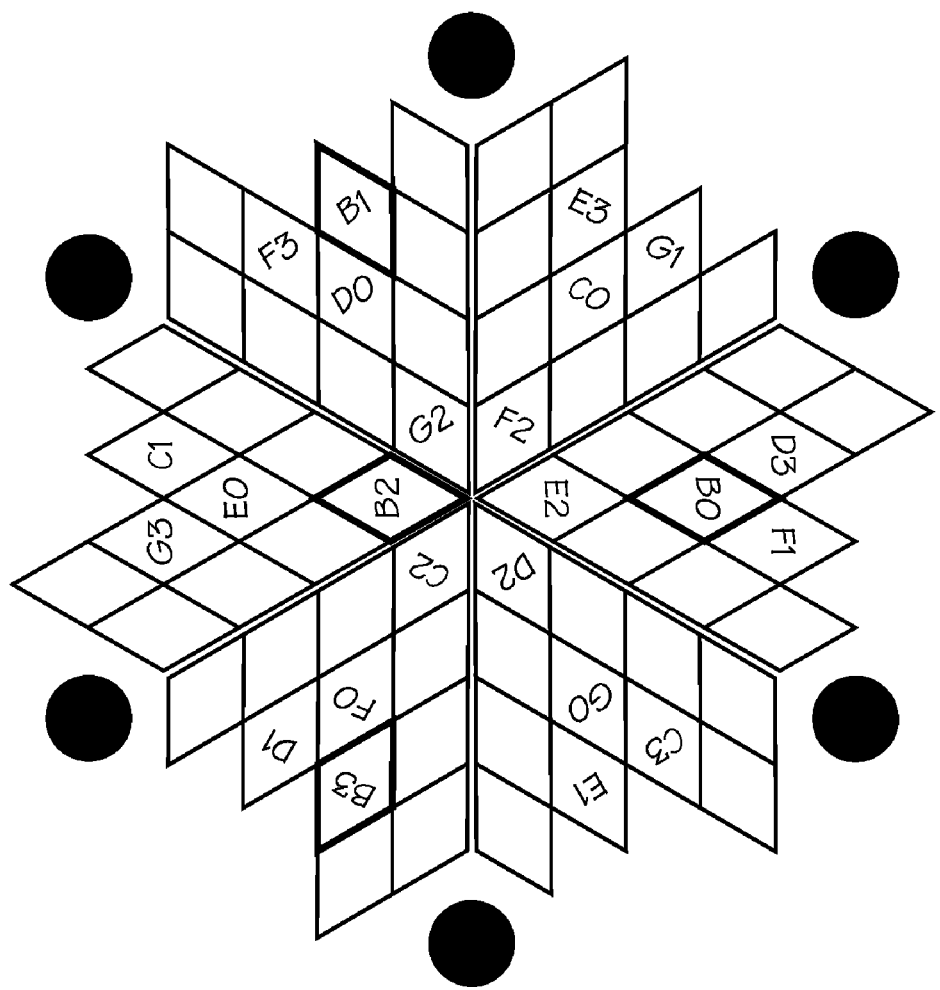
FIG. 41 is an example of fragments of distributed codewords for the tag structure of FIG. 39.

The layout of the first four fragments of the six codewords B through G in tag type P is shown in FIG. 41. The layout in the other tag types follows the layout in tag type P, with symbols 4 through 7 in tag type Q, and fragments 8 through 11 in tag type Q.

Figure 42:
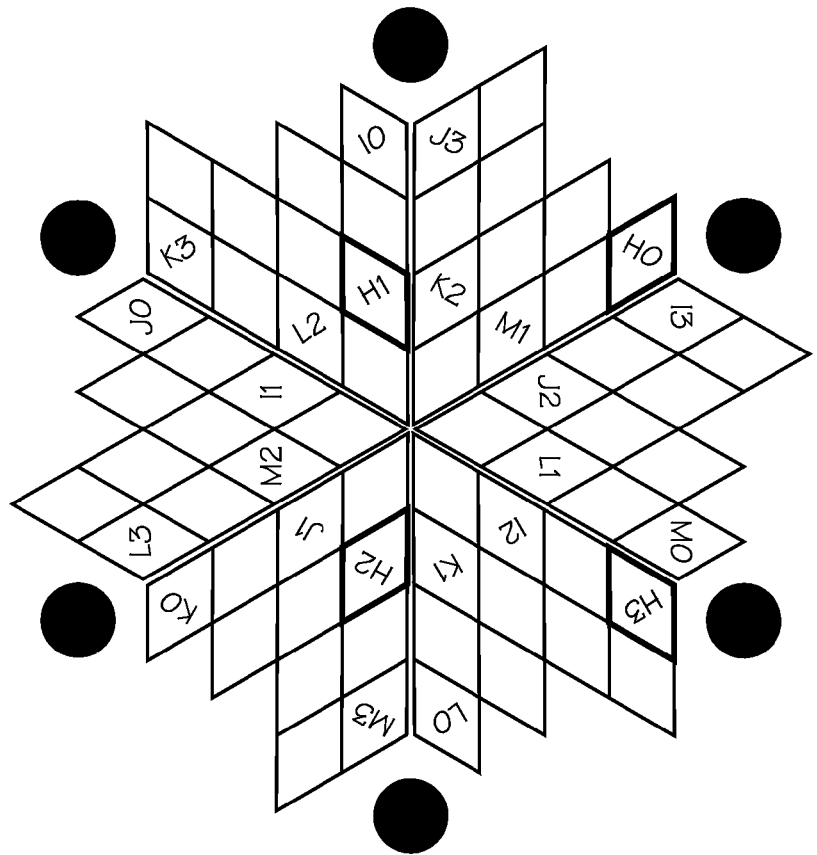
FIG. 42 is a second example of fragments of distributed codewords for the tag structure of FIG. 39.

The layout of the first four fragments of the six codewords H through M in tag type P is shown in FIG. 42. The layout in the other tag types follows the layout in tag type P, with symbols 4 through 7 in tag type Q, and fragments 8 through 11 in tag type Q.

As shown earlier in FIG. 37, the tiling guarantees the any set of three adjacent tags contains one tag of each type, and therefore contains a complete set of distributed codewords. The tag type, used to determine the registration of the distributed codewords with respect to a particular set of adjacent tags, is inferred from the x-y coordinate encoded in the local codeword of each tag.

Tag Coordinate Space

The tag coordinate space encoded in the expanded tag is identical to that encoded in the tag described earlier, with the exception that tag units are different (due both to the change in tag structure and the change in macrodot spacing).

Horizontal and vertical tag units, based on center-to-center tag tag spacings, are given by:

$$u_x = 5(2\sqrt{3}\,s) + 2d \cong 17.6s$$
$$u_y = 7.5(2s) + 2\left(d\frac{\sqrt{3}}{2}\right) \cong 15.2s$$

where d is the inter-segment spacing given by $$d = (1 - \sqrt{3}/2)s$$

Tag Information Content

Table 11 defines the information fields embedded in the expanded tag surface coding. Table 12 defines how these fields map to codewords.

TABLE 11

| Field definitions | | |
|---|---|---|
| Field | width | description |
| per tag | | |
| x coordinate | 10 | The unsigned x coordinate of the tag - allows a maximum x coordinate value of approximately 2.0 m (based on EQ 8). |
| y coordinate | 10 | The unsigned y coordinate of the tag - allows a maximum y coordinate value of approximately 1.7 m (based on EQ 9) |
| active area flag | 1 | A flag indicating whether the tag is a member of an active area. b'1' indicates membership. |
| active area map flag | 1 | A flag indicating whether an active area map is present. b'1' indicates the presence of a map |

TABLE 11-continued

Field definitions

| Field | width | description |
|---|---|---|
| | | (see next field). If the map is absent then the value of each map entry is derived from the active area flag (see previous field). |
| active area map | 6 | A map of which of the tag's immediate six neighbours are members of an active area. b'1' indicates membership - FIG. 37 indicates the bit ordering of the map |
| data fragment | 6 | A fragment of an embedded data stream. Only present if the active area map is absent. |
| per tag group | | |
| encoding format | 12 | The format of the encoding. Refer to Table 5 for values. |
| macrodot spacing adjustment | 16 | The difference between the actual macrodot spacing and the nominal macrodot spacing, in nm units, in sign-magnitude format - the nominal macrodot spacing is 111125 nm (based on 1600 dpi and 7 dots per macrodot |
| region flags | 12 | Flags controlling the interpretation and routing of region-related information. Refer to Table 5 for values. |
| region ID | 112 | The ID of the region containing the tags. |
| Signature | 160 | A digital signature of the region ID. |
| CRC | 16 | A CRC (CCITT CRC-16) of tag group data. |

TABLE 12

Mapping of fields to codewords

| codeword | codeword bits | field width | field bits | field |
|---|---|---|---|---|
| A | 9:0 | 10 | all | x coordinate |
| | 19:10 | 10 | all | y coordinate |
| | 20 | 1 | all | active area flag |
| | 21 | 1 | all | active area map flag |
| | 27:22 | 6 | all | active area map |
| | 27:22 | 6 | all | data fragment |
| B | 11:0 | 12 | all | encoding format |
| | 27:12 | 16 | all | macrodot spacing adjustment |
| C | 11:0 | 12 | all | region flags |
| | 27:12 | 16 | 27:12 | region ID |
| D | 27:0 | 28 | 55:28 | |
| E | 27:0 | 28 | 83:56 | |
| F | 27:0 | 28 | 111:84 | |
| G | 11:0 | 12 | 11:0 | |
| | 27:12 | 16 | all | CRC |
| H | 27:0 | 28 | 27:0 | signature |
| I | 27:0 | 28 | 55:28 | |
| J | 27:0 | 28 | 83:56 | |
| K | 27:0 | 28 | 111:84 | |
| L | 27:0 | 28 | 139:112 | |
| M | 19:0 | 20 | 159:140 | |
| | 27:20 | 8 | all | unused |

Encoding and Printing Considerations

The tag group unit cell of the expanded tag only respects PEC's TFS width limit if the macrodot spacing is reduced from 9 to 7 dots, as reflected in the macrodot spacing s of 111 µm.

Imaging and Decoding Considerations

The minimum imaging field of view required to guarantee acquisition of an entire expanded tag has a diameter of 44 s i.e.

$$2(1+8+2)2s),$$

allowing for arbitrary alignment between the surface coding and the field of view. Given a macrodot spacing of 111 µm this gives a required field of view of approximately 4.0 mm.

Surface Coding Security

Security Requirements

Item security can be defined to have two related purposes:
- to allow authentication of an item
- to prevent forgery of an item The greater the difficulty of forgery, the greater the trustworthiness of authentication. When an item is coded, Hyperlabel surface coding security has two corresponding purposes:
- to allow authentication of a coded item
- to prevent forgery of a coded item with a novel item ID If a user is able to determine the authenticity of the surface coding of an item, then the user may be able to make an informed decision about the likely authenticity of the item.

If it is intractable to forge the surface coding for a novel ID, then the only tractable way of forging an item with an authentic surface coding is to duplicate the surface coding of an existing item (and hence its ID). If the user is able to determine by other means that the ID of an item is likely to be unique, then the user may assume that the item is authentic.

Since the Hyperlabel surface coding allows meaningful interaction between a sensing device and a coded surface during a purely local interaction, it is desirable for the surface coding to support authentication during a similarly local interaction, i.e. without requiring an increase in the size of the sensing device field of view.

Since no a priori relationship exists between creators of authentic coded items and users potentially wishing to authenticate such items, it is undesirable to require a trust relationship between creators and users. For example, it is undesirable to require that creators share secret signature keys with users.

It is reasonable for many users to rely on online access to an authenticator trusted by a creator for the purposes of authenticating items. Conversely, it is desirable to allow authentication to take place in the absence of online access.

Security Discussion

As described above, authentication relies on verifying the correspondence between data and a signature of that data. The greater the difficulty in forging a signature, the greater the trustworthiness of signature-based authentication.

The item ID is unique and therefore provides a basis for a signature. If online authentication access is assumed, then the signature may simply be a random number associated with the item ID in an authentication database accessible to the trusted online authenticator. The random number may be generated by any suitable method, such as via a deterministic (pseudo-random) algorithm, or via a stochastic physical process. A keyed hash or encrypted hash may be preferable to a random number since it requires no additional space in the authentication database. However, a random signature of the same length as a keyed signature is more secure than the keyed signature since it is not susceptible to key attacks. Equivalently, a shorter random signature confers the same security as a longer keyed signature.

In the limit case no signature is actually required, since the mere presence of the item ID in the database indicates authenticity. However, the use of a signature limits a forger to forging items he has actually sighted.

To prevent forgery of a signature for an unsighted ID, the signature must be large enough to make exhaustive search via repeated accesses to the online authenticator intractable. If the signature is generated using a key rather than randomly, then its length must also be large enough to prevent the forger from deducing the key from known ID-signature pairs. Signatures of a few hundred bits are considered secure, whether generated using private or secret keys.

While it may be practical to include a reasonably secure random signature in a tag (or local tag group), particularly if the length of the ID is reduced to provide more space for the signature, it may be impractical to include a secure ID-derived signature in a tag. To support a secure ID-derived signature, we can instead distribute fragments of the signature across multiple tags. If each fragment can be verified in isolation against the ID, then the goal of supporting authentication without increasing the sensing device field of view is achieved. The security of the signature can still derive from the full length of the signature rather than from the length of a fragment, since a forger cannot predict which fragment a user will randomly choose to verify. A trusted authenticator can always perform fragment verification since they have access to the key and/or the full stored signature, so fragment verification is always possible when online access to a trusted authenticator is available.

Fragment verification requires that we prevent brute force attacks on individual fragments, otherwise a forger can determine the entire signature by attacking each fragment in turn. A brute force attack can be prevented by throttling the authenticator on a per-ID basis. However, if fragments are short, then extreme throttling is required. As an alternative to throttling the authenticator, the authenticator can instead enforce a limit on the number of verification requests it is willing to respond to for a given fragment number. Even if the limit is made quite small, it is unlikely that a normal user will exhaust it for a given fragment, since there will be many fragments available and the actual fragment chosen by the user can vary. Even a limit of one can be practical. More generally, the limit should be proportional to the size of the fragment, i.e. the smaller the fragment the smaller the limit. Thus the experience of the user would be somewhat invariant of fragment size. Both throttling and enforcing fragment verification limits imply serialisation of requests to the authenticator. A fragment verification limit need only be imposed once verification fails, i.e. an unlimited number of successful verifications can occur before the first failure. Enforcing fragment verification limits further requires the authenticator to maintain a per-fragment count of satisfied verification requests.

A brute force attack can also be prevented by concatenating the fragment with a random signature encoded in the tag. While the random signature can be thought of as protecting the fragment, the fragment can also be thought of as simply increasing the length of the random signature and hence increasing its security. A fragment verification limit can make verification subject to a denial of service attack, where an attacker deliberately exceeds the limit with invalid verification request in order to prevent further verification of the item ID in question. This can be prevented by only enforcing the fragment verification limit for a fragment when the accompanying random signature is correct.

Fragment verification may be made more secure by requiring the verification of a minimum number of fragments simultaneously.

Fragment verification requires fragment identification. Fragments may be explicitly numbered, or may more economically be identified by the two-dimensional coordinate of their tag, modulo the repetition of the signature across a continuous tiling of tags.

The limited length of the ID itself introduces a further vulnerability. Ideally it should be at least a few hundred bits. In the netpage surface coding scheme it is 96 bits or less. To overcome this the ID may be padded. For this to be effective the padding must be variable, i.e. it must vary from one ID to the next. Ideally the padding is simply a random number, and must then be stored in the authentication database indexed by ID. If the padding is deterministically generated from the ID then it is worthless.

Offline authentication of secret-key signatures requires the use of a trusted offline authentication device. The QA chip (which is the subject of a number of pending U.S. patent applications, including Ser. Nos. 09/112,763; 09/112,762; 09/112,737; 09/112,761; 09/113,223) provides the basis for such a device, although of limited capacity. The QA chip can be programmed to verify a signature using a secret key securely held in its internal memory. In this scenario, however, it is impractical to support per-ID padding, and it is impractical even to support more than a very few secret keys. Furthermore, a QA chip programmed in this manner is susceptible to a chosen-message attack. These constraints limit the applicability of a QA-chip-based trusted offline authentication device to niche applications.

In general, despite the claimed security of any particular trusted offline authentication device, creators of secure items are likely to be reluctant to entrust their secret signature keys to such devices, and this is again likely to limit the applicability of such devices to niche applications.

By contrast, offline authentication of public-key signatures (i.e. generated using the corresponding private keys) is highly practical. An offline authentication device utilising public keys can trivially hold any number of public keys, and may be designed to retrieve additional public keys on demand, via a transient online connection, when it encounters an ID for which it knows it has no corresponding public signature key. Untrusted offline authentication is likely to be attractive to most creators of secure items, since they are able to retain exclusive control of their private signature keys.

A disadvantage of offline authentication of a public-key signature is that the entire signature must be acquired from the coding, violating our desire to support authentication with a minimal field of view. A corresponding advantage of offline authentication of a public-key signature is that access to the ID padding is no longer required, since decryption of the signature using the public signature key generates both the ID and its padding, and the padding can then be ignored. A forger can not take advantage of the fact that the padding is ignored during offline authentication, since the padding is not ignored during online authentication.

Acquisition of an entire distributed signature is not particularly onerous. Any random or linear swipe of a hand-held sensing device across a coded surface allows it to quickly acquire all of the fragments of the signature. The sensing device can easily be programmed to signal the user when it has acquired a full set of fragments and has completed authentication. A scanning laser can also easily acquire all of the fragments of the signature. Both kinds of devices may be programmed to only perform authentication when the tags indicate the presence of a signature.

Note that a public-key signature may be authenticated online via any of its fragments in the same way as any signature, whether generated randomly or using a secret key. The trusted online authenticator may generate the signature on demand using the private key and ID padding, or may store the signature explicitly in the authentication database. The latter approach obviates the need to store the ID padding.

Note also that signature-based authentication may be used in place of fragment-based authentication even when online access to a trusted authenticator is available.

Table 13 provides a summary of which signature schemes are workable in light of the foregoing discussion.

TABLE 13

Summary of workable signature schemes

| encoding in tags | acquisition from tags | signature generation | online authentication | offline authentication |
|---|---|---|---|---|
| Local | full | random | ok | Impractical to store per ID information |
|  |  | secret key | Signature too short to be secure | Undesirable to store secret keys |
|  |  | private key | Signature too short to be secure |  |
| Distributed | fragment(s) | random | ok | impractical[b] |
|  |  | secret key | ok | impractical[c] |
|  |  | private key | ok | impractical[b] |
|  | full | random | ok | impractical[b] |
|  |  | secret key | ok | impractical[c] |
|  |  | private key | ok | ok |

Security Specification

Figure 43:
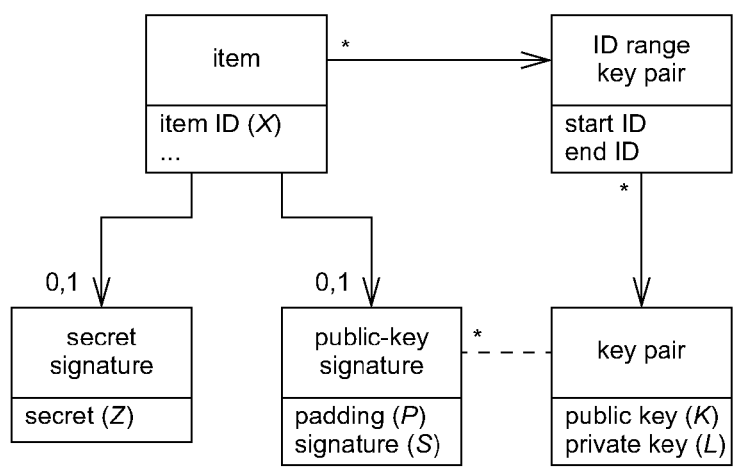
FIG. 43 is an example of an item signature object model.

FIG. 43 shows an example item signature object model.

An item has an ID (X) and other details (not shown). It optionally has a secret signature (Z). It also optionally has a public-key signature. The public-key signature records the signature (S) explicitly, and/or records the padding (P) used in conjunction with the ID to generate the signature. The public-key signature has an associated public-private key pair (K, L). The key pair is associated with a one or more ranges of item IDs.

Typically issuers of security documents and pharmaceuticals will utilise a range of IDs to identify a range of documents or the like. Following this, the issuer will then use these details to generate respective IDs for each item, or document to be marked.

Authentication of the product can then be performed online or offline by sensing the tag data encoded within the tag, and performing the authentication using a number of different mechanisms depending on the situation.

Examples of the processes involved will now be described for public and private key encryption respectively.

Authentication Based on Public-Key Signature
Setup per ID range:
   generate public-private signature key pair (K, L)
   store key pair (K, L) indexed by ID range
Setup per ID:
   generate ID padding (P)
   retrieve private signature key (L) by ID (X)
   generate signature (S) by encrypting ID (X) and padding (P) using private key (L):

$$S \leftarrow E_L(X, P)$$

store signature (S) in database indexed by ID (X) (and/or store padding (P))
   encode ID (X) in all tag groups
   encode signature (S) across multiple tags in repeated fashion
Online fragment-based authentication (user):
   acquire ID (X) from tags
   acquire position (x, y), and signature fragment ($T_i$) from tag
   generate fragment number (i) from position $(x, y)_i$:

$$i \leftarrow F[(x,y)_i]$$

look up trusted authenticator by ID (X)
   transmit ID (X), fragment ($S_i$) and fragment number (i) to trusted authenticator
Online fragment-based authentication (trusted authenticator):
   receive ID (X), fragment ($S_i$) and fragment number (i) from user
   retrieve signature (S) from database by ID (X) (or re-generate signature)
   compare received fragment ($T_i$) with corresponding fragment of signature ($S_i$)
   report authentication result to user
Offline signature-based authentication (user):
   acquire ID from tags (X)
   acquire positions $(x, y)_i$ and signature fragments ($T_i$) from tag
   generate fragment numbers (i) from positions $(x, y)_i$:

$$i \leftarrow F[(x,y)_i]$$

$$S \leftarrow S_0 | S_1 | \ldots | S_{n-1}$$

generate signature (S) from (n) fragments:
   retrieve public signature key (K) by ID (X)
   decrypt signature (S) using public key (K) to obtain ID (X') and padding (P'):

$$X'|P' \leftarrow D_K(S)$$

compare acquired ID (X) with decrypted ID (X')
   report authentication result to user
Authentication Based on Secret-Key Signature
Setup per ID:
   generate secret (Z)
   store secret (Z) in database indexed by ID (X)
   encode ID (X) and secret (Z) in all tag groups
Online secret-based authentication (user):
   acquire ID (X) from tags
   acquire secret (Z') from tags
   look up trusted authenticator by ID
   transmit ID (X) and secret (Z') to trusted authenticator
Online secret-based authentication (trusted authenticator):
   receive ID (X) and secret (Z') from user
   retrieve secret (Z) from database by ID (X)
   compared received secret (Z') with secret (Z)
   report authentication result to user As discussed earlier, secret-based authentication may be used in conjunction with fragment-based authentication.

Cryptographic Algorithms

When the public-key signature is authenticated offline, the user's authentication device typically does not have access to the padding used when the signature was originally generated. The signature verification step must therefore decrypt the signature to allow the authentication device to compare the ID in the signature with the ID acquired from the tags. This precludes the use of algorithms which don't perform the signature verification step by decrypting the signature, such as the standard Digital Signature Algorithm U.S. Department of Commerce/National Institute of Standards and Technology, Digital Signature Standard (DSS), FIPS 186-2, 27 Jan. 2000. RSA encryption is described in:

Rivest, R. L., A. Shamir, and L. Adleman, "A Method for Obtaining Digital Signatures and Public-Key Cryptosystems", Communications of the ACM, Vol. 21, No. 2, February 1978, pp. 120-126

Rivest, R. L., A. Shamir, and L. M. Adleman, "Cryptographic communications system and method", U.S. Pat. No. 4,405,829, issued 20 Sep. 1983

RSA Laboratories, PKCS #1 v2.0: RSA Encryption Standard, Oct. 1, 1998

RSA provides a suitable public-key digital signature algorithm that decrypts the signature. RSA provides the basis for the ANSI X9.31 digital signature standard American National Standards Institute, ANSI X9.31-1998, Digital Signatures Using Reversible Public Key Cryptography for the Financial Services Industry (rDSA), Sep. 8, 1998. If no padding is used, then any public-key signature algorithm can be used.

In the Hyperlabel surface coding scheme the ID is 96 bits long or less. It is padded to 160 bits prior to being signed.

The padding is ideally generated using a truly random process, such as a quantum process [14,15], or by distilling randomness from random events Schneier, B., Applied Cryptography, Second Edition, John Wiley & Sons 1996.

In the Hyperlabel surface coding scheme the random signature, or secret, is 36 bits long or less. It is also ideally generated using a truly random process. If a longer random signature is required, then the length of the item ID in the surface coding can be reduced to provide additional space for the signature.

Security Tagging and Tracking

Currency, checks and other monetary documents can be tagged in order to detect currency counterfeiting and counter money laundering activities. The Hyperlabel tagged currency can be validated, and tracked through the monetary system. Hyperlabel tagged products such as pharmaceuticals can be tagged allowing items to be validated and tracked through the distribution and retail system.

A number of examples of the concepts of Hyperlabel security tagging and tracking referring specifically to bank notes and pharmaceuticals, however Hyperlabel tagging can equally be used to securely tag and track other products, for example, traveller's checks, demand deposits, passports, chemicals etc.

Hyperlabel tagging, with the netpage system, provides a mechanism for securely validating and tracking objects.

Hyperlabel tags on the surface of an object uniquely identify the object. Each Hyperlabel tag contains information including the object's unique ID, and the tag's location on the Hyperlabel tagged surface. A Hyperlabel tag also contains a signature fragment which can be used to authenticate the object. A scanning laser or image sensor can read the tags on any part of the object to identify the object, validate the object, and allow tracking of the object.

Currency Tagging

Currency may be tagged with Hyperlabels in order to detect counterfeiting and allow tracking of currency movement. Hyperlabel tags can be printed over the entire bank note surface or can be printed in a smaller region of the note. Hyperlabel tagging can be used in addition to other security features such as holograms, foil strips, colour-shifting inks etc. A scanning laser or image sensor can read the tags on any part of the note to validate each individual note.

A Hyperlabel currency tag identifies the note currency, issue country, and note denomination. It also identifies the note's serial number, the note side (i.e. front or back), and it may contain other information (for example, the exact printing works where the note was printed). There are two note IDs for each physical bank note—one for each side of the note.

Each time a note is scanned its location is recorded. This location information can be collected in a central database allowing analysis and identification of abnormal money movements and detection of counterfeit notes. For example, in the case of sophisticated forgeries where Hyperlabel dot patterns are exactly duplicated, there will be multiple copies of exactly forged notes (at a minimum, the original and the forgery). If multiple identical notes appear in different places at the same time, all but one of the notes must be a forgery. All can then be treated as suspect.

Hyperlabel currency tags can be read by any Hyperlabel scanner. These scanners can be incorporated into a variety of devices to facilitate authentication and tracking, for example, automated teller machines, currency counters, and vending machines. Scanners may also be incorporated into devices such as:

Currency counters
Automated teller machines
Cash registers
POS checkouts
Mobile phone with inbuilt scanner
Netpage pens
Vending machines
Hyperlabel Supermarket Checkout
Mobile Phone with Inbuilt Scanner
Handheld Validity Scanner Such scanners are multi-purpose since they can also be used to scan Hyperlabel tagged consumer goods and printed materials. A small hand-held scanner may also be used to scan and validate currency. When a scanner scans a note it notifies the currency server of the note details, the current date and time, and the scanner location (if known). Optionally the scanner may also send the identity of the person making the cash transaction, if known. This information would be available in respect of bank transactions, currency exchanges and large cash transactions.

Currency tagging is discussed in further detail in copending patent application Ser. Nos. 11/041,651, 11/041,609, 11/041,652, 11/041,649 and 11/041,610, the contents of which are all incorporated herein by reference.

Pharmaceutical Tagging

Hyperlabel tags can be printed over the entire surface of the pharmaceutical packaging, or only on a smaller area of the packaging. A Hyperlabel pharmaceutical tag contains the item's product ID and a serial number, to uniquely identify an individual item. The product ID identifies the item's National Drug Code (NDC) number. The NDC number is allocated and administered by the FDA (U.S. Food and Drug Administration) for drugs and drug-related items and identifies the product and manufacturer. Alternatively the tag may contain another product ID code, such as the European International Article Numbering (EAN) code, or EPC etc.

The pharmaceutical ID can be read by a scanner and used to look up details of the item's lot number and expiry date. Alternatively the lot number and expiry date may be contained in the pharmaceutical tag to allow off-line retrieval of this information by any scanner. The pharmaceutical ID may also be used to access details such as dosage and administration information, drug interactions, precautions, contraindications, product warnings, recall information, place of manufacture etc.

Each time a pharmaceutical item is scanned its location is recorded. This location information can be collected in a central database allowing analysis and identification of abnormal product movements and detection of counterfeit pharmaceuticals.

Suitable scanners can include:
Cash registers
POS checkouts
Mobile phone with inbuilt scanner
Netpage pens
Vending machines Tracking For the purpose of tracking and item validation the manufacturer, or other central authority, maintains a database which tracks the location and status of all items.

Hyperlabel scanners can be built into a variety of devices. Scanners may be fixed or mobile. A fixed scanner has a permanent, known location. A mobile scanner has no fixed location. A scanner may be on-line, i.e. have immediate access to the central database, or it may be off-line.

Scanners may be specific to a particular product application, such as a currency counter, or may be a generic Hyperlabel scanner. Hyperlabel scanners may be embedded in other multi-function devices, for example, a mobile phone or PDA.

A central database maintains up-to-date information on valid object IDs, an object ID hotlist (for all suspect object IDs), and a list of public keys corresponding to object IDs. The central server also maintains an object scanning history to track an object's movements. Each time an object is scanned, its timestamped location is recorded. If known, the details of the object owner may also be recorded. This information may be known particularly in the case of large financial transactions e.g. a large cash withdrawal from a bank. This object scanning history data can be used to detect illegal product movements, for example, the illegal import of a pharmaceutical. It can also be used to detect abnormal or suspicious product movements which may be indicative of product counterfeiting.

If an object is known to be stolen it can be immediately added to an object ID hotlist on the central server. This hotlist is automatically distributed to (or becomes accessible to) all on-line scanners, and will be downloaded to all off-line scanners on their next update. In this way the stolen status is automatically and rapidly disseminated to a huge number of outlets. Similarly, if an object is in any other way suspect it can be added to the hotlist so that its status is flagged to the person scanning the object.

An on-line scanner has instant access to the central server to allow checking of each object ID at the time of scanning. The object scanning history is also updated at the central server at the time the object is scanned.

An off-line scanner stores object status data internally to allow validation of a scanned object. The object status data includes valid ID range lists, an object ID hotlist, a public key list, and an object scanning history. Each time an object is scanned the details are recorded in the object scanning history. The object status data is downloaded from the central server, and the object scanning history is uploaded to the central server, each time the scanner connects.

A mobile scanner's location can be provided to the application by the scanner, if it is GPS-equipped. Alternatively the scanner's location can be provided by the network through which it communicates.

For example, if the hand-held scanner uses the mobile phone network, the scanner's location can be provided by the mobile phone network provider. There are a number of location technologies available. One is Assisted Global Positioning System (A-GPS). This requires a GPS-equipped handset, which receives positioning signals from GPS satellites. The phone network knows the approximate location of the handset (in this case the handset is also the scanner) from the nearest cell site. Based on this, the network tells the handset which GPS satellites to use in its position calculations. Another technology, which does not require the device to be GPS-equipped, is Uplink Time Difference of Arrival (U-TDOA). This determines the location of a wireless handset, using a form of triangulation, by comparing the time it takes a wireless handset's signal to reach several Location Measurement Units (LMUs) installed at the network's cell sites. The handset location is then calculated based on the differences in arrival times of the three (or more) signals.

Authentication

Each object ID has a signature. Limited space within the Hyperlabel tag structure makes it impractical to include a full cryptographic signature in a tag so signature fragments are distributed across multiple tags. A smaller random signature, or secret, can be included in a tag.

To avoid any vulnerability due to the limited length of the object ID, the object ID is padded, ideally with a random number. The padding is stored in an authentication database indexed by object ID. The authentication database may be managed by the manufacturer, or it may be managed by a third-party trusted authenticator.

Each Hyperlabel tag contains a signature fragment and each fragment (or a subset of fragments) can be verified, in isolation, against the object ID. The security of the signature still derives from the full length of the signature rather than from the length of the fragment, since a forger cannot predict which fragment a user will randomly choose to verify.

Fragment verification requires fragment identification. Fragments may be explicitly numbered, or may by identified by the two-dimensional coordinate of their tag, modulo the repetition of the signature across continuous tiling of tags.

Note that a trusted authenticator can always perform fragment verification, so fragment verification is always possible when on-line access to a trusted authenticator is available.

Establishing Authentication Database

Prior to allocating a new range of IDs, some setup tasks are required to establish the authentication database.

For each range of IDs a public-private signature key pair is generated and the key pair is stored in the authentication database, indexed by ID range.

For each object ID in the range the following setup is required:
  generate ID padding and store in authentication database, indexed by object ID
  retrieve private signature key by object ID
  generate signature by encrypting object ID and padding, using private key
  store signature in authentication database indexed by object ID, and/or store the padding, since the signature can be re-generated using the ID, padding and private key
  encode the signature across multiple tags in repeated fashion This data is required for the Hyperlabel tags therefore the authentication database must be established prior to, or at the time of, printing of the Hyperlabels.

Security issues are discussed in more detail above.

Off-Line Public-Key-Based Authentication

An off-line authentication device utilises public-key signatures. The authentication device holds a number of public keys. The device may, optionally, retrieve additional public keys on demand, via a transient on-line connection when it encounters an object ID for which it has no corresponding public key signature.

For off-line authentication, the entire signature is needed. The authentication device is swiped over the Hyperlabel tagged surface and a number of tags are read. From this, the object ID is acquired, as well as a number of signature fragments and their positions. The signature is then generated from these signature fragments. The public key is looked up, from the scanning device using the object ID. The signature is then decrypted using the public key, to give an object ID and padding. If the object ID obtained from the signature matches the object ID in the Hyperlabel tag then the object is considered authentic.

The off-line authentication method can also be used on-line, with the trusted authenticator playing the role of authenticator.

On-Line Public-Key-Based Authentication

An on-line authentication device uses a trusted authenticator to verify the authenticity of an object. For on-line authentication a single tag can be all that is required to perform authentication. The authentication device scans the object and acquires one or more tags. From this, the object ID is acquired, as well as at least one signature fragment and its position. The fragment number is generated from the fragment position. The appropriate trusted authenticator is looked up by the object ID. The object ID, signature fragment, and fragment number are sent to the trusted authenticator.

The trusted authenticator receives the data and retrieves the signature from the authentication database by object ID. This signature is compared with the supplied fragment, and the authentication result is reported to the user.

On-Line Secret-Based Authentication

Alternatively or additionally, if a random signature or secret is included in each tag (or tag group), then this can be verified with reference to a copy of the secret accessible to a trusted authenticator. Database setup then includes allocating a secret for each object, and storing it in the authentication database, indexed by object ID.

The authentication device scans the object and acquires one or more tags. From this, the object ID is acquired, as well as the secret. The appropriate trusted authenticator is looked up by the object ID. The object ID and secret are sent to the trusted authenticator.

The trusted authenticator receives the data and retrieves the secret from the authentication database by object ID. This secret is compared with the supplied secret, and the authentication result is reported to the user.

Secret-based authentication can be used in conjunction with on-line fragment-based authentication is discussed in more detail above.

Product Scanning Interactions

Figure 44:
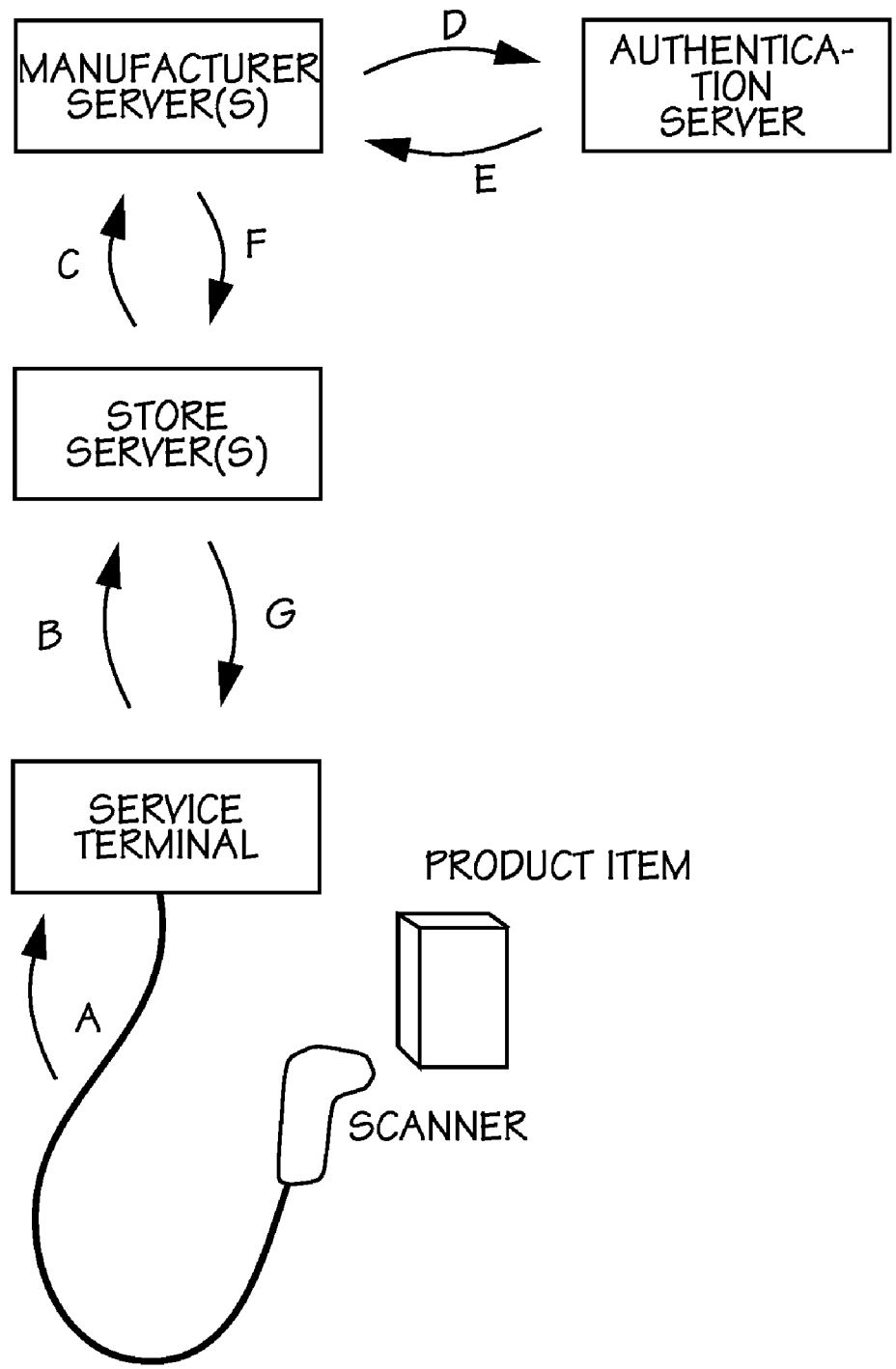
FIG. 44. is an example of Scanning at Retailer interactions.

Product Scanning at a retailer is illustrated in FIG. 44. When a store operator scans a Hyperlabel tagged product the tag data is sent to the service terminal (A). The service terminal sends the transaction data to the store server (B). The store server sends this data, along with the retailer details, to the manufacturer server (C). The Hyperlabel server knows which manufacturer server to send the message to from the object ID. On receipt of the input, the manufacturer server authenticates the object, if the manufacturer is the trusted authenticator. Alternatively the manufacturer server passes the data on to the authentication server to verify the object ID and signature (D). The authentication server sends the authentication result back to the manufacturer server (E). The manufacturer server checks the status of the object ID (against its valid ID lists and hotlist), and sends the response to the store server (F), which in turn send the result back the store service terminal (G). The store server could also communicate with the relevant authentication server directly.

Figure 45:
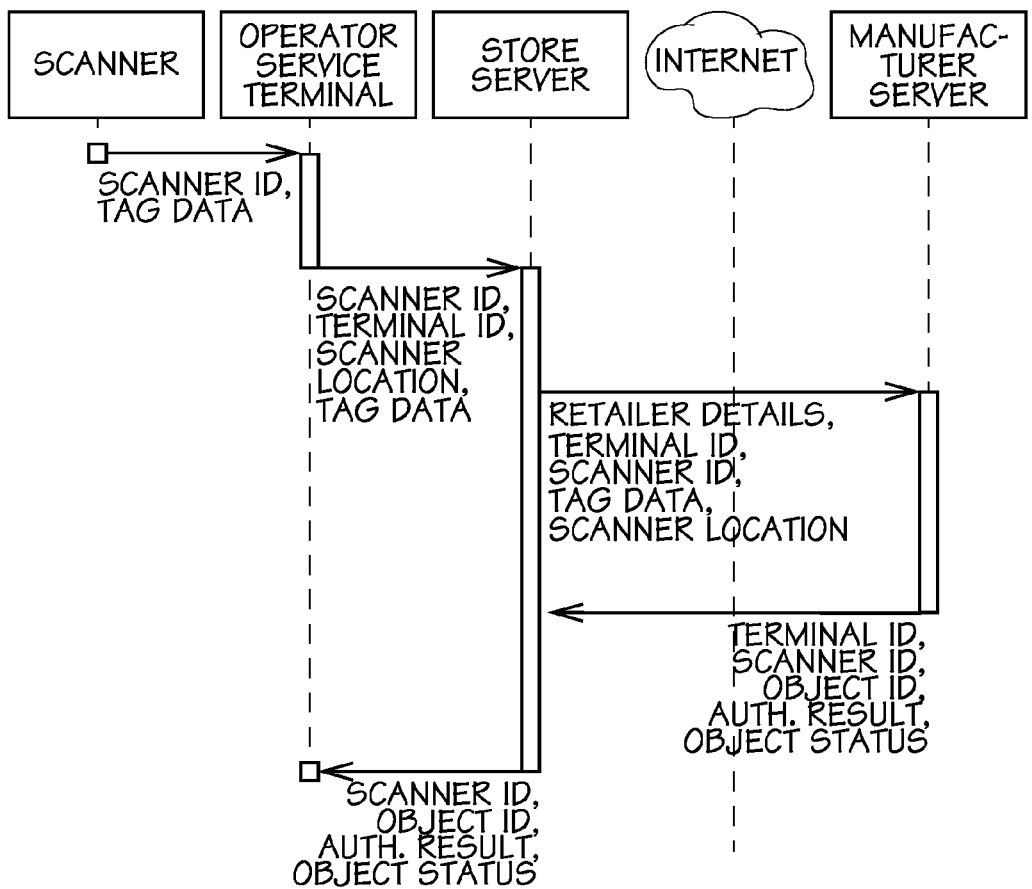
FIG. 45. is an example of Online Scanning interaction detail.

The interaction detail for on-line product scanning at a retailer is shown in FIG. 45. The store operator scans the Hyperlabel tagged product. The scanner sends the scanner ID and tag data to the service terminal. The service terminal sends this data along with the terminal ID and scanner location to the store server. The store server then sends the request on to the manufacturer server, which performs authentication (either itself or via a third party authentication server) and determines the object status. The response is then sent back to the store server, and on to the operator service terminal.

Figure 46:
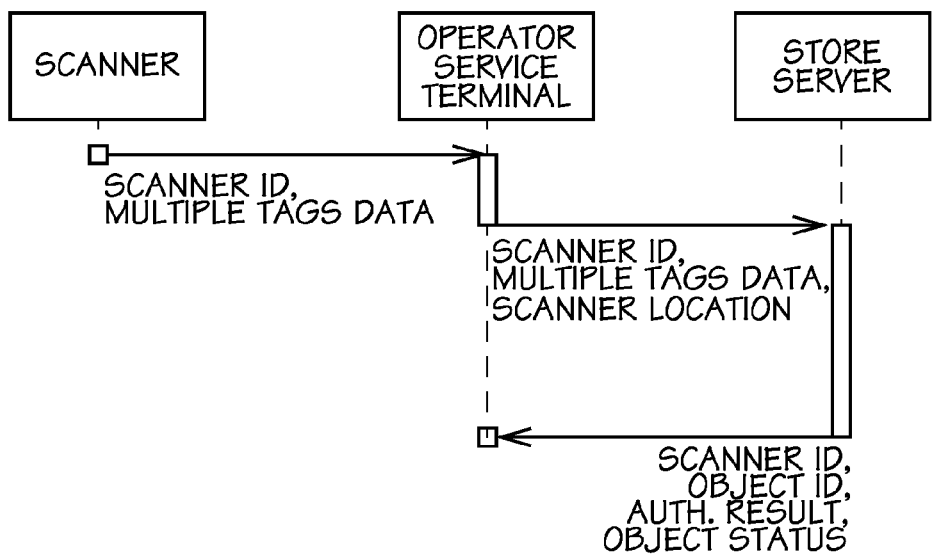
FIG. 46. is an example of Offline Scanning interaction details.

The interaction detail for off-line product scanning at a retailer is shown in FIG. 46. The store operator scans the Hyperlabel tagged product. The scanner sends the scanner ID and tag data from multiple tags to the service terminal. The service terminal sends this data, along with the terminal ID and scanner location, to the store server. The store server then performs off-line authentication, as described in Section 3.4.2, and determines the object status through its cached hotlist, valid object ID lists, and public key list. The store server records the scan details in its internal object scanning history. The response is then sent back to the operator service terminal.

An alternative for off-line product scanner occurs where the scanner is a hand-held, stand-alone scanner. In this case the cached authentication data is stored within the scanner itself, and the scanner performs the validation internally. The object scanning history is also cached within the scanner. Periodically the scanner connects to the central database, uploads it's object scanning history, and downloads the latest public key list, object ID hotlist and valid ID range list. This connection may be automatic (and invisible to the user), or may be initiated by the user, for example, when the scanner is placed in a docking station/charger.

Figure 47:
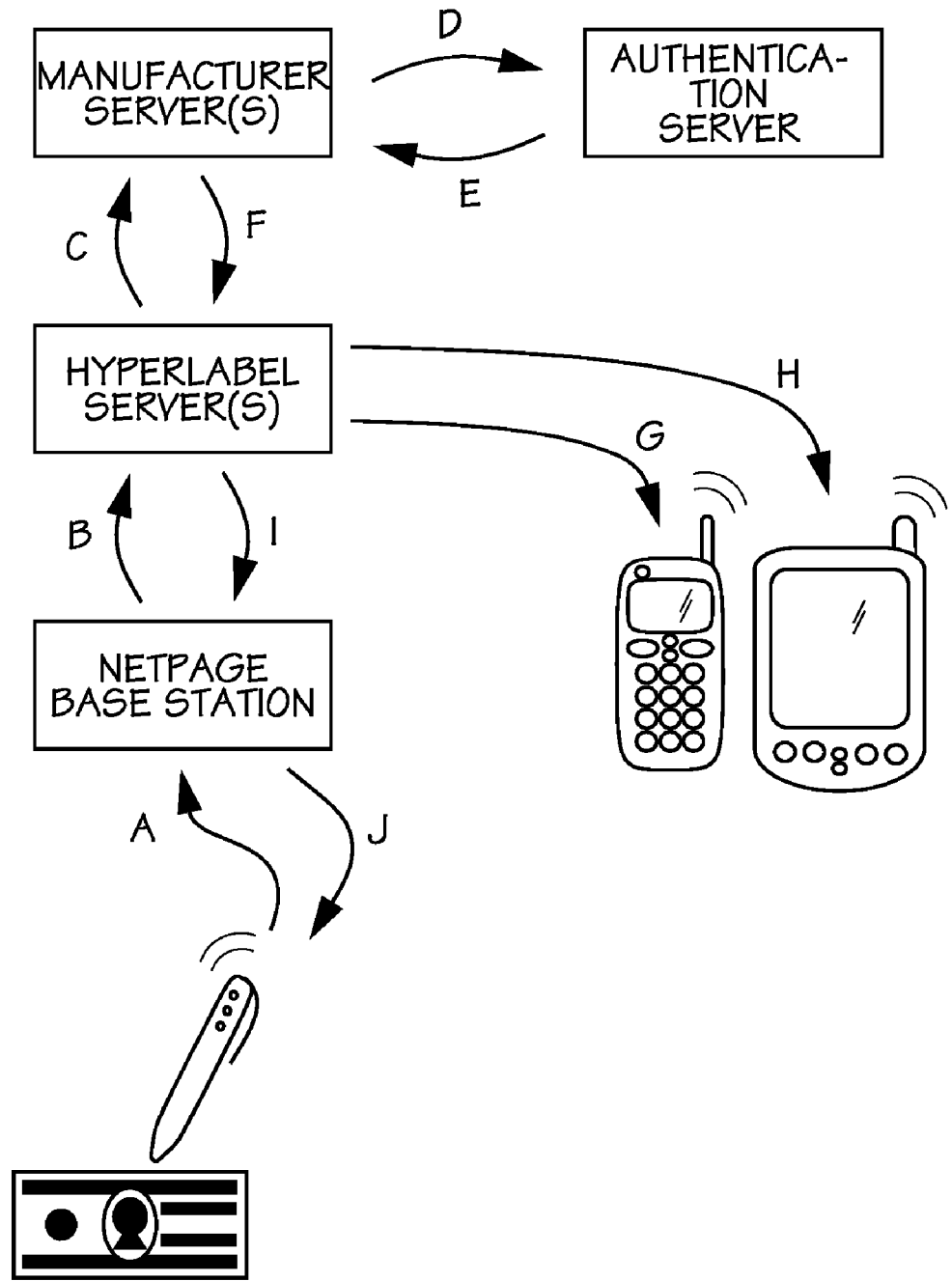
FIG. 47. is an example of netpage Pen Scanning interactions.

Product scanning with a netpage pen or Hyperlabel reader is illustrated in FIG. 47. When a user scans a Hyperlabel tagged item with their netpage pen, the input is sent to the netpage System, from the user's netpage pen, in the usual way (A). To scan a product rather than interact with it, the pen can be placed in a special mode. This is typically a one-shot mode, and can be initiated by tapping on a <scan> button printed on a netpage. Alternatively, the pen can have a user-operable button, which, when held down during a tap or swipe, tells the pen to treat the interaction as a product scan rather than a normal interaction. The tag data is transmitted from the pen to the user's netpage base station. The netpage base station may be the user's mobile phone or PDA, or it may be some other netpage device, such as a PC. The input is relayed to the Hyperlabel server (B) and then on to manufacturer server (C) in the usual way. On receipt of the input, the manufacturer server authenticates the object if the manufacturer is the trusted authenticator. Alternatively the manufacturer server passes the data on to the authentication server to verify the object ID and signature (D). The authentication server sends the authentication result back to the manufacturer server (E). The manufacturer server checks the status of the object ID (against its valid ID lists and hotlist), and sends the response to the Hyperlabel server (G). The Hyperlabel server, as part of the netpage system, can know the identity and devices of the user. The Hyperlabel server will relay the manufacturer server's response to the user's phone (G) or Web browsing device (H) as appropriate. If the user's netpage pen has LEDs then the Hyperlabel server can send a command to the user's pen to light the appropriate LED(s) (I,J).

Figure 48:
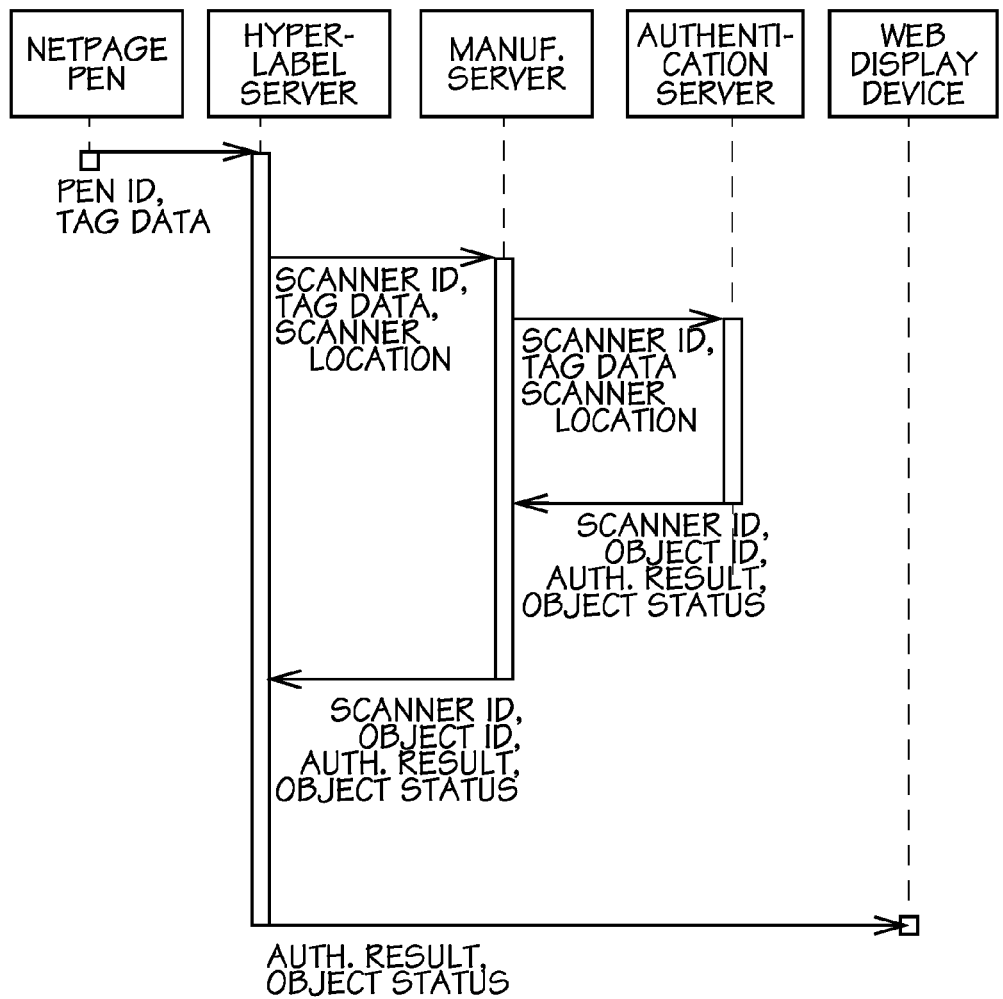
FIG. 48. is an example of netpage Pen Scanning interaction details.

The interaction detail for scanning with a netpage pen is shown in FIG. 48. The netpage pen clicks on the Hyperlabel tagged product. The netpage pen sends the pen id, the product's tag data and the pen's location to the Hyperlabel server. If the pen ID is not already associated with a scanner, the Hyperlabel server may create a new scanner record for the pen, or may use the pen ID as a scanner ID. The Hyperlabel server sends the scanner ID, tag data, and scanner location (if known) to the manufacturer server, which performs authentication (either itself or via a third party authentication server) and determines the object status. The response is then sent back to the Hyperlabel server, and on to the user's default Web browsing device.

Security Tagging and Tracking Object Model

Figure 60:
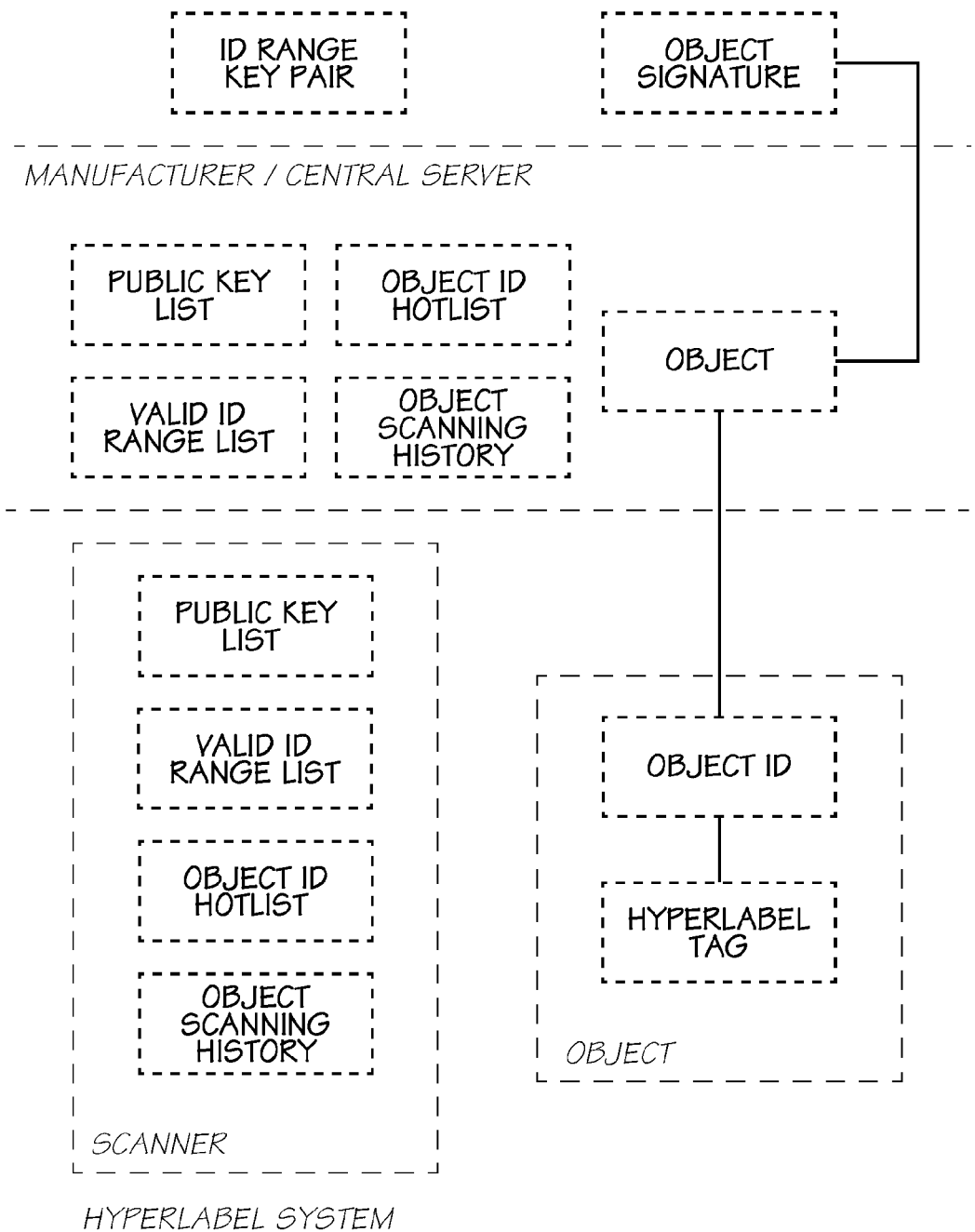
FIG. 60. is an example of Tagging and Tracking Object Management.

The Security Tagging and Tracking object model revolves around Hyperlabel tags, object IDs, and signatures. FIG. 60 illustrates the management and organisation of these objects.

Figure 49:
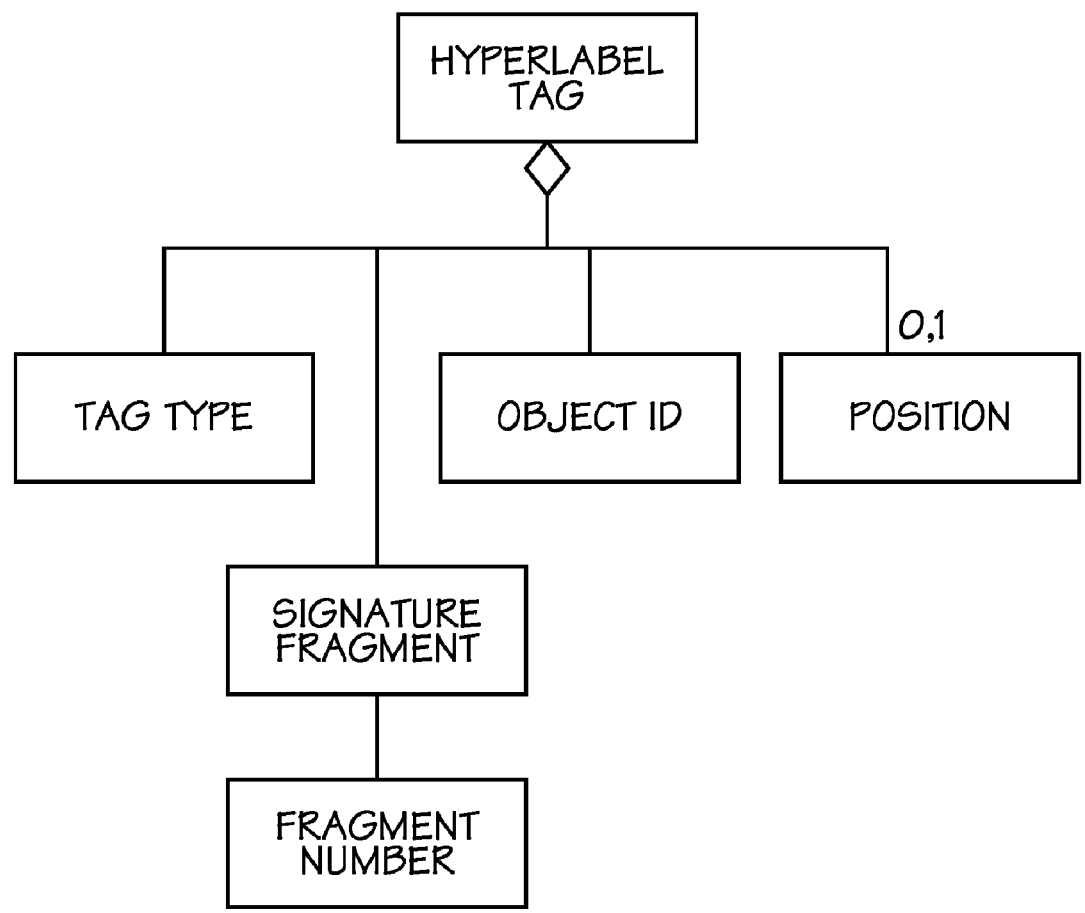
FIG. 49. is an example of a Hyperlabel tag class diagram.

As shown in FIG. 49, a Hyperlabel tag comprises a tag type, object ID, two-dimensional position and a signature fragment. The tag type indicates whether this is a tag on a common object, or whether the tag is on a special type of object such as a currency note or a pharmaceutical product. A signature fragment has an optional fragment number which identifies the fragment's place within the full signature.

Figure 50:
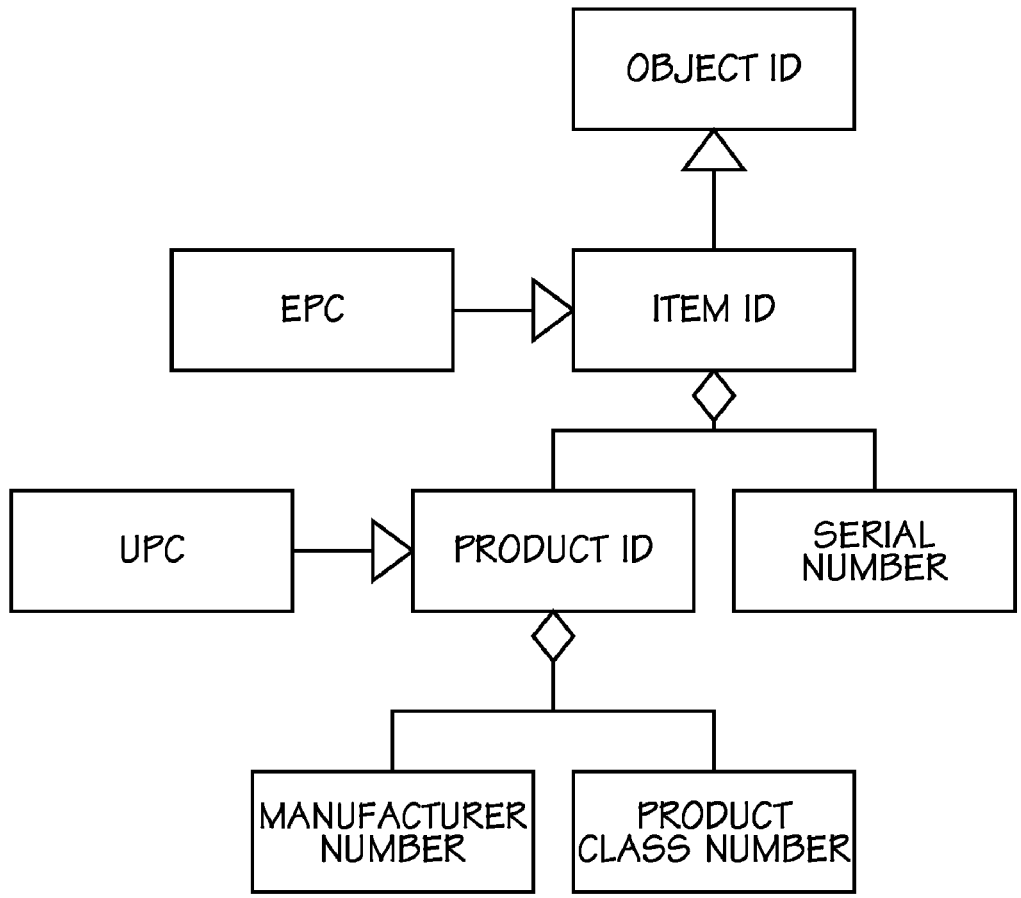
FIG. 50. is an example of an item ID class diagram.

As described above, a product's unique item ID may be seen as a special kind of unique object ID. The Electronic Product Code (EPC) is one emerging standard for an item ID. An item ID typically consists of a product ID and a serial number. The product ID identifies a class of product, while the serial number identifies a particular instance of that class, i.e. an individual product item. The product ID in turn typically consists of a manufacturer number and a product class number. The best-known product ID is the EAN.UCC Universal Product Code (UPC) and its variants. The Item ID class diagram is shown in FIG. 50.

Figure 51:
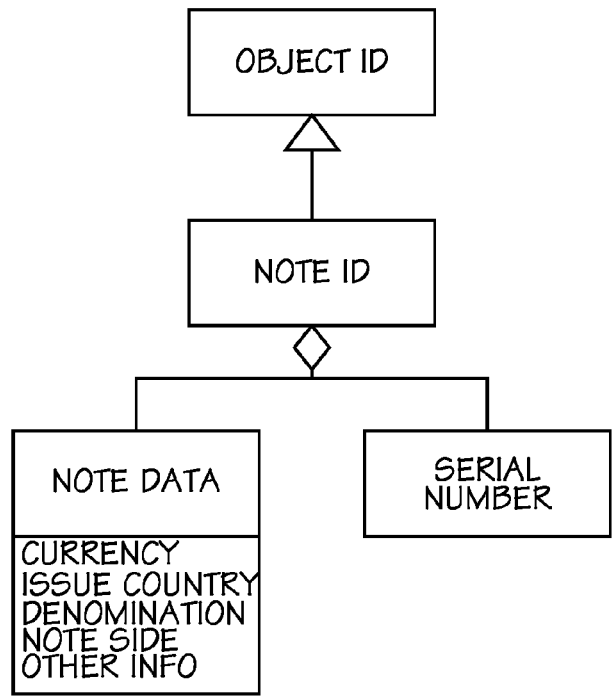
FIG. 51. is an example of a note ID class diagram

Currency notes are identified by a note ID. The note ID comprises note data and a serial number. The note data identifies the type of currency, the country of issue, the note denomination, the note side (front or back) and other currency-specific information. There are two note IDs for each physical bank note—one for each side of the printed note. The Note ID class diagram is shown in FIG. 51.

Figure 52:
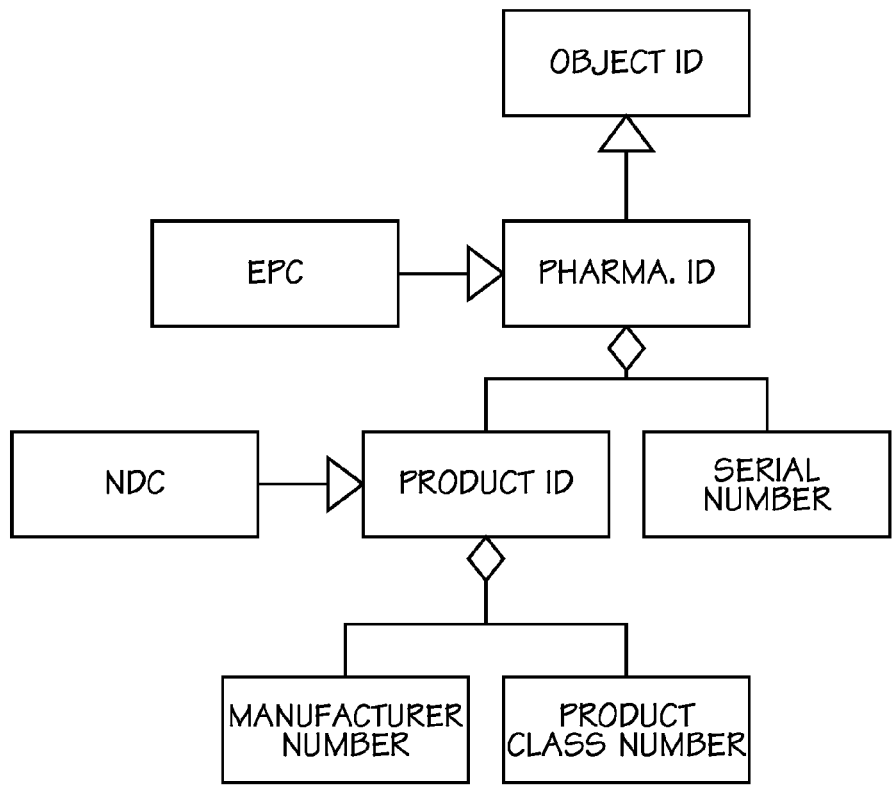
FIG. 52. is an example of a pharmaceutical ID class diagram.

Pharmaceuticals are identified by a pharmaceutical ID. Typically the pharmaceutical ID will be an EPC. A pharmaceutical ID consists of a product ID and a serial number. The product ID in turn typically consists of a manufacturer number and a product class number. The best known product ID for pharmaceutical products is the National Drug Code (NDC), allocated and administered by the US Food and Drug Administration. The Pharmaceutical ID class diagram is shown in FIG. 52.

Figure 53:
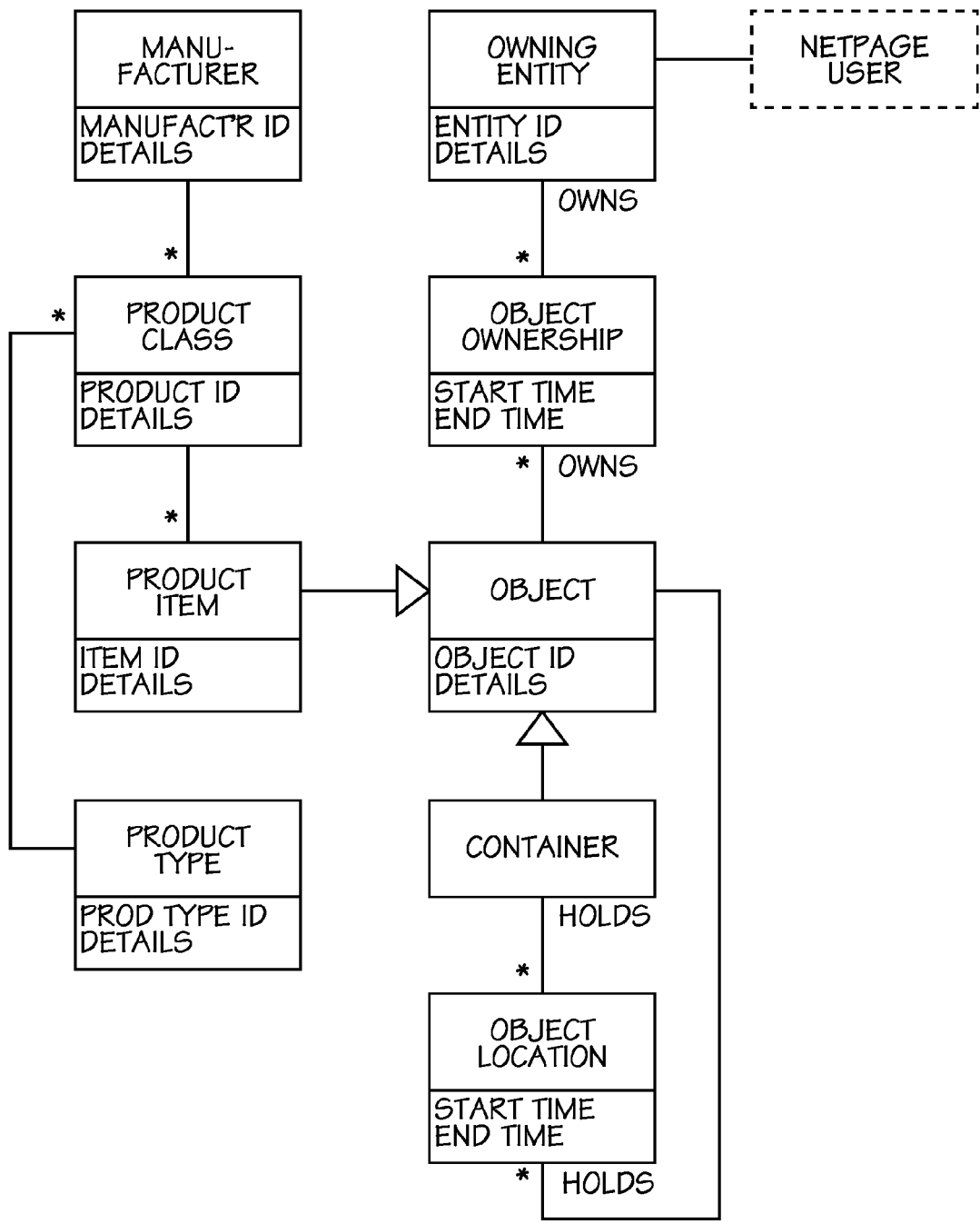
FIG. 53. is an example of an Object Description, ownership and aggregation class diagram.

Object Description, ownership and aggregation class diagram is shown in FIG. 53. This is described in more detail above.

Figure 54:
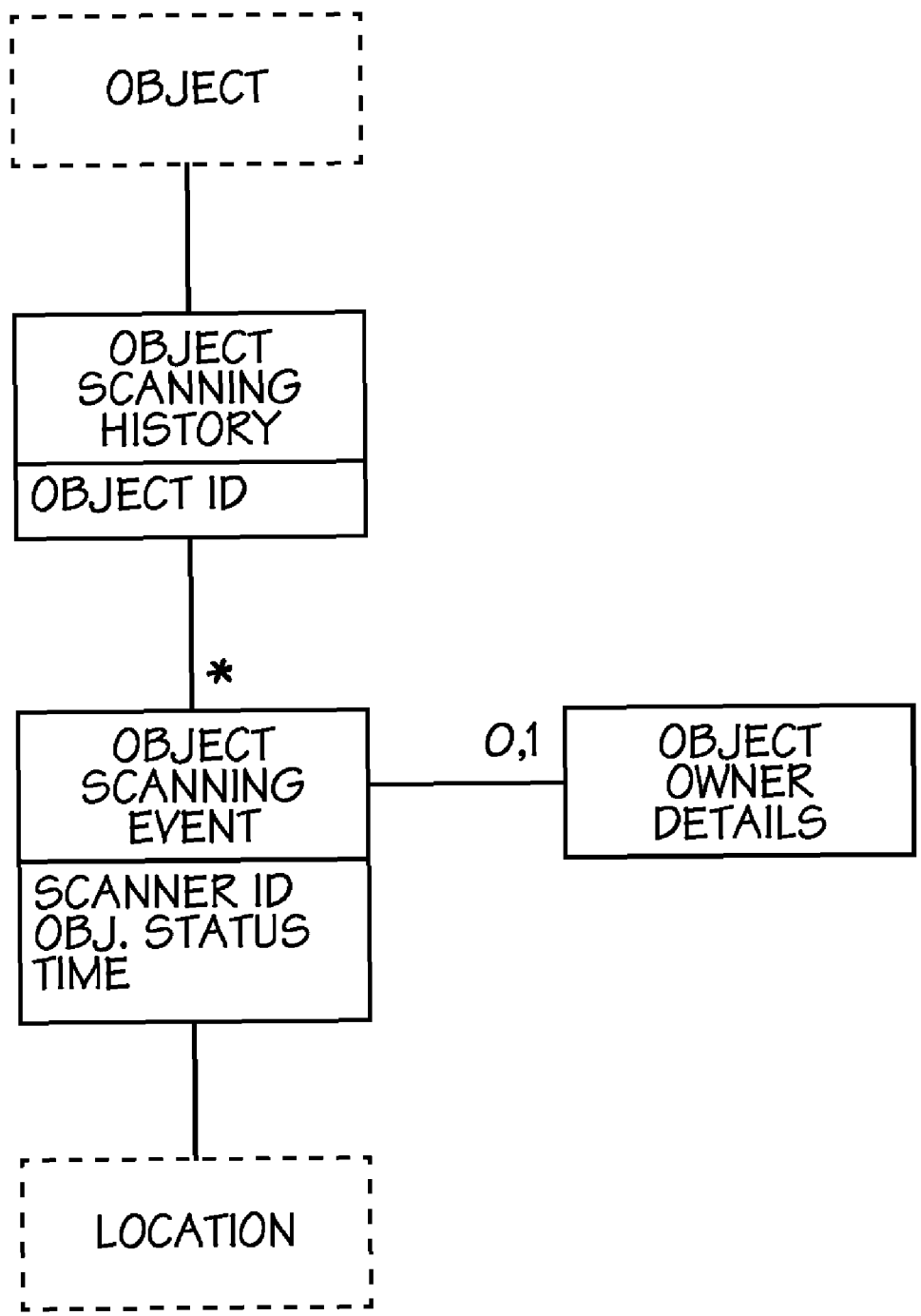
FIG. 54. is an example of an Object Scanning History class diagram.

The Object Scanning History class diagram is shown in FIG. 54. An object has an object scanning history, recording each time the scanner scans an object. Each object scanned event comprises the scanner ID, the date and time of the scan, and the object status at the time of the scan, and the location of the scanner at the time the object was scanned. The object status may be valid, stolen, counterfeit suspected, etc. If known, the object owner details may also be recorded.

Figure 55:
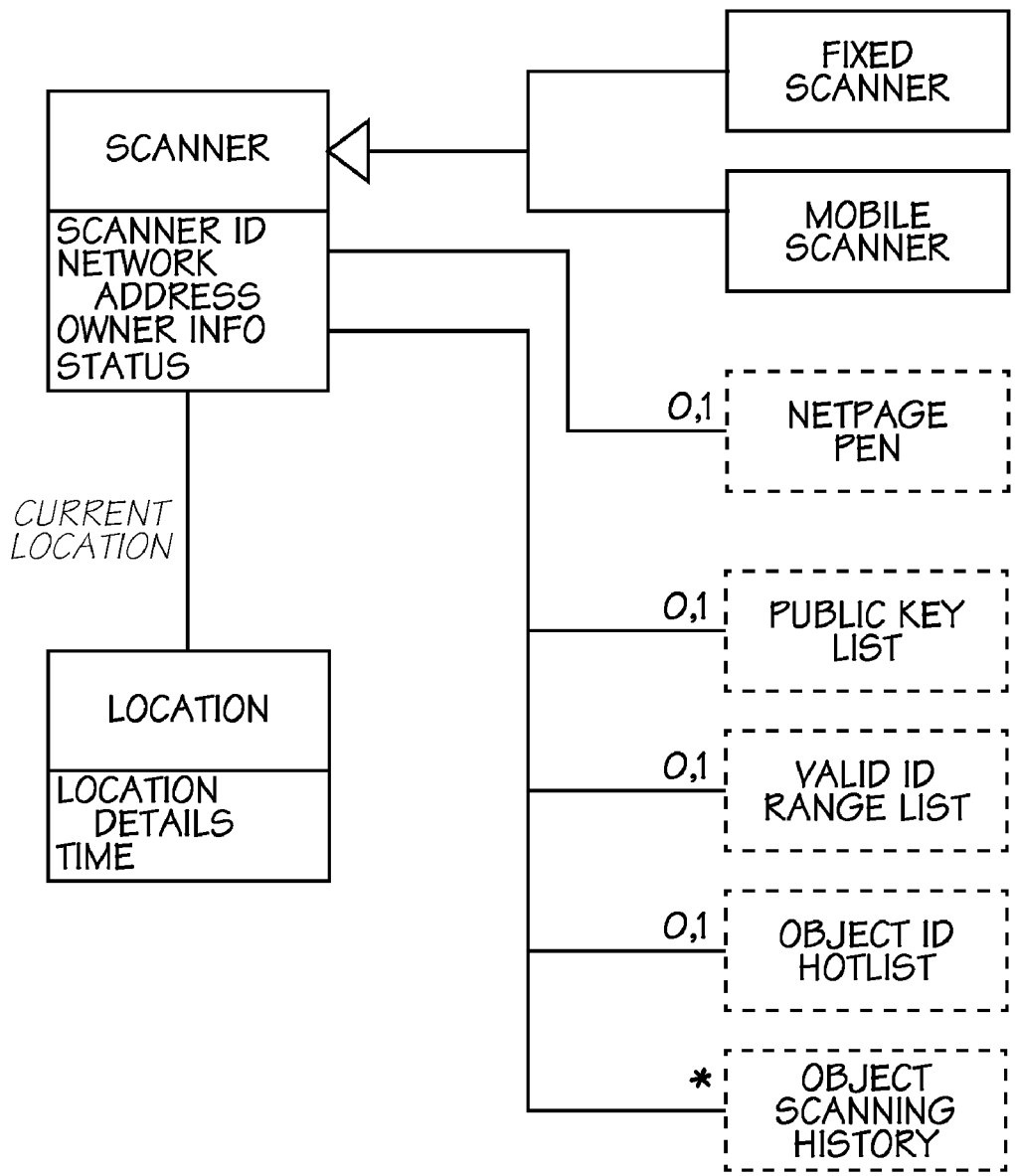
FIG. 55. is an example of scanner class diagram.

A scanner has a unique scanner ID, a network address, owner information and a status (e.g. on-line, off-line). A scanner is either a mobile scanner, whose location may vary, or a fixed scanner, whose location is known and constant. A scanner has a current location, comprising the location details and a timestamp. A scanner may be a netpage pen, in which case it will be associated with a netpage Pen record. If a scanner is off-line, it will keep an object scanning history, and will optionally store a public key list, a valid ID range list and an object ID hotlist. The scanner class diagram is shown in FIG. 55.

Figure 56:
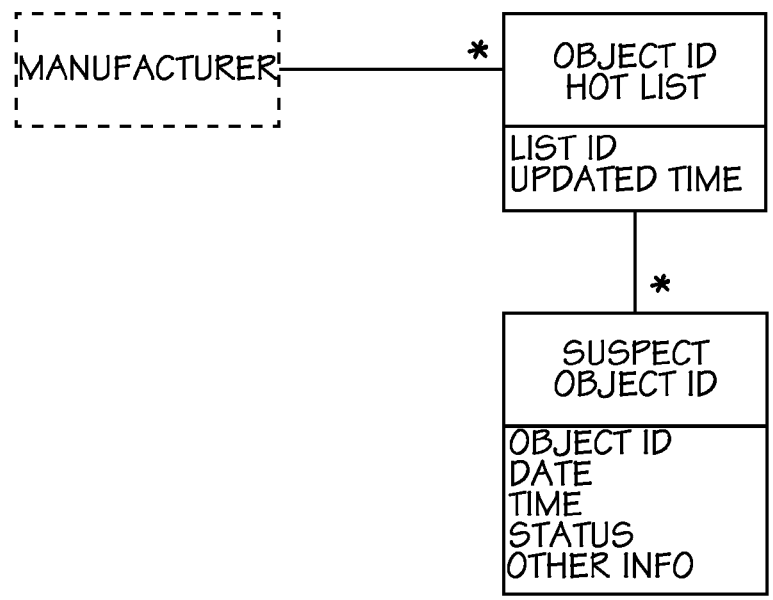
FIG. 56. is an example of an object ID hot list diagram.

The manufacturer, or other central authority, maintains a number of Object ID Hot Lists, each with a unique list ID, and the time the list was last updated. Each hot list comprises a list of suspect object IDs, comprising the object ID, date, time, status (suspected counterfeit, stolen, etc.) and other information. The Object ID Hot List class diagram is shown in FIG. 56.

Figure 57:
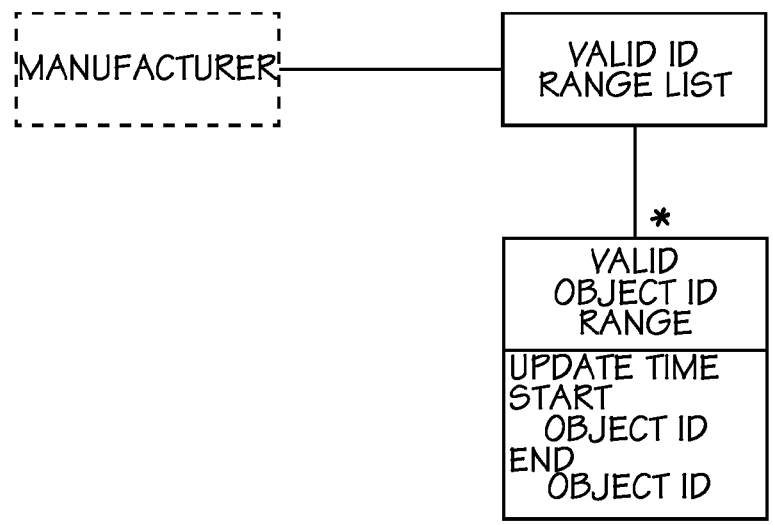
FIG. 57. is an example of a valid ID range class diagram.

The manufacturer, or other central authority, maintains a list of valid ID ranges. Each valid object ID range entry in the list comprises the start object ID and end object ID (the valid ID range) and the time the entry was updated. The Valid ID Range List class diagram is shown in FIG. 57.

Figure 58:
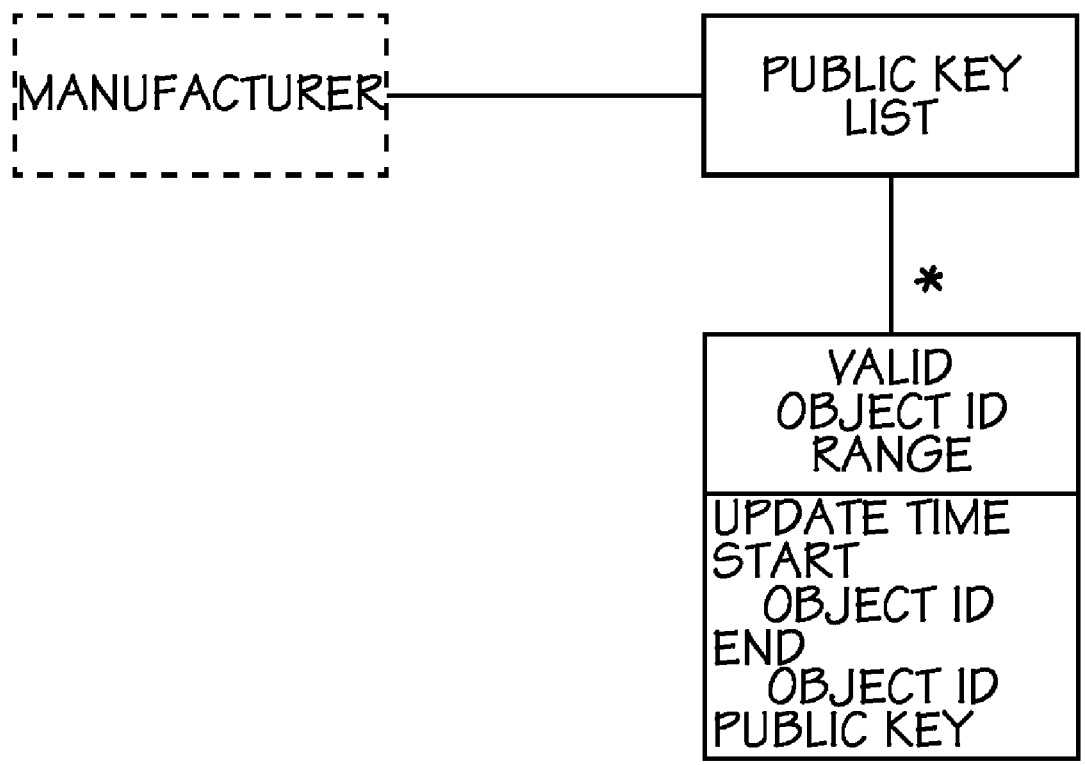
FIG. 58. is an example of Public Key List class diagram.

The manufacturer, or other central authority, maintains a public key list. The public key list consists of a number of entries identifying the public key for a range of Object IDs. Each valid object ID range entry comprises the update time for the entry, the start object ID for the range, the end object ID for the range, and the public key applicable to each object ID in the given range. The Public Key List class diagram is shown in FIG. 58.

Figure 59:
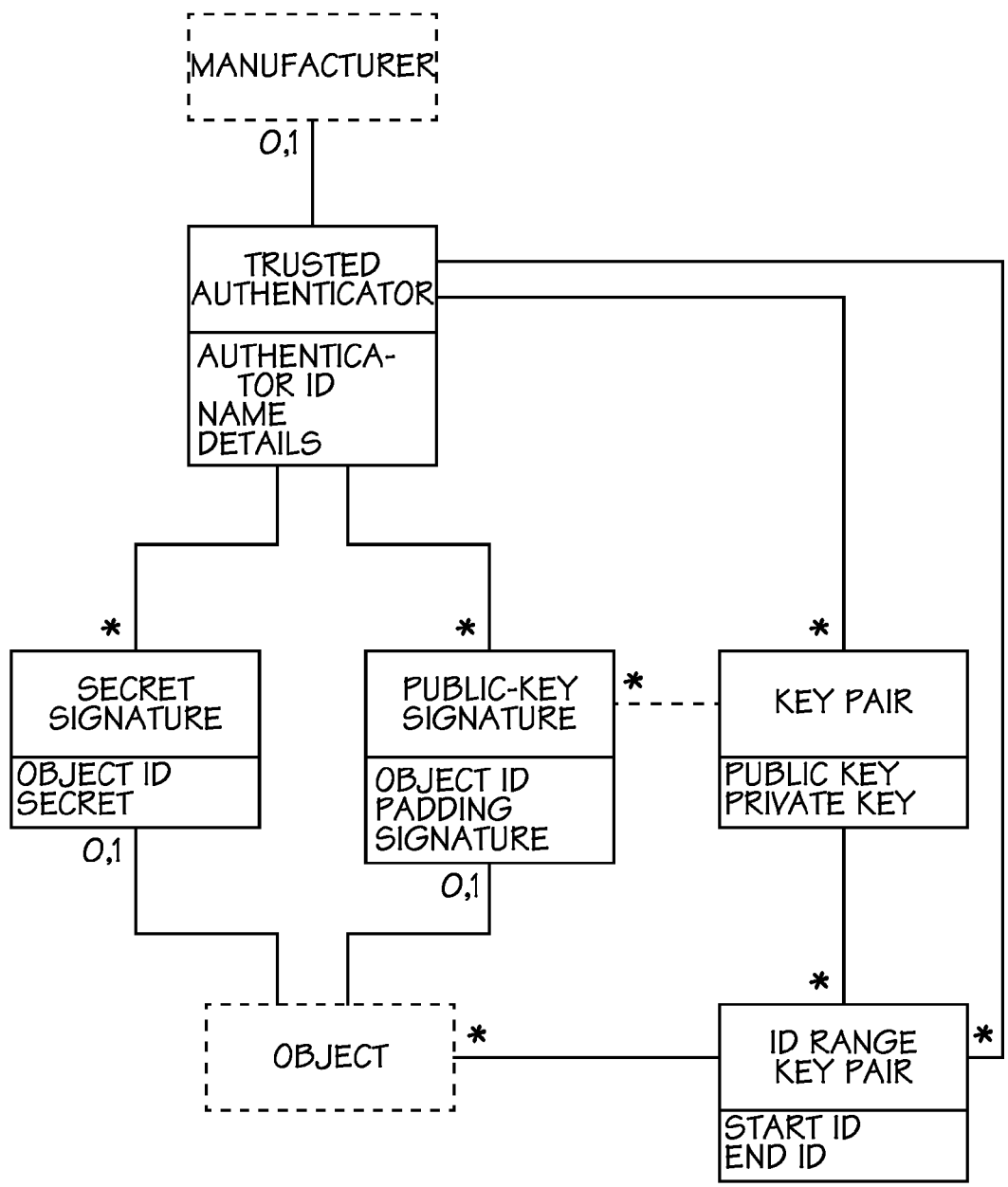
FIG. 59. is an example of a Trusted Authenticator class diagram.

Object authentication may be performed by the manufacturer, or by a third-party trusted authenticator. A trusted authenticator has an authenticator ID, name and details. A trusted authenticator holds a list of public-private key pairs, each associated with one or more ID ranges. This is a list of object ID ranges (identified by the start and end ID) and the corresponding public/private signature key pair. A trusted authenticator also holds a list of secret signatures, and a list of public-key signatures. Each public-key signature identifies the actual signature and/or the padding used to generate the signature. Each secret signature and public-key signature is associated by object ID with a unique object. The Trusted Authenticator class diagram is shown in FIG. 59.

Applications

It will be appreciated that Hyperlabel tags can be used with a range of objects, including, for example, items of manufacture, pharmaceutical items, currency notes, cheques, credit or debit cards, redeemable tickets, vouchers, coupons, lottery tickets instant win tickets, or identity cards or documents, such as a driver's licenses or passports.

The identity can include at least one of an Electronic Product Code (EPC), a National Drug Code (NDC) number, a serial number of a pharmaceutical item, a currency note attribute such as a value or the like, a cheque attribute or a card attribute such as card type, issuing institution, account number, issue date, expiry date or limit.

Advantages of Hyperlabel

Unlike 2D optical barcodes that are often difficult to read due to label damage and a direct 'line-of-sight' requirement needed for scanning, optically readable, but invisible, infra-red Hyperlabel tags, are printed all over, or on a large section of a product label. Hyperlabel tags support line-of-sight omnidirectional reading. In practice, the Hyperlabel reader is designed to scan the scanning field from at least two substantially orthogonal directions. This helps the reader to avoid occlusions which may occur if a hand is holding an item. Hyperlabel tags also incorporate Reed-Solomon error correction methods to improve reliability.

A further advantage of Hyperlabels over barcodes is that they are unobtrusive to the customer as they do not use visible label space, and tag information is not restricted to only one section of a label.

Hyperlabel tags are therefore easy to locate, easy to read, and enable accurate automatic scanning Hyperlabels are less promiscuous than RFID tags since they require line-of-sight for reading. This means that it will be difficult for customers to have their product scanned for information without their knowledge. Hyperlabels provide customers with the means to protect their privacy.

Hyperlabels as Interactive Web Pages

A distinctive and unique feature of Hyperlabel technology is that Hyperlabels provide the opportunity to design packaging labels as interactive 'Web pages'—and thus make it possible for a whole new range of product-linked customer services to be introduced by the pharmaceutical industry.

When digital pen use becomes widespread, product graphics can be added to labels to indicate interactive areas and prompting customers to write or click using a Netpage pen. A digital Netpage pen can identify the x-y position on a label, and enable a link to be established between the information on the label, and a Web page on a server. The Netpage pen connects the customer to an Internet-based Hyperlabel Server through a companion device such as a mobile phone or computer.

Using a Netpage pen to interact with the label, customers can be offered additional information on drug use, risks and advice on potential interactions between drugs. It could also provide an opportunity for customers to register for participation in new drug trials, to enter promotions, to participate in Web chat sessions, or to receive 'free' samples. Web pages can be customised based on customer profiles, local area health data, or by using a range of product supply chain data such as geographic location.

Hyperlabels therefore make it possible for the pharmaceutical industry to extend the use of product labels and packaging to increase brand strength, and to establish closer links with customers. Thus, with Hyperlabels, the customer can become an integral part of the product supply chain, and supply chain data can be integrated with customer relationship management (CRM) or healthcare databases to improve the overall efficiency and level of service offered to customers.

Hyperlabel Tags Encoding Layout Data

A Hyperlabel tagged surface carries a continuous array of Hyperlabel tags. These typically encode the product item's unique identifier (e.g. EPC) and digital signature(s), as well as a two-dimensional coordinate grid.

A range of analog printing processes are used to produce labels and packaging, including gravure, letterpress, offset, flexographic, and digital. Some packaging is produced using multiple processes in sequence. For example, package graphics may be printed on a web-fed flexographic press, while batch and expiry information is digitally printed onto each finished package using laser marking or inkjet.

Hyperlabel tags may be printed digitally using an add-on digital printer, placed either before or after the colour press. The Hyperlabel digital add-on printer can utilise a Memjet printhead as described earlier, or any of a range of commercially-available laser and inkjet printheads such as from HP Indigo, Xaar, Xeikon, Agfa.dotrix, VideoJet, Mark Andy, etc. The Hyperlabel digital printer can be web-fed or sheet-fed according to the line to which it is added.

The add-on digital printer must be synchronised with the colour press to ensure registration between printed graphics and Hyperlabel tags. This can be achieved by conventional means, for example by generating an electronic signal in the colour press synchronised with the printing of an impression, and feeding that signal to the Hyperlabel printer. Alternatively, the Hyperlabel printer can optically detect printed fiducials produced by the colour press, as is sometimes used to synchronise die cutters with a colour press.

The Hyperlabel printer can be merely approximately synchronised with the colour press, and fine synchronisation can be achieved by measuring the actual registration achieved and recording a corresponding offset in the Netpage server database, as described elsewhere in relation to pre-tagged Netpage blanks. The measurement can take place while the packaging is still in the form of web or sheet media, or after being folded or applied to the product item. In the former case detection of the registration of the product graphics is still required, for example via fiducials as mentioned above. In the latter case registration of the product graphics is determined by virtue of the individual package passing along the line. This may be intrinsic in the design of the line, or may involve a photodetector to detect passage of the item. Detection of the Hyperlabel tag pattern uses a Hyperlabel reader in both cases.

Web or sheet media can be pre-printed (or printed in-line by an upstream digital Hyperlabel printer) with Hyperlabel tags which encode a continuous and large two-dimensional coordinate space and no explicit item identifiers. After passing through the colour press, each item's packaging will have a different range of coordinates. These can be detected as described above and recorded in the Netpage server database (and/or a product database) as being associated with the item and its item identifier. When a Hyperlabel tag on a particular item is subsequently read, its coordinate can be translated into an item identifier by querying the Netpage server (or product server).

A digital printhead can be adapted to print both product graphics and Hyperlabel tags, as described earlier in relation to Memjet digital printheads. Other digital printheads can be similarly adapted through the provision for an extra, infrared, ink channel.

As an alternative to digitally printing Hyperlabel tags, Hyperlabel tags can be printed using an analog process such as gravure, letterpress, offset or flexographic, for example on the same colour press used to print product graphics. A colour press is adapted to print Hyperlabel tags through the provision of an extra, infrared, ink channel; i.e. through the provision of an extra plate which bears the image of the Hyperlabel tags. The Hyperlabel plate can be produced by conventional means, such as computer to film (CtF) or direct computer to plate (CtP).

Note that although Hyperlabel tags are ideally printed using an invisible ink such as infrared ink, they can also be printed using a visible ink such as a coloured, black or gray ink. And although Hyperlabel tags are ideally printed over the entire product package, they can also be printed selectively in specific areas. And although Hyperlabel tags are ideally position-indicating, they can also be object-indicating, as described elsewhere.

Figure 61:
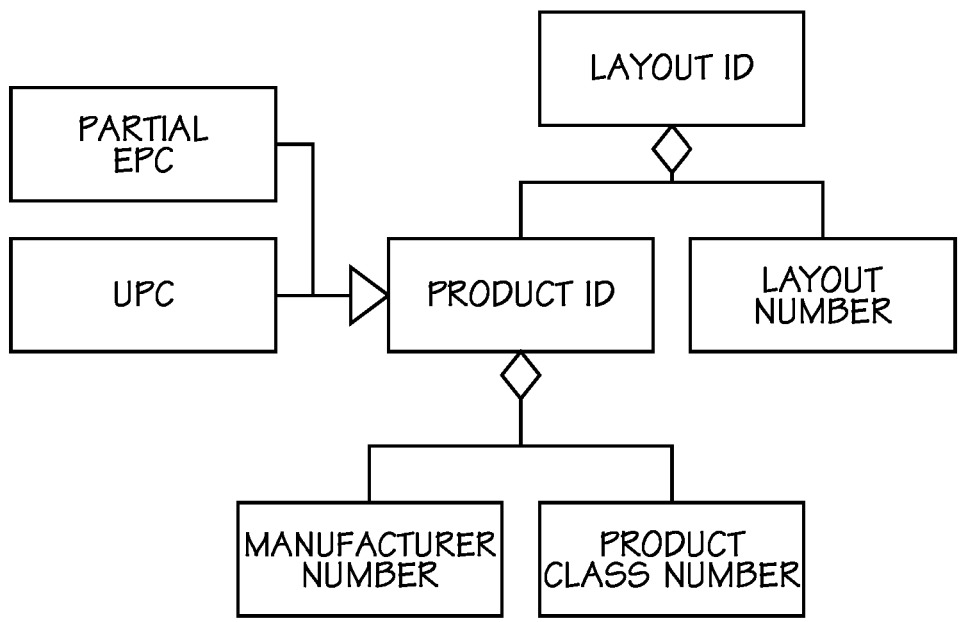
FIG. 61. is an example of a layout ID class diagram.
Figure 62:
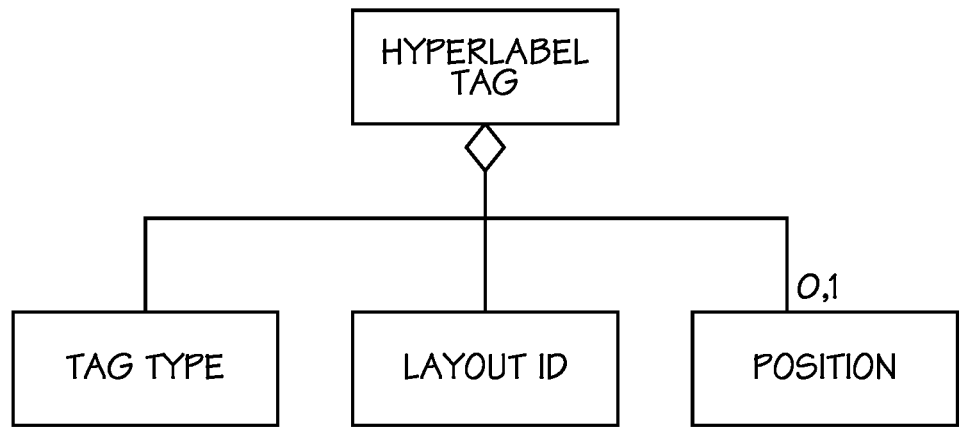
FIG. 62. is an alternative example of Hyperlabel tag class diagram.

If Hyperlabel tags are printed using an analog press, then it is impractical to provide each product item package with a unique serial number. However, the Hyperlabel tags can still encode the product identifier portion of the item identifier and the usual two-dimensional coordinate grid. In addition, the tags must encode a unique layout number which identifies the particular graphic (and interactive) layout of the package. The Hyperlabel tags also encode a flag which allows any Hyperlabel reader to determine that the tags encode a layout number rather than a serial number. The layout number only needs to be unique for different layouts associated with the same product identifier. It forms a unique layout identifier when paired with a product identifier, as shown in FIG. 61. The layout number changes precisely when new plates are produced for a new graphic package design, such as for a particular promotion or a particular geographic region. CtP makes frequent layout changes particularly convenient. Analog-printed Hyperlabel tags can thus encode a layout identifier rather than an item identifier, as shown in FIG. 62. During a subsequent interaction with a product item via a Hyperlabel reader, the layout identifier is used to retrieve the corresponding layout to allow the interaction to be interpreted in the usual way. For convenience we refer to such Hyperlabel tags as "layout-indicating" (to distinguish then from item-indicating Hyperlabel tags), and the data sent from the Hyperlabel reader to the Netpage server as "layout data".

It is convenient to encode a product identifier in the layout identifier, since it allows a Hyperlabel reader to identify the product. However, it is also possible to encode a pure layout identifier in Hyperlabel tags which identifies the layout but does not directly identify the product. Equivalently, it is possible to encode a pure coordinate grid in the Hyperlabel tags and use the range of the coordinates to identify the corresponding layout. Thus all product items sharing the same graphic package layout would share the same coordinate grid range, and a change in layout would result in a change in coordinate grid range. The equivalence of a pure coordinate grid and a coordinate grid coupled with an item or layout identifier is discussed in the cross-referenced applications.

Layout-indicating Hyperlabel tags can confer interactivity in the usual way via the layout identifier and the coordinate grid that they encode, and product identification (but not product item identification) via the product identifier they encode.

Identification of individual product items is still important. It confers the various supply chain benefits discussed at length elsewhere, and plays a role in various interactive scenarios. For example, some product promotions may ideally be single-use, such as entering a competition or redeeming a token.

In addition, item-level identification, coupled with a digital signature unique to the item, allows product item authentication. In the following discussion, item-indicating Hyperlabel tags typically carry the digital signature(s) of the item in the usual way.

Location-Indicating Tags in Conjunction with Alternative Item Identifiers

Item-level identification can be provided in a variety of ways in conjunction with location-indicating or layout-indicating Hyperlabel tags. For example, location- or layout-indicating tags can be printed over the whole package, while item-indicating tags can be printed in only a small area. This has the benefit that the corresponding digital Hyperlabel printer can be relatively small, since it is no longer required to print tags across the full width of a web or sheet, but only onto a small area of each package. Digital printers for printing batch and expiry information, as well as for printing item-level indicia such as two-dimensional barcodes, are already part of conventional packaging workflows. A small-area digital Hyperlabel printer is can be incorporated in a similar place in such packaging workflows.

Figure 67:
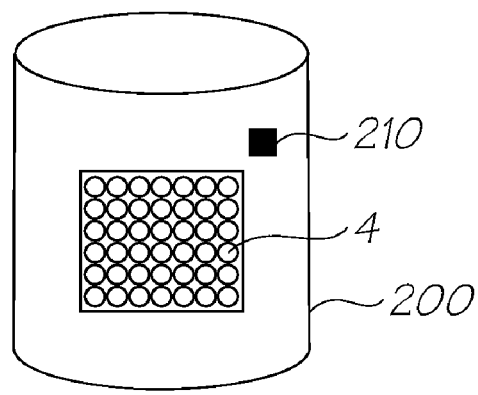
FIG. 67 shows a consumer product item with Hyperlabel tags and an RFID tag.
Figure 68:
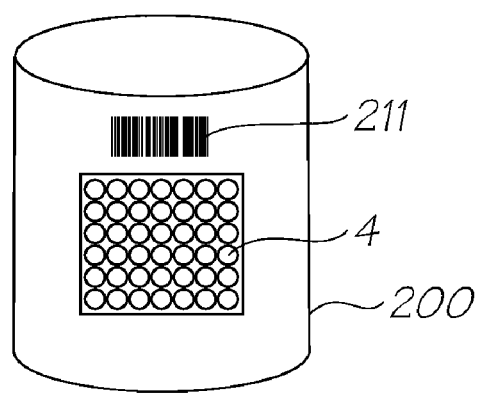
FIG. 68 shows a consumer product item with Hyperlabel tags and a separate barcode identifier.

Item-level identification may be provided using a conventional radio-frequency identification (RFID) tag 210 or a linear or two-dimensional barcode 211 (FIGS. 67 and 68). Even if such carriers are present on a package, it can be convenient to also provide item-indicating Hyperlabel tags 4 in a small area, since these are readable by a standard Hyperlabel reader. Any Hyperlabel hyperlink which requires item-level identification, such as competition entry, token redemption or item authentication, can be implemented in the item-indicating Hyperlabel area. Alternatively, the user can be prompted to click in the item-indicating Hyperlabel area to identify the item, after invoking a single-use hyperlink elsewhere on the product where only layout-indicating tags are present.

If the item-level identification carrier is an RFID tag 210, then the Hyperlabel reader 101 can incorporate an RFID tag reader to allow it to obtain the item identifier from the RFID tag 210 at the same time as it reads location- or layout-indicating Hyperlabel tags 4. Having read the data contained in the Hyperlabel tag(s) 4 and the RFID tag 210, the Hyperlabel reader sends "indicating data", which identifies the item ID and the position of the reader, to the Netpage server. In the case that the Hyperlabel tags 4 are location-indicating tags, the Netpage server can identify the layout from the item ID contained in the indicating data. Thus a Hyperlabel hyperlink requiring item-level identification can be implemented via a combination of location- or layout-indicating Hyperlabel tags 4 and an RFID tag 210. Accordingly, the Hyperlabel reader 101 may comprises an optical sensor for sensing the Hyperlabel tags 4, an RFID transceiver for sensing the RFID tag, a processor for generating the indicating data and means for communicating with the Netpage server (e.g. by wireless or wired communication)

Equivalently, a device already enabled with an RFID reader to provide gross interactivity with an RFID-tagged object or surface can be augmented with a Hyperlabel reader to allow it to support much more fine-grained interactivity with an RFID- and Hyperlabel-tagged object or surface.

If the item-level identification carrier is a visible barcode 211, then invisible item-indicating Hyperlabel tags 4 can be provided in the same area as the barcode. This allows a user of a Hyperlabel reader 101 to click on the barcode to obtain the item identifier, even though the Hyperlabel reader 101 may be unable to read the (arbitrarily large) visible barcode. Alternatively or additionally, item-indicating tags can be printed adjacent to the barcode using the same visible ink as the barcode, to eliminate the need for a separate Hyperlabel ink channel. A Hyperlabel reader 101 can also be augmented to allow it to read conventional barcodes.

An RFID tag or barcode can encode the same item identifier and digital signature(s) as an item-indicating Hyperlabel tag.

Rather than encoding an item identifier explicitly in an RFID tag 210, barcode 211 or Hyperlabel tag 4, a random pattern can be printed and characterised to serve both as an item identifier and as a digital signature. The random pattern, or at least a portion thereof, serves as a "fingerprint" for the object.

In U.S. Patent Application Number 20050045055 ("Security Printing Method" filed 28 Aug. 2003), the contents of which is incorporated herein by reference, Gelbart discusses the addition of powder taggants during printing for the purpose of subsequent authentication. As discussed elsewhere, both the presence of such a taggant and the exact random pattern formed by the taggant can be used as the basis for authentication and possibly identification.

When the random pattern formed by the taggant is used as the basis for authentication, the pattern is measured and recorded during product manufacture or packaging, and is measured and verified, with reference to the earlier recording, during subsequent authentication. The random pattern may cover the entire product surface or a subset thereof. The recorded reference data (reference fingerprints) derived from the pattern may cover the entire pattern or a subset thereof. The verification data (or fingerprint data) derived from the pattern during authentication typically relates to only a small area (e.g. one fingerprint) of the pattern. It is therefore necessary to know which area of the pattern is being verified, so that the verification data can be compared with the correct subset of the reference data. In some systems this relies on detecting other surface features, such as text or line art, and using such features as fiducials. Since such features are typically not unique, this approach may require guidance from a human operator.

Figure 69:
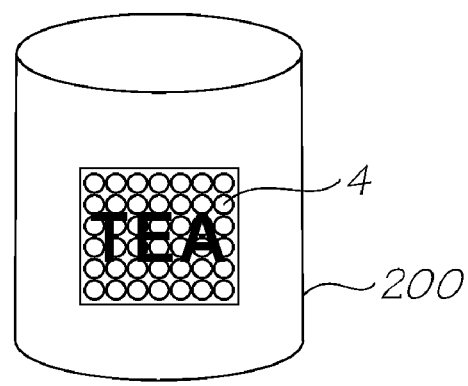
FIG. 69 shows a consumer product item with Hyperlabel tags and graphic data containing a randomly distributed taggant overprinted on the Hyperlabel tags.
Figure 70:
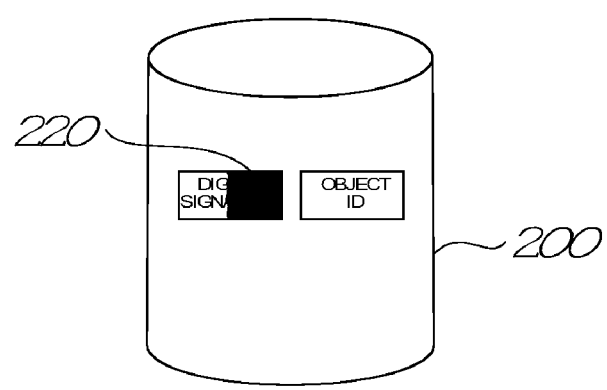
FIG. 70 shows a consumer product item with an object identifier code and a digital signature code having a mask layer partially scratched off.

Hyperlabel tags 4, since they encode a two-dimensional coordinate grid, provide a unique set of fiducials against which both reference data and verification data can be registered. This increases the reliability of authentication, and eliminates the need for human guidance. The taggant may be mixed with either the infrared ink used to print the Hyperlabels, or it may be mixed with the colored inks used to print graphical user information. In FIG. 69, the ink used to print the word 'TEA' contains a randomly dispersed taggant. Alternatively, if the taggant is applied by mixing it with an infrared ink, then the high density and (typical) full coverage of the Hyperlabel tag pattern 4 ensures that the taggant is also densely present on the entire tagged surface.

Although the random pattern formed by the taggant can be measured across the entire tagged surface, at a minimum it can be measured within a defined region. This region can be graphically delineated to indicate to a user that this is where item-level identification and/or authentication is available.

The random pattern can be characterised for each product package as it passes through the packaging line, either while the packaging is still on the web or sheet, or after the individual package is folded or filled. At this stage the spatial nature of the random pattern is analysed and recorded, either as a set of spatial features or as a hash of such spatial features. For example, each detected feature in the random pattern can be assigned a quantised two-dimensional coordinate within the Hyperlabel coordinate system, and the set of quantised coordinates can be hashed to produce a single compact number. Verification then consists of generating the equivalent hash and comparing it with the reference hash.

A Hyperlabel reader 101 may incorporate a reader for reading the random pattern formed by the taggant. If the taggant is read optically, then the Hyperlabel reader's image sensor can be used to read the taggant pattern. If the taggant uses a different wavelength to the Hyperlabel tag pattern, then the Hyperlabel reader 101 can alternate between activating LEDs matched to the wavelength of the Hyperlabel tag pattern, and LEDs matched to the wavelength of the taggant. If the taggant needs to be imaged with a greater magnification than the Hyperlabel tag pattern, then the Hyperlabel reader can either always image at the greater magnification, and subsample when processing Hyperlabel tag images, or it can incorporate dual optical paths, optionally using a beam splitter to allow a single external aperture.

If no explicit item-level identifier is available (e.g. from an RFID tag 210, barcode 211 or Hyperlabel tag 4), then the reference data (e.g. hash) can also serve as an item identifier. The product item is assigned a standard item identifier at time of manufacture, the standard item identifier is stored in the product database keyed by the reference data, and the standard item identifier can subsequently be recovered using the verification data (e.g. hash) as a key to look up the database, either for identification or verification purposes.

In the presence of layout-indicating Hyperlabel tags which encode a product identifier, the random pattern only needs to map to a serial number, not an entire item identifier.

A serialised product item carries a unique item identifier which typically consists of a product identifier and a serial number. The item ID may be carried by the product item in a number of ways. For example, it may be carried in a linear or two-dimensional barcode 211, a RFID tag 210, or a Hyperlabel tag pattern 4. The product item may also carry a digital signature associated with the item ID which allows a reader to verify with a certain degree of certainty that the item is authentic.

Verification of Product Authenticity

We wish to allow people who purchase and use a product item to verify its authenticity. They may use a dedicated device to read and verify the item ID and digital signature carried by an item, or they may use a more general-purpose device such as a mobile phone, suitably-enabled with a reader. The reader is matched to the carrier(s) used by the product item to carry the item ID and digital signature. For example, it may be an optical reader for linear or two-dimensional barcodes, an RF reader for RFID tags, or an optical reader for Hyperlabel tags.

Figure 63:
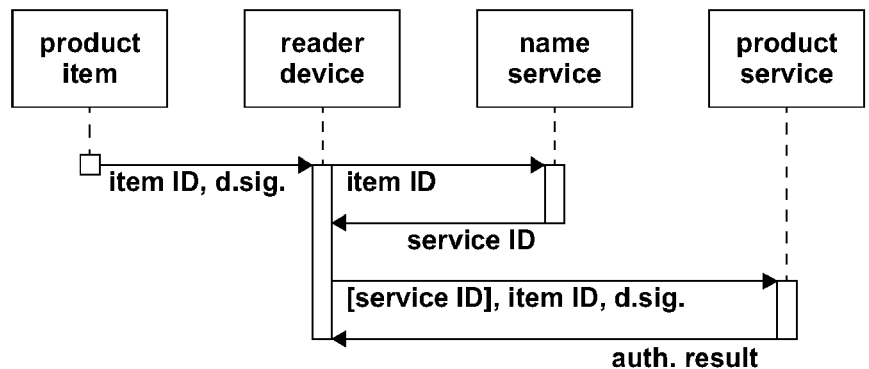
FIG. 63. is an example of a basic product item authentication interaction diagram.

FIG. 63 shows the basic interaction between a product item, reader device and product service during product authentication. The reader reads the item ID and at least a partial digital signature from the item. The reader then queries a name service using item ID to identify a product service for the item. The product service is typically run by or on behalf of the manufacturer of the item, and records information about product items such as product descriptions, digital signatures and/or keys used to generate digital signatures, and pedigree information. The reader queries the product service using the item ID and (partial) digital signature to authenticate the product item. As described earlier, the product service authenticates the (partial) digital signature with respect to the item ID, and responds to the reader with an authentication result message which indicates whether the item is authentic or not. The authentication result message may also identify the object identity. For further security, the reader may additionally generate a nonce which it sends to the product service and the authentication result message may include this nonce.

Note that the product service may in fact be composed of a number of services run by a number of different entities. For example, the manufacturer may run a basic product service which provides product descriptions, but may entrust the product authentication function to a third-party authenticator.

The reader incorporates a mechanism for indicating the result of the authentication to the user. For example, the indicating mechanism can produce audible, visible or tactile output. In the limit case the indicating mechanism may simply provide a binary pass or fail indication, such as via a beep or buzz, a green or red LED, or a short or long vibration.

Note that the reader device may consist of a collection of devices. For example, the reader itself may be separate from the device used to communicate with services on the network, which may itself be separate from the device which incorporates the indicating mechanism.

However, a counterfeiter could foil a binary pass/fail indicator by tagging a counterfeit product item with a valid item ID and digital signature harvested from a different product class and possibly manufacturer. To prevent this exploit, the reader must confirm the manufacturer and/or product class of the item to the user to allow the user to correlate this information with the actual product item.

Again, the indicating mechanism can produce audible or visible output, but structured to convey the manufacturer and/or product class of the product item to the user. For example, the indicating mechanism can play back a spoken or synthesised audio message via a speaker, or show text and/or imagery on a display.

However, a counterfeiter could foil this system by tagging a counterfeit product item with a valid item ID and digital signature administered by the counterfeiter, and spoofing the manufacturer and/or product class of the item to mislead the user into believing the item is authentic. To prevent this exploit, the counterfeiter must be prevented from spoofing the name of the manufacturer and/or the name of a product class.

Figure 64:
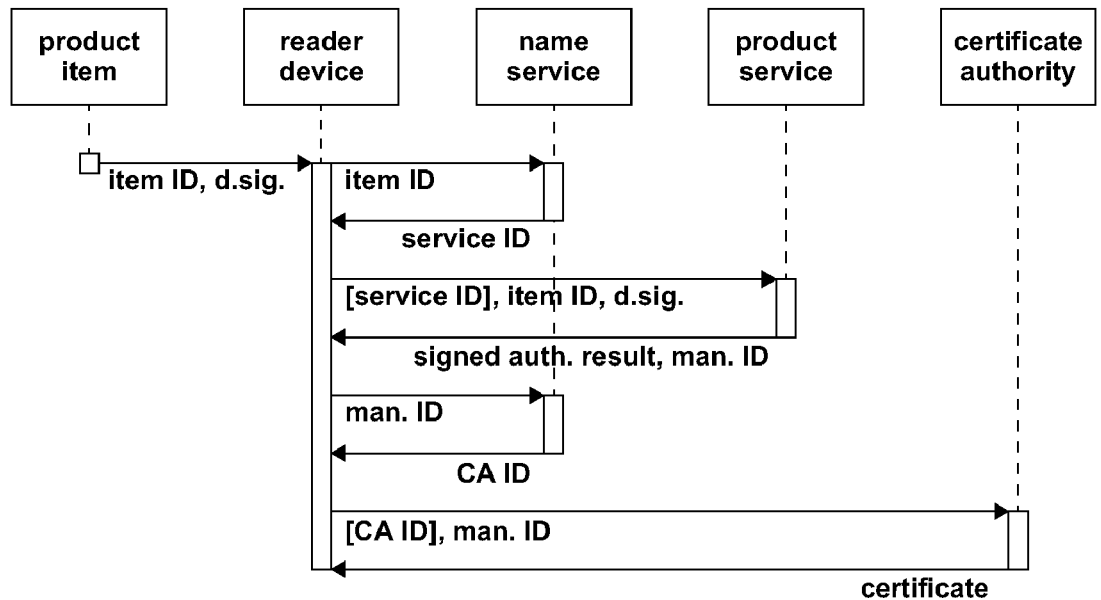
FIG. 64. is an example of a more secure product item authentication interaction diagram.

FIG. 64 shows a more secure interaction between a product item, reader device and product service during product authentication, enhanced to involve a trusted certificate authority (CA). In the enhanced protocol the authentication result message from the product service to the reader is signed by the product service. The reader can verify the authenticity of the names of the manufacturer and product class as follows.

The authentication result message contains the manufacturer identifier. The reader identifies a CA for the manufacturer, and queries the CA using the manufacturer ID to obtain the manufacturer's certificate. The certificate contains a public key which the reader can use to authenticate the message, and the name of the manufacturer suitable for playback or display. The certificate is signed by the CA, and the CA guarantees not to sign a certificate containing a particular manufacturer name unless it has independently verified the identity of the manufacturer. This prevents a counterfeiter spoofing a manufacturer name. The reader uses the public key to authenticate the authentication result message. The authentication result message includes the name of the product class. This prevents a counterfeiter from spoofing a product class name. The reader plays back or displays the name of the manufacturer and the name of the product class to the user.

As an alternative to the reader obtaining the manufacturer's certificate from the CA, it can obtain the certificate from some other source (such as the product service), and merely authenticate the certificate using the corresponding CA's signature public key.

The product service ID and manufacturer ID are one and the same, then the reader doesn't need to authenticate the result message. However, it still needs to derive the manufacturer name from the manufacturer's certificate.

Note that a single CA is backed by a hierarchy of trust, and a CA can itself be authenticated with respect to a parent CA in the hierarchy, and so on back to the root CA. The reader typically caches the authenticated certificates of recently-encountered manufacturers and their CAs.

As described earlier, each product item can have a record of ownership and a history of scan events, possibly relating to aggregates (such as cartons or pallets) containing the product item. These constitute the product item's pedigree. In general there is a one-to-many relationship between ownership records and scan event records, and changes in ownership are typically triggered by particular scan events.

The authentication result message sent by the product service to the reader, and subsequently played back or displayed to the user, can include pedigree information to help the user ascertain the status of the product item. This can indicate to the user the manufacturing and distribution path the item has followed, or simply indicate when and where the item was sold (as discussed further below).

If the product item has been recorded as stolen, either individually or as part of an aggregate, then the user can also be alerted when they request authentication of the item. The authentication message then indicates that the item is stolen.

Figure 65:
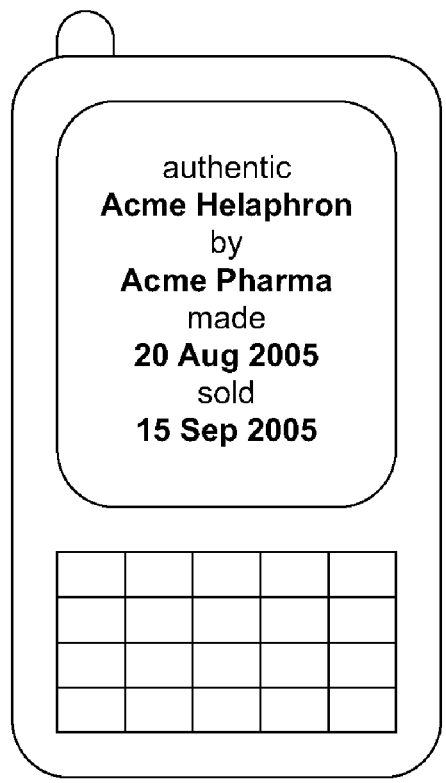
FIG. 65. is an example of mobile phone displaying a product item authentication message.

FIG. 65 shows an example authentication message displayed on a mobile phone.

Most item ID carriers, including barcodes and RFID tags, are susceptible to exact duplication.

Since the inclusion of a digital signature makes it impractical for a counterfeiter to produce a counterfeit item carrying a novel item ID, the counterfeiter is reduced to duplicating an item already seen. The item's pedigree can be used to detect such duplication, although such detection may devolve to the end user.

As an example, a counterfeiter may purchase an authentic pharmaceutical item and duplicate its packaging a thousand times, including its item ID and digital signature carrier, to produce a thousand counterfeit items filled with counterfeit and possibly ineffective or unsafe product. An unsuspecting purchaser, when authenticating the item as discussed above, would find it authentic. The counterfeiter, rather than purchasing the original product item, could alternatively harvest the item ID and signature of an item still in distribution or on the retail shelf.

To prevent this exploit, when a user attempts to purchase an object by reading its identifier, the Netpage server looks up a transaction history for the object and allows the transaction to proceed only if there have been no previous transactions for its item ID. If there have been any previous transactions, an indication of these transactions (in the form of "transaction history data") can be sent to the user. The transaction history data sent to the user may indicate the time and possibly place the item was sold. The transaction history data may also indicate the identity of a reader used to record any previous transactions or a user who has recorded himself as the owner of the object. Hence, the user can conclude that either the object is second-hand or that the item's ID was harvested, in which case the object is probably a counterfeit.

If the user purchases a counterfeit item through an unconventional channel, then they may have no expectation that its pedigree will reflect their purchase, since they may have an expectation that the item is being re-sold or is being sold by someone who does not record sales. To protect such a user from a counterfeit, they can be given the power to register their purchase of the item, possibly anonymously. Since only one user can register the purchase, all but one purchaser of a duplicated item can detect the duplication.

To prevent 'denial-of-service' attacks on this mechanism, where counterfeiters deliberately try to undermine the system by registering product items on the retail shelf as purchased, purchase registration can be restricted to product items already recorded as sold.

Harvesting and denial-of-service can also be prevented if the digital signature which confers the power to register the purchase of an item is protected (or masked) by a tamper-proof mechanism.

For example, in the case of a printed carrier such as a barcode 211 or Hyperlabel tag pattern 4, the carrier for the digital signature can be hidden under a scratch-off layer 220 or it may simply be printed on an inside surface of packaging containing the object. The scratch-off layer 220 or the packaging serves as a visible indicator of tampering. The product item 200 then typically carries two digital signatures: one used to authenticate scan events in the supply chain, and the other used by the end user to authenticate the item post-purchase, and register the item as purchased. Alternatively or additionally, the user can also use the public digital signature to authenticate the item, and use the tamper-proof digital signature to register the purchase.

Figure 66:
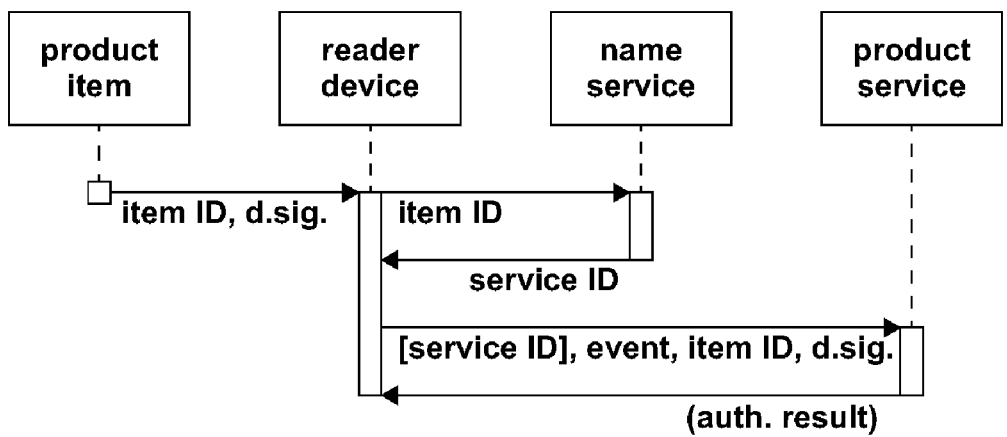
FIG. 66. is an example of a secure scan event interaction diagram.

A reader in the supply chain can use the digital signature associated with an item (or aggregate) to authenticate the item before generating a scan event, or can transmit the digital signature as part of the scan event to allow the product service to authenticate the product item, as shown in FIG. 66. This prevents counterfeit scan events from being recorded as part of an item's pedigree, i.e. it prevents a counterfeit pedigree from being established for a counterfeit or diverted item. In the Figure the product service represents the distributed set of supply chain services, run by manufacturers, distributors and retailers, which record and serve information about product items. As described earlier, the scan event identifies the reader (scanner), and the time and location of the scan.

The reader and product service can also utilise encryption and/or digital signing in their communications to prevent counterfeit scan events from being accepted. For example, each reader can be registered with the product service and have its own private key for signing scan events, and the product service can authenticate each signed scan event using the reader's corresponding public key before accepting and recording the scan event.

It will, of course, be appreciated that the present invention has been described purely by way of example and that modifications of detail may be made within the scope of the invention, which is defined by the accompanying claims.

The invention claimed is:

1. An object comprising first coded data disposed on or in a surface thereof and a random pattern disposed on or in said surface, said first coded data identifying a plurality of fiducials on the surface and said random pattern defining at least one fingerprint for the object, wherein the random pattern is defined by a taggant randomly dispersed in ink printed on the surface, and wherein the ink is superimposed with the first coded data such that the fiducials identify different zones of the random pattern.

2. The object of claim 1, wherein the or each fingerprint identifies any one of:
   an object identity;
   a serial number; or
   an Electronic Product Code (EPC).

3. The object of claim 1, wherein the fiducials are all distinct from each other.

4. The object of claim 3, wherein each fiducial identifies a unique location on the surface.

5. The object of claim 1, wherein the first coded data further identifies a layout of at least one interactive element associated with the surface.

6. The object of claim 5, wherein the layout is identified by a layout number, and one layout number is associated with a plurality of objects.

7. The object of claim 1, wherein the object is a consumer product item and the first coded data further identifies a product class.

8. The object of claim 7, wherein the product class is identified by any one of:
   a product class number;
   a manufacturer number; or
   a Universal Product Code (UPC).

9. The object of claim 1, wherein the first coded data further identifies a unique identity of the object.

10. A data reader for interacting with an object, said object comprising first coded data and a random pattern disposed on or in a surface thereof, said first coded data identifying a plurality of fiducials on the surface and said random pattern defining at least one fingerprint for the object, said data reader comprising:
   a first optical sensor for sensing at least some of the first coded data;
   a second optical sensor for sensing at least some of the random pattern defined by a taggant randomly dispersed in ink printed on the surface;
   a processor configured for generating fingerprint data using the sensed coded data and the sensed random pattern, said fingerprint data identifying at least some of the random pattern and at least one fiducial; and
   communication means configured for communicating the fingerprint data to a computer system,
wherein the ink is superimposed with the first coded data such that the fiducials identify a unique zone of the random pattern in the fingerprint data.

11. The data reader of claim 10, wherein the first and second optical sensors are the same optical sensor or different optical sensors.

12. The data reader of claim 10, which is selected from any one of the group comprising: a fixed scanner; a handheld scanner; a mobile phone; a pen; a stylus; and a personal digital assistant.

* * * * *